United States Patent [19]

Yamano et al.

[11] Patent Number: 4,977,423
[45] Date of Patent: Dec. 11, 1990

[54] EXPOSURE CALCULATING APPARATUS

[75] Inventors: Yasuteru Yamano; Takehiro Katoh; Akihiko Fujino; Kenji Tsuji; Shuji Izumi; Masaaki Nakai; Nobuyuki Taniguchi, all of Osaka, Japan

[73] Assignee: Minolta Camera Kabushiki Kaisha, Osaka, Japan

[21] Appl. No.: 453,259

[22] Filed: Dec. 20, 1989

Related U.S. Application Data

[63] Continuation of Ser. No. 307,845, Feb. 8, 1989, abandoned.

[30] Foreign Application Priority Data

| Feb. 8, 1988 | [JP] | Japan | 63-28512 |
| Feb. 8, 1988 | [JP] | Japan | 63-28513 |
| Feb. 8, 1988 | [JP] | Japan | 63-28514 |
| Feb. 27, 1988 | [JP] | Japan | 63-45558 |
| Mar. 16, 1988 | [JP] | Japan | 63-64408 |

[51] Int. Cl.$^5$ ............................ G03B 13/36
[52] U.S. Cl. ........................ 354/402; 354/432
[58] Field of Search .................. 354/402, 432

[56] References Cited

U.S. PATENT DOCUMENTS

| 4,423,936 | 1/1984 | Johnson | 354/432 |
| 4,664,495 | 5/1987 | Alyfuku et al. | 354/432 |
| 4,690,536 | 9/1987 | Nakai et al. | 354/432 |
| 4,745,427 | 5/1988 | Izumi et al. | 354/432 |
| 4,746,947 | 5/1988 | Nakai | 354/432 |
| 4,774,401 | 9/1988 | Yamada et al. | 354/432 |
| 4,786,935 | 11/1988 | Hayakawa et al. | 354/432 |
| 4,792,820 | 12/1988 | Morita et al. | 354/433 |
| 4,796,043 | 1/1989 | Izumi et al. | 354/432 |

FOREIGN PATENT DOCUMENTS

| 56-102838 | 8/1981 | Japan . |
| 58-12571 | 3/1983 | Japan . |
| 60-120675 | 6/1985 | Japan . |
| 60-144621 | 7/1985 | Japan . |
| 61-279829 | 12/1986 | Japan . |
| 62-203022 | 9/1987 | Japan . |
| 62-203140 | 9/1987 | Japan . |
| 62-203141 | 9/1987 | Japan . |
| 63-5331 | 1/1988 | Japan . |

Primary Examiner—Russell E. Adams
Attorney, Agent, or Firm—Burns, Doane, Swecker & Mathis

[57] ABSTRACT

The disclosure relates to an exposure calculation apparatus which includes plural light measuring devices for measuring lights incident on a plurality of regions of a photographing image plane and outputting measured data of the lights; plural devices for detecting the focusing conditions of objects present in a plurality of the regions of the photographing image plane and outputting data on the focusing conditions; a position detecting devices for detecting the position which a main object occupies in the photographing image plane on the data on the focusing condition outputted from the focusing conditions detecting devices; calculation device for making a plurality of calculations each of which is made depending on at least one of the data of measured lights outputted from the light measuring devices; and selecting devices for selecting one of the plurality of calculations on the position detected by the position detecting devices and the data on the focusing conditions of the position.

10 Claims, 64 Drawing Sheets

Fig. 37a

```
    STOP ROUTINE
         │
         ▼
  ┌─────────────────┐
  │ INPUT FLASH DATA │  #91
  └─────────────────┘
         │
         ▼
      ◇ FCR03=1 ◇ ──N──┐
         │Y            │
         ▼             ▼
    ┌─────────┐   ┌─────────┐
    │ FONF←1  │   │ FONF←0  │
    └─────────┘   └─────────┘
         │             │
         ├─────────────┘
         ▼        #92
      ◇ M MODE ◇ ──Y──┐
         │N           │
         ▼            ▼
        #93          #97
```

Fig. 37b

```
         #104
          │
          ▼
  ┌──────────────────────┐
  │ OUTPUT INDICATION DATA│
  └──────────────────────┘
          │
          ▼
      ◇ FONF=1 ◇ ──N──┐
          │Y          │
          ▼    #106   │
    ┌──────────────┐  │
    │OUTPUT FLASH DATA│
    └──────────────┘  │
          │           │
          ├───────────┘
          ▼     #107
    ┌──────────┐
    │ STOP ADC │
    └──────────┘
          │
          ▼
        #108
```

EXPOSURE CALCULATING APPARATUS

This application is a continuation of application Ser. No. 07/307,845, filed Feb. 8, 1989, now abandoned.

BACKGROUND OF THE INVENTION

1. Field of the Invention

The present invention relates to an exposure calculating apparatus for use in, for example, a camera, and more particularly, to an apparatus which calculates an exposure control data so as to expose a main object properly by dividing a photographing image plane into a plurality of regions and measuring the luminance information of respective regions.

2. Description of the Related Art

An exposure control apparatus is disclosed, for example, in U.S. Pat. No. 4,423,936 according which a photographing image plane is divided into a plurality of regions, a region in which a main object is present (hereinafter referred to as the main zone) is detected from a plurality of the regions, and an exposure control is performed based on the measured brightness or luminance value of the main zone and the measured luminance values of the other regions. According to this apparatus, a light measuring signal such as an infrared light measuring signal is emitted toward a photographing field, and the photographing distances of objects present in three different regions of the photographing field are found, whereby the region in which the nearest object (main object) is present, namely, the main zone is detected. The luminances of the three regions are detected and an exposure control is carried out based on the measured values of light from the main zone and the other regions so as to obtain correct exposure.

Another exposure calculating apparatus is disclosed in Japanese Patent Laid-Open Publication No. 203022/1987. According to this apparatus, the size of the image of a main object is presumed according to the object distance information and the focal length of the photographing lens, and a light measuring range is changed according to the size. According to the apparatus, the size of the image of the main object located in the center of the photographing image plane is presumed based on the object distance information and the information of the focal length of the photographing lens, and the light measuring region is changed according to the size of the image of the main object, whereby light measuring information to properly expose the main object is outputted.

In the exposure calculating apparatus according to U.S. Pat. No. 4,423,936, the position of the main object is considered besides the measured values, but the size of the main object is not considered. Accordingly, the main object cannot always be exposed properly. For example, if the main object is small, a lot of light reflected from objects other than the light reflected from the main object are incident on the region to be measured. Therefore, the luminance of the main object cannot be accurately measured.

In the exposure calculating apparatus according to Japanese Patent Laid-Open Publication No. 203022/1987, it is indispensable that the main object is present in the center of the photographing image plane. Therefore, if the main object is not located in the center of the photographing image plane, it is impossible to properly expose the main object.

SUMMARY OF THE INVENTION

Accordingly, an essential object of the present invention is to provide an improved exposure calculating apparatus which can overcome such disadvantages as described above, namely, an exposure calculating apparatus which calculates exposure control data so that a main object can be properly exposed under any circumstances.

In accomplishing this and other objects, according to one preferred embodiment of the present invention, an improved exposure calculating apparatus is provided comprising plural first means for measuring light incident on a plurality of regions of a photographing image plane and outputting data of the measured light, plural second means for detecting the focusing conditions of objects present in a plurality of regions of the photographing image plane and outputting data on the focusing conditions, third means for detecting the position in which the main object is present based on the data on the focusing conditions outputted from the second means, fourth means for selecting at least one data from a plurality of the data of the measured light outputted from the first means based on the position of the main object detected by the third means and the data on the focusing condition in the position in which the main object is present, and fifth means for calculating exposure control data based on the data of the measured light selected by the fourth means.

According to another preferred embodiment of the present invention, an exposure calculating apparatus as described below is provided. The exposure calculating apparatus comprises plural first means for measuring light incident on a plurality of regions of a photographing image plane and outputting data of the measured light, plural second means for detecting the focusing conditions of objects present in a plurality of regions of the photographing image plane and outputting data on the focusing conditions, third object means for detecting the position, main object based on the data on the focusing conditions outputted from the second means, fourth means for inputting focal length data of a photographing lens, fifth means for selecting at least one data from a plurality of data of the measured light outputted from the first means based on the position, of the main object detected by the third means and the focal length data inputted by the fourth means, and sixth means for calculating exposure control data based on the data selected by the fifth means.

According to still another preferred embodiment of the present invention, an exposure calculating apparatus as described below is provided. The exposure calculating apparatus comprises plural first means for measuring light incident on a plurality of regions of a photographing image plane and outputting measured data of the light, plural second means for detecting the focusing conditions of objects present in a plurality of regions of the photographing image plane and outputting data on the focusing conditions, third means for detecting the position of the main object based on the data on the focusing conditions outputted from the second means, fourth means for detecting the size of the image of the main object, fifth means for selecting at least one data from a plurality of the data outputted from the first means based on the position of the main object detected by the third means and the size of the main object detected by the fourth means, and sixth means for calculating exposure control data based on the data selected by the fifth means.

BRIEF DESCRIPTION OF THE DRAWINGS

These and other objects and features of the present invention will become apparent from the following description taken in conjunction with the preferred embodiments thereof with reference to the accompanying drawings, in which:

FIGS. 30a, 30b through FIG. 34 are flowcharts showing the control to be performed by the microcomputer provided in the flash emitting device of the camera system which embodies the present invention;

FIGS. 37a and 37b are flowcharts showing essential parts of a modification of the flowchart shown in FIG. 8;

DETAILED DESCRIPTION OF THE PREFERRED EMBODIMENT

The embodiments of the present invention is described with reference to the drawings.

[Hardware]

(Description of System)

Figure 1:
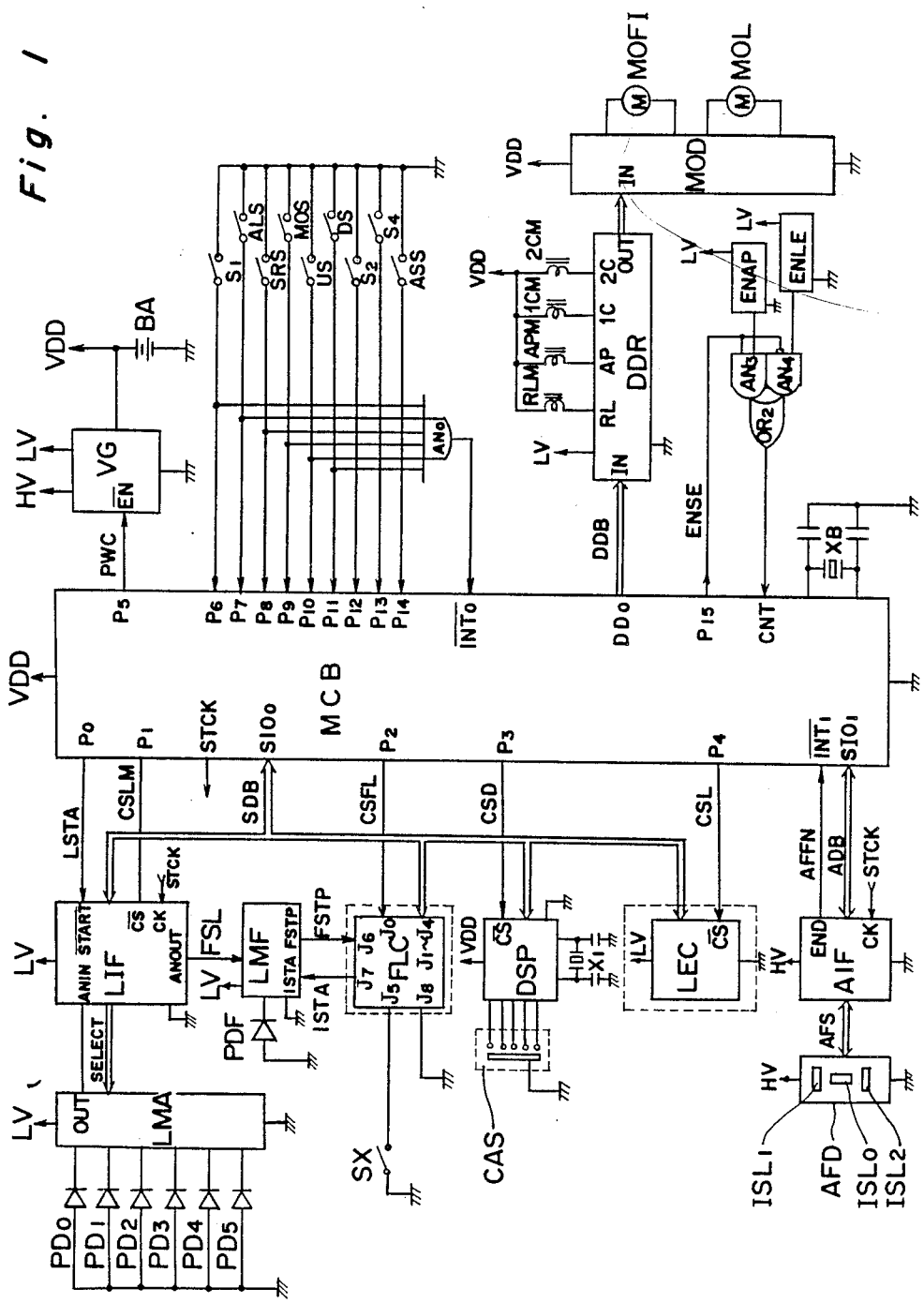
FIG. 1 is a circuit diagram of a camera system which embodies the present invention.

Referring now to the drawings, there is shown in FIG. 1, an electric circuit of a camera system which embodies the present invention. The camera system of the embodiment has four exposure control modes, a program mode (P), a shutter speed priority mode (S), an aperture priority mode (A), and a manual mode (M).

Referring to FIG. 1, a microcomputer MCB provided in a camera body controls the entire camera system. The microcomputer MCB is connected through a serial data bus SDB to a light measuring interface LIF, a flash circuit FLC, a display circuit DSP, and a lens circuit LEC. The microcomputer MCB is also connected to an AF interface AIF and a drive circuit DDR through data buses ADB and DDB, respectively.

Figure 2:
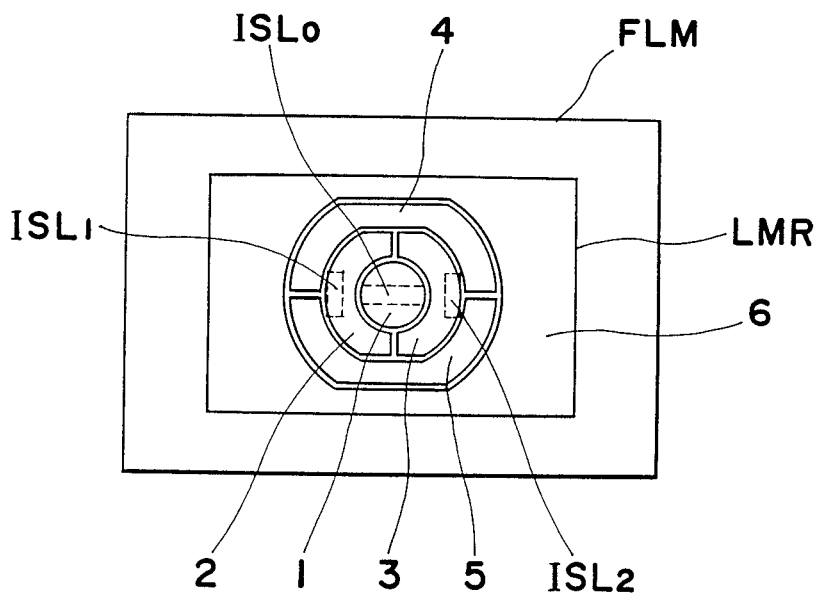
FIG. 2 is a view showing ranges in which light is measured and regions in which focusing conditions are detected in the camera system which embodies the present invention.

The light measuring interface LIF is connected to a light measuring circuit LMA connected with six photodiodes $PD_0 \sim PD_5$. The photodiodes $PD_0 \sim PD_5$ are disposed so that each of them receives light incident on a different portion of a photographing image plane. The ranges in which light is measured by the respective photodiodes $PD_0 \sim PD_5$ are as shown in FIG. 2. That is, the photodiode $PD_0$ is disposed to receive a light incident on a circular portion 1 located in the center of a photographing image plane FLM; the photodiode $PD_1$ to receive a light incident on a "C"-shaped portion 2 located on the left hand of the circular portion 1; the photodiode $PD_2$ to receive a light incident on a "C"-shaped portion 3 located on the right hand of the circular portion 1; the photodiode $PD_3$ to receive a light incident on a "C"-shaped portion 4 located on the upper hand of the circular portion 1; the photodiode $PD_4$ to receive a light incident on a "C"-shaped portion 5 located on the lower hand of the circular portion 1; and the photodiode $PD_5$ to receive a light incident on a portion 6 of a rectangular range LMR in which a light is measured excluding the above-described portions 1 through 5.

The above-described manner of determining the regions in which light is measured allows a fine adjustment of a diameter of the area for spot metering according to the size of an object to be photographed with the importance attached to the luminous quantity of the center portion. Further, exposure control is performed with the weight applied to the bright or luminous quantity of dark portion by utilizing the difference in the brightness or luminances between the portion 4 disposed relatively upper in the light measuring region LMR and the portion 5 disposed relatively lower therein. Taking a photograph under a bright sky as an example, the luminance of the region 4 is much greater than that of the region 5. In this case, the weight of the luminous value of the region 4 is reduced, whereby the main object can be exposed properly.

As apparent from FIG. 1, the anodes of all the photodiodes $PD_0 \sim PD_5$ are grounded.

The light measuring interface LIF provided with an A-D converter converts the analog data of the output from the light measuring circuit LMA to digital data, thus outputting a digitized signal to the microcomputer MCB. The light measuring interface LIF provided with a D-A converter converts digital data corresponding to the controlled light quantity of a flash light transmitted from the microcomputer MCB through the data bus SDB into analog data, thus outputting an FSL signal to the flash light measuring circuit LMF.

The flash light measuring circuit LMF measures a flash light and outputs a flash stopping signal FSTP for stopping a flash emission when an object is exposed properly. The flash light measuring circuit LMF receives a light reflected from a film through a photodiode PDF and converts the electric current corresponding to the intensity of the received light into a voltage by performing a logarithmic compression, and then, logarithmically expands the addition of the logarithmically compressed voltage and the FSL signal, which is converted into electric current, then integrate the electric current and outputs a flash stopping signal FSTP for stopping a flash emission when the integrated quantity has reached an appropriate value.

The detailed description of the flash circuit FLC will be made later.

The display circuit DSP displays various photographic information such as an aperture value, a shutter speed, and an exposure control mode, reads the ISO sensitivity of a film according to the relationship between a film cartridge and contacts CAS, and transfers the data of the film sensitivity to the microcomputer MCB. The display circuit DSP has an individual microcomputer. A reference clock generating circuit $X_1$ generates a reference clock of the microcomputer of the display circuit DSP.

The lens circuit LEC provided for respective photographing lenses outputs information thereof, for example, focal lengths, minimum aperture values.

The AF interface AIF receives a control signal from the microcomputer MCB through a data bus ADB. Based on the control signal, the AF interface AIF controls the operation of a light receiving circuit AFD, for detecting focusing condition, including CCD line sensors, through a signal line AFS. The AF interface AIF receives the analog data of the respective pixels or picture elements of the CCD line sensors through the signal line AFS, then converts the analogue data into digital data which is outputted to the microcomputer MCB through the data bus ADB. The light receiving circuit AFD for detecting focusing condition has three CCD line sensors $ISL_0$, $ISL_1$, and $ISL_2$ which are used to detect the in-focus states of objects located at positions corresponding to the regions shown by broken lines in FIG. 2. More specifically, the CCD line sensor $ISL_0$ is used to horizontally detect the in-focus state of an object disposed at the center portion (zero zone) of the photographing image plane FLM. The CCD line sensor $ISL_1$ is used to vertically detect the in-focus state of the object disposed on the left hand (first zone) of the center thereof. The CCD line sensor $ISL_2$ is used to vertically detect the in-focus state of the object disposed on the right hand (second zone) of the center thereof. Upon completion of the CCD integrations of the CCD line sensors $ISL_0$, $ISL_1$, and $ISL_2$, the AF interface AIF outputs an integration completion signal AFFN of an "L" level to an interruption terminal $INT_1$. Thus the microcomputer MCB is enabled for an interruption.

A DC-to-DC converter VG boosts the voltage of a battery BA for a direct current power source, thus supplying the respective circuits with two kinds of voltages HV and LV (HV>LV). The higher voltage HV is supplied to the AF interface AIF and the light receiving circuit AFD. The lower voltage LV is supplied to the light measuring interface LIF, the light measuring circuit LMA, the flash light measuring circuit LMF, the lens circuit LEC, the drive circuit DDR, and encoders ENAP and ENLE. The battery BA powers the microcomputer MCB, the display circuit DSP, and the motor control circuit MOD through a power source feeding line VDD.

Next, switches are described hereinbelow.

A light measuring switch $S_1$ is turned on when an unshown release button is pressed to a first stroke (a first press). When the light measuring switch $S_1$ is turned on, a light measuring and the detection of an in-focus state are started by the microcomputer MCB. The value of a measured light when an AE lock switch is turned on is stored. When a reset switch SRS is turned on, the entire system is initialized. Every time an exposure control mode change-over switch MOS is changed from OFF to ON, the exposure control mode is changed in the order of P, S, A, M, and to P. Every time a data setting switch US is changed from OFF to ON, a shutter speed increases by 1 Ev or an aperture value increases by $\frac{1}{2}$ Ev. Every time a data setting switch DS is changed from OFF to ON, the shutter speed is reduced by 1 Ev or the aperture value is reduced by $\frac{1}{2}$ Ev. When an unshown release button is depressed to a second stroke (by a second press), a release switch $S_2$ is turned on. Accordingly, when the release switch $S_2$ is ON, the light measuring switch $S_1$ is also ON. When the switch $S_2$ is turned on, an exposure control operation is started by the microcomputer MCB. A photograph completion detection switch $S_4$ is turned on when a mirror (unshown) pivots downwards, the aperture (unshown) fully opens, and a second shutter curtain (unshown) completes its movement upon completion of an exposure, and thereafter, is turned off when every one frame of a film is wound and the shutter, mirror, and diaphragming mechanism are cocked. The operations of the data setting switches US and DS changes the aperture value with the switch ASS turned on when the exposure control mode is (M) mode, while the shutter speed is changed by the operations of the data switches US and DS with the switch ASS turned off.

As shown in FIG. 1, the light measuring switch $S_1$, the AE lock switch ALS, the reset switch SRS, the mode change-over switch MOS, the data setting switches US and DS are connected to an interruption terminal $INT_0$ through an AND circuit $AN_0$ with one end of each of these switches grounded. Accordingly, the microcomputer MCB starts an interrupt operation when either of the light measuring switch $S_1$, the AE lock switch ALS, the reset switch SRS, the mode change-over switch MOS, the data setting switches US and DS is turned on.

Although not shown, each of the ungrounded terminals of these switches is pulled up by the voltage of the battery BA (VDD), and needless to say, a chattering eliminator is provided for these switches.

The microcomputer MCB outputs control data to the drive circuit DDR through the data bus DDB. The control data are decoded to control four magnets RLM, APM, 1CM, and 2CM, and motor control data is outputted from the drive circuit DDR to a motor control circuit MOD. When the attracting portions of release magnets RLM repel each other, a diaphragming member and the mirror are disengaged from an engaging member, and then, the diaphragming member starts an aperture size-reducing operation and the mirror pivots upwards, while the diaphragm member stops the diaphragming operation when the attracting portions of diaphragming magnets APM repel each other. When the attracting portions of the magnets 1CM and 2CM for traveling shutters repel each other, respectively, the first shutter curtain (unshown) and the second shutter curtain are disengaged from engaging members such as springs and start traveling. When electric current flows through the coils of the release magnet RLM, the magnet APM, the magnets 1CM and 2CM comprising permanent magnets, coils, and attracting portions, respectively, the attracting portions thereof repel each other.

The motor control circuit MOD controls the clockwise and counterclockwise rotations of a film sending motor MOFI and a lens drive motor MOL in response to the data transmitted from the drive circuit DDR.

The encoder ENAP detects the position of the diaphragm, while the encoder ENLE detects the rotation amount of the lens drive motor MOL, namely, the movement amount of the lenses. The output pulses of the encoders ENAP and ENLE are inputted to the count terminal CNT of the microcomputer MCB through a multiplexer comprising AND circuits $AN_3$ and $AN_4$ and an OR circuit $OR_2$.

A reference clock generating circuit XB comprises a crystal oscillator and a capacitor. A reference clock STCK outputted from the reference clock output terminal STCK of the microcomputer MCB is applied both to the light measuring interface LIF and the AF interface AIF.

(Flash circuit)

Figure 3:
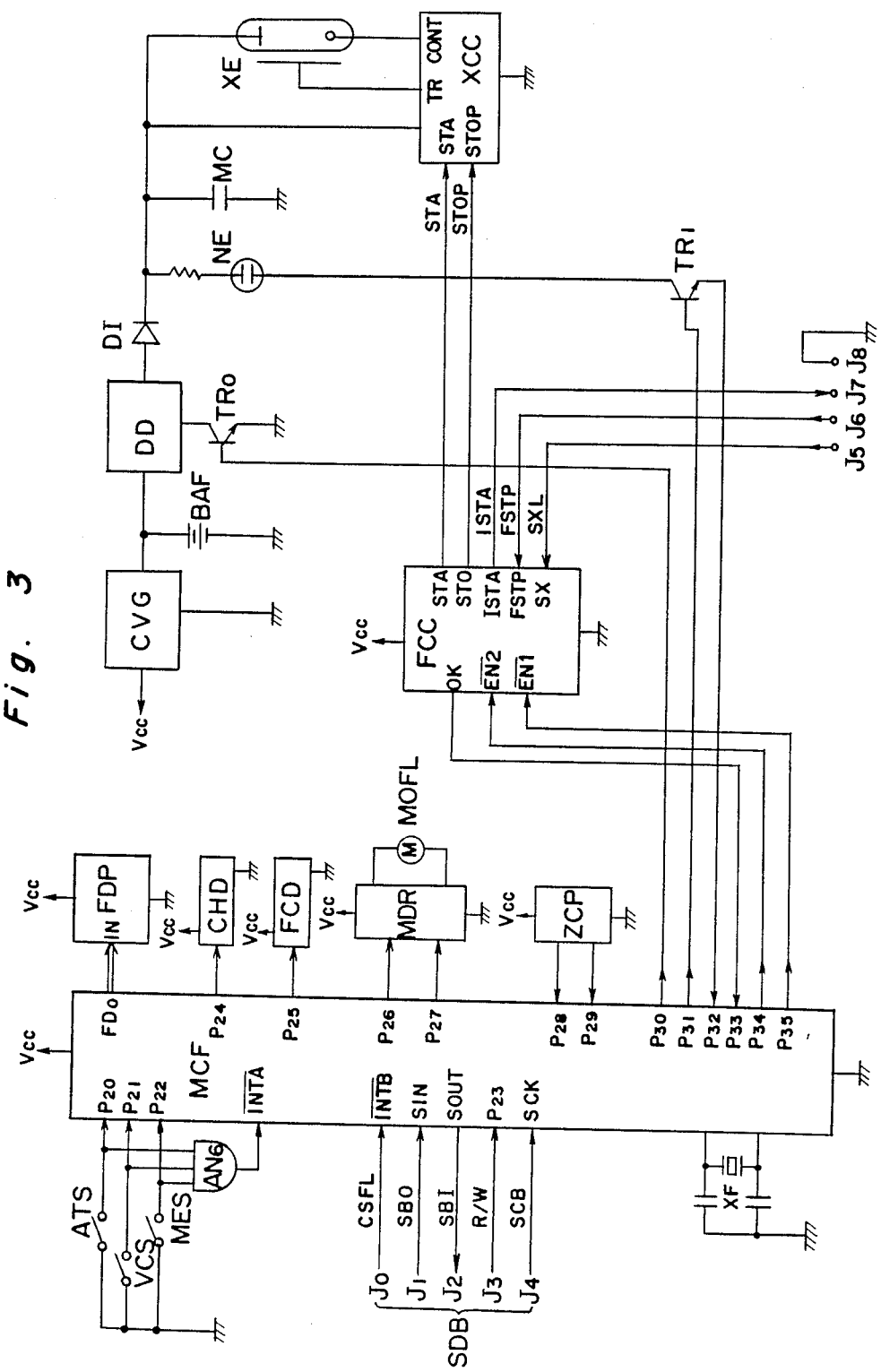
FIG. 3 is the circuit diagram of the flash emitting device to be used for the camera system which embodies the present invention.

FIG. 3 is a block diagram showing the flash circuit FLC shown in FIG. 1. The flash circuit FLC is provided in a flash emitting device removably mounted on the camera body and connected to the circuit of the camera body through nine contacts $J_0 \sim J_8$. The contacts $J_0$ through $J_4$ compose the data bus SDB shown in FIG. 1.

A microcomputer MCF controls the flash circuit FLC independently of the microcomputer MCB shown in FIG. 1.

Every time the flash stopping mode switch-over switch ATS is turned on, the flash stopping mode is switched alternately to an automatic flash stopping mode and manual flash stopping mode. In the automatic flash stopping mode, a flash emission is stopped in response to the flash stopping signal FSTP inputted from the flash light measuring circuit LMF to the flash circuit FLC through the terminal $J_6$.

Every time the illumination range change-over switch VCS is turned on, a panel mounted in front of the emission portion is moved. As a result, the illumination range is changed so that a flash light may selectively cover the field angle of a photographing lens having the focal length of "automatic", 28 mm, 35 mm, 50 mm and 70 mm. "Automatic" herein means a mode which is automatically set to the focal length of a photographing lens. For example, if the focal length of a photographing lens is 35 mm, every time the switch VCS is turned on, the illumination range is changed so that a flash light covers the field angle of a photographing lens having the focal length of 35 mm, 28 mm, 35 mm, 50 mm, 70 mm, 35 mm ———. In the case of a zoom lens, when the switch VCS is operated to set the illumination range to the "automatic", the illumination range is automatically changed every time a zooming is carried out.

Every time an emission mode change-over switch MES is turned on, the emission mode is switched in turn to forced emission, automatic emission, non-emission and forced emission.

As shown in FIG. 3, each one of the ends of these switches ATS, VCS, and MES is grounded and the other ends thereof are connected to the interruption terminal INTA of the microcomputer MCF through AND circuit $AN_6$. Accordingly, when any one of these switches ATS, VCS, and MES is turned on, the microcomputer MCF is enabled for an interruption. Similarly to the switch $S_1$ as shown in FIG. 1, these switches ATS, VCS, and MES are pulled up and a chattering eliminator is provided.

A display circuit FDP displays flash information. A charge completion indicator CHD makes an indication when the main capacitor MC has been charged to a predetermined voltage, for example, 300 V. The indication is made by the charge completion indicator CHD after data is transferred from the microcomputer MCB and only when a flash indication signal FDIS indicates that the indication is enabled. The flash indication signal FDIS will be described later. A flash stopping indicator FCD operates for a certain period, for example, three seconds, after the flash stopping signal FSTP is outputted from the flash light measuring circuit LMF so as to inform a photographer that a flash emission has been appropriately made. Each of the indicators CHD and FCD comprise an LED which emits a different color from the other.

A motor control circuit MDR controls a motor MOFL. The motor MOFL moves a panel disposed in front of the flash emission portion so that an illumination range is changed.

A position detecting circuit ZCP, having an encoder which outputs a signal according to the rotation of the motor MOFL, detects the position of the panel which is moved by the motor MOFL.

A reference clock generating circuit XF comprises a crystal oscillator and a capacitor.

A flash control circuit FCC outputs signals STA and STOP so that a flash emission portion XE starts or stops a flash emission.

A voltage stabilizing circuit CVG stabilizes a voltage supplied to the microcomputer MCF even when the voltage of the battery BA for the direct current power source increases or decreases.

A DC-to-DC converter DD, a rectifier diode DI, the main capacitor MC, the charge completion detecting means NE, the flash emission portion XE, and an emission control circuit XCC comprise a well-known flash circuit. In response to an emission start signal STA outputted from the flash control circuit FCC, the emission control circuit XCC comprising a thyristor, a trigger circuit, and a commutation capacitor operates the trigger circuit, outputs a trigger signal from the terminal TR thereof so as to trigger the flash emission portion XE, and at the same time, turns on the thyristor and makes the flash emission portion XCC emit flash light. The emission control circuit XCC discharges the commutation capacitor in response to the emission stop signal STOP outputted from the flash control circuit FCC, whereby the thyristor is turned off and makes the flash emission portion XE stop emitting flash light.

Switching transistors $TR_0$ and $TR_1$ control, respectively the operation of the DC-to-DC converter DD and the charge completion means NE in response to the signal outputted from the microcomputer MCF.

In the embodiment, a neon tube is used as the charge completion detecting means NE, and a xenon tube is used as the flash emission portion XE.

(Terminal of microcomputer)

The functions of the terminals of the microcomputers MCB and MCF (input and output signals and data and the operation of the camera system) are listed in Tables 1 and 2.

TABLE 1

| terminal | I/O | |
|---|---|---|
| $P_0$ | output | A-D control terminal<br>A-D converter is actuated by "L" |
| $P_1$ | output | chip select terminal<br>light measuring interface LIF is selected by "L" |
| $P_2$ | output | chip select terminal<br>flash circuit FLC is selected by "L" |
| $P_3$ | output | chip select terminal<br>display circuit DSP is selected by "L" |
| $P_4$ | output | chip select terminal<br>lens circuit LEC is selected by "L" |
| $P_5$ | output | power control terminal<br>DC-to-DC converter VG is actuated by "L" |
| $P_6$ | input | terminal for detecting light measuring switch $S_1$.<br>"L" when $S_1$ is ON |
| $P_7$ | input | terminal for detecting AE lock switch ALS<br>"L" when ALS is ON |
| $P_8$ | input | terminal for detecting reset switch SRS<br>"L" when SRS is ON |
| $P_9$ | input | terminal for detecting mode change-over switch MOS<br>"L" when MOS is ON |
| $P_{10}$ | input | terminal for detecting data setting switch US<br>"L" when US is ON |
| $P_{11}$ | input | terminal for detecting data setting switch DS<br>"L" when DS is ON |
| $P_{12}$ | input | terminal for detecting release switch $S_2$<br>"L" when $S_2$ is ON |
| $P_{13}$ | input | terminal for detecting photographing completion detecting switch $S_4$<br>"L" when $S_4$ is ON |
| $P_{14}$ | input | terminal for detecting change-over switch ASS<br>"L" when ASS is ON |
| $P_{15}$ | output | encoder selection terminal<br>ENAP is selected by "H"<br>ENLE is selected by "L" |
| STCK | output | reference clock output terminal<br>reference clock is outputted to interfaces LIF and AIF |
| $\overline{INT_0}$ | input | interruption terminal<br>interruption starts in synchronization with fall |
| $\overline{INT_1}$ | input | interruption terminal<br>interruption starts in synchronization with fall |
| $SIO_0$ | input & output | serial data input/output terminal |
| $SIO_1$ | input & output | serial data input/output terminal |
| DDO | output | drive data output terminal |

TABLE 2

| terminal | I/O | |
|---|---|---|
| $P_{20}$ | input | terminal for detecting flash stopping mode change-over switch ATS<br>"L" when ATS is ON |
| $P_{21}$ | input | terminal for detecting illumination range change-over switch VCS<br>"L" when VCS is on |
| $P_{22}$ | input | terminal for detecting emission mode change-over switch MES<br>"L" when MES is ON |
| $P_{23}$ | input | read/write detecting terminal<br>"H" when data is outputted<br>"L" when data is inputted |
| $P_{24}$ | output | charge completion terminal<br>charge completion is indicated by "H" |
| $P_{25}$ | output | terminal for outputting "H" level signed when the flash light is correctly emitted |
| $P_{26}, P_{27}$ | output | motor control terminal which output data for controlling rotation and stop of motor MOFL |
| $P_{28}, P_{29}$ | input | position detecting terminals<br>position information of emission panel is inputted from position detecting circuit ZCP |
| $P_{30}$ | output | terminal for controlling DC-to-DC converting<br>DC-to-DC converter DD is actuated by "H" |
| $P_{31}$ | output | control terminal for detecting charge completion<br>charge completion is carried out by "H"<br>charge completion detection is prohibited by "L" |
| $P_{32}$ | input | charge completion detecting terminal<br>charge completion state is detected by quantity of supplied electric current |
| $P_{33}$ | input | terminal for detecting by "H" that flash light is correctly emitted |
| $P_{34}$ | output | terminal for controlling flash stopping operation<br>flash stopping signal is ignored by "H" |
| $P_{35}$ | output | emission control terminal<br>emission is allowed by "L" |
| SCK | input | reference clock input terminal<br>serial data is inputted or outputted in synchronization with the reference clock |
| SIN | input | serial data input terminal |
| SOUT | output | serial data output terminal |
| FDO | output | display data output terminal<br>serially outputs display data to display circuit FDP |
| $\overline{INTA}$ | input | interruption terminal<br>interruption starts in synchronization with fall |
| $\overline{INTB}$ | input | interruption terminal<br>interruption starts in synchronization with fall |

[Software]

The control to be performed by the camera system in this embodiment is described hereinbelow.

(flag)

Table 3 shows flags to be used in this system and the contents which the flags signify. The upper stages of Table 3 indicate the states at the time when the flags are set and the lower stages thereof show the states at the time when the flags are reset. Flags AMF and STF are used by the microcomputer MCF provided in the flash circuit FLC. The flag STF is set, as described later, when the flash emitting device is mounted on an exclusive camera applicable to the flash emitting device and is when a signal is transferred from the camera to the flash emitting device and reset when a signal to be transmitted from the camera or a signal generated by a manual operation is not inputted to the microcomputer MCF for a certain period. In other words, when the flash emitting device is operating as part of the camera system, the flag STF is set and when the flash emitting device is operating independently of the camera system, the flag STF is reset.

TABLE 3

| flag | content | upper stage: set (1)<br>lower stage: reset (0) |
|---|---|---|
| AEF | exposure calculation is | completed<br>not completed |
| ALF | AE lock switch ALS is | ON<br>OFF |
| BLAF | AE lock by AE lock switch ALS is | completed<br>not completed |
| BLFF | AE lock due to in-focus state is | completed |

TABLE 3-continued

| flag | content | upper stage: set (1) lower stage: reset (0) |
|------|---------|---------------------------------------------|
| DDFF | low contrast search is | not completed completed |
| FDF | AF operation is | not completed completed |
| FIHF | focusing condition detection is | prohibited permitted |
| FLF | focus lock is | completed not completed |
| LCF | focusing condition data is | reliable reliable |
| LLF | low luminance (camera shake may occur) non-low luminance | |
| RIHF | release operation is | prohibited permitted |
| AMF | flash stopping mode is | automatic otherwise |
| STF | camera system is | in operation not in operation |

(Data)

Table 4-1 shows the display data to be transferred to the display circuit DSP and the contents of the data. In response to the data transferred from the microcomputer MCB, the display circuit DSP stores the data in the memory (RAM) provided therein, and displays the information indicated by the data by means of a liquid crystal display, an LED, and so on. Supposing that the content of the data AFD is "01", the microcomputer provided in the display circuit DSP actuates the LED provided in a finder (not shown), whereby the photographer knows that an in-focus state has been obtained. On the other hand, if the content of the data AFD is "10", the microcomputer provided in the display circuit DSP flashes the LED, whereby the photographer knows that it is impossible to detect focusing condition. Data AVD showing a control aperture value Avs and data CND indicating the number of exposed frames of a film are indicated by numerals by the liquid crystal display atop the camera body. The information on display data AFD, ALD, AVD, FLD$_1$, FLD$_2$, MOD, and TVD are displayed in the finder. The information on display data AVD, CND, MOD, SVD, and TVD are displayed atop the camera.

TABLE 4-1

| display data | content of indication | | |
|-----|-----|-----|-----|
| AFD | focusing condition | 00 | indication OFF |
| | | 01 | in-focus |
| | | 10 | undetectable |
| ALD | AE lock by AE lock switch ALS | 0 | not AE-locked |
| | | 1 | AE-locked |
| AVD | control aperture value (Av) | | |
| CND | number of exposed frames | | |
| FLD$_1$ | flash information | 00 | indication OFF |
| | | 01 | charge completed |
| | | 10 | flash light is correctly emitted |
| FLD$_2$ | flash information | 00 | indication OFF |
| | | 01 | emission mode |
| | | 10 | non-emission mode |
| | | 11 | being charged |
| MOD | exposure control mode | 00 | P mode |
| | | 01 | S mode |
| | | 10 | A mode |
| | | 11 | M mode |
| SVD | film sensitivity (Sv) | | |
| TVD | control exposure time (Tv) | | |

Table 4-2 shows the data to be transferred to the display circuit FDP provided in the flash emitting device and the contents of the data. Similarly to the display circuit DSP provided in the camera, in response to the data outputted from the microcomputer MCF, the display circuit FDP stores the data in the memory (RAM) provided therein, and displays the information of the data by means of a liquid crystal display. The display portion where the information is displayed is provided on the back side of the flash emitting device. The display data FND and ISD indicate a film sensitivity and a control aperture value both transferred from the camera, respectively. The display data FDD indicates the distance range, an object in the distance range being exposed correctly, calculated depending on an aperture value, a film sensitivity, both transferred from the camera body, and the maximum and minimum emission amount determined by the illumination range of respective photographs. When an illumination range is "automatic", "1" is stored in the most significant bit of the display data FZD and when an illumination range is "manual", (28 mm, 35 mm, 50 mm, 70 mm), "0" is stored therein. Data indicating an illumination range is stored in the low-order three bits of the data FZD.

TABLE 4-2

| display data | content of indication | | |
|-----|-----|-----|-----|
| AMD | flash stopping mode | 10 | manual light amount adjustment |
| | | 01 | automatic emission |
| FDD | the distance range | | |
| FMD | emission mode | 00 | forced emission |
| | | 01 | automatic emission |
| | | 10 | non-emission |
| FND | control aperture value (Av) | | |
| FZD | illumination range | 0*** | automatic |
| | | 1*** | manual |
| | | *001 | 28 mm |
| | | *010 | 35 mm |
| | | *011 | 50 mm |
| | | *100 | 70 mm |
| ISD | film sensitivity (Sv) | | |

Table 5 shows data transferred between the microcomputer MCB and the flash circuit FLC and the contents signified by the data. As shown in the table, the data consist of eight bits. Data CFR$_0$ through CFR$_3$ are transferred from the microcomputer MCB to the flash circuit FLC. Data FCR$_0$ and FCR$_1$ are transferred from the flash circuit FLC to the microcomputer MCB. High-order two bits CFR$_{07}$ and CFR$_{06}$ of the data CFR$_0$ correspond to the exposure control mode register MOR and their contents are the same as the display data MOD (refer to Table 4-1). The most significant bit CFR$_{37}$(SYS) of the data CFR$_3$ is set when the reset switch SRS is turned on (system reset) and reset when the reset switch SRS is OFF. The seventh bit CFR$_{36}$ of the data CFR$_3$ corresponding to the indication signal FDIS is set when the display circuit FDP and the indicator CHD provided in the flash circuit FLC are prohibited from making indications and reset when they are allowed to make indications. The sixth bit CFR$_{35}$(FNS) of the data CFR$_3$ is reset when a flash emission is permitted and set when the flash emission is prohibited. The high-order two bits FCR$_{07,08}$(FMR) of the data FCR$_0$ indicates the flash emission mode. Similarly to the display data FMD shown in Table 4-2, "00" indicates the forced emission mode; "01", automatic emission mode; and "10", non-emission mode. The sixth bit FCR05(RDY) of the data FCR0 is set when the main capacitor MC provided in the flash circuit FLC is charged in a predetermined voltage (300 V). The fifth bit FCR04(OK) of the data CFR0 is set for a given period after a flash emission is stopped according to the flash stopping signal FSTP under the automatic flash stopping mode and reset at other times. The fourth bit FCR03(FON) of the data FCR0 is set when the flash emitting device is operating, i.e., when the flash device is mounted on the camera and the power source therefor is ON.

The low-order six bits of the data CFR0 indicate the ISO sensitivity Sv of a film. The data CFR1 and CFR2 indicate the focal length Fv and the aperture value Av of a photographing lens, respectively. The low-order five bits of the data CFR3 indicates a compensation amount α for an emission amount (described later). The data FCR1 indicates the maximum emission amount Iv of the flash emitting device. The low-order three bits of the data FCR0 are not used (these bits are shown by "*" in the table.)

TABLE 5

| data | 7 | 6 | 5 | 4 | 3 | 2 | 1 | 0 |
|---|---|---|---|---|---|---|---|---|
| CFR0 | MOR | | | | film sensitivity (Av) | | | |
| CFR1 | | | | focal length (Fv) | | | | |
| CFR2 | | | | aperture value (Av) | | | | |
| CFR3 | SYS | FDIS | FNS | | compensation amount of emission amount (α) | | | |
| FCR0 | | FMR | RDY | OK | FON | * | * | * |
| FCR1 | | | | maximum emission amount (Iv) | | | | |

MOR: exposure control mode
SYS: set only in the case of system reset
FDIS: set when the indication made in flash emitting device is prohibited
FNS: set when flash emission is prohibited
FMR: emission mode
RDY: set when the capacitor MC is charged in a predetermined voltage
OK: set when flash light is correctly emitted
FON: set when power source of flash emitting device is ON (Flowchart)

(Microcomputer MCB)

FIGS. 4 through 29 are flowcharts showing the operation (operation of the microcomputer MCB) of the camera system, namely, excluding a flash emitting device, of the embodiment.

(Interruption INT0)

Figure 4:
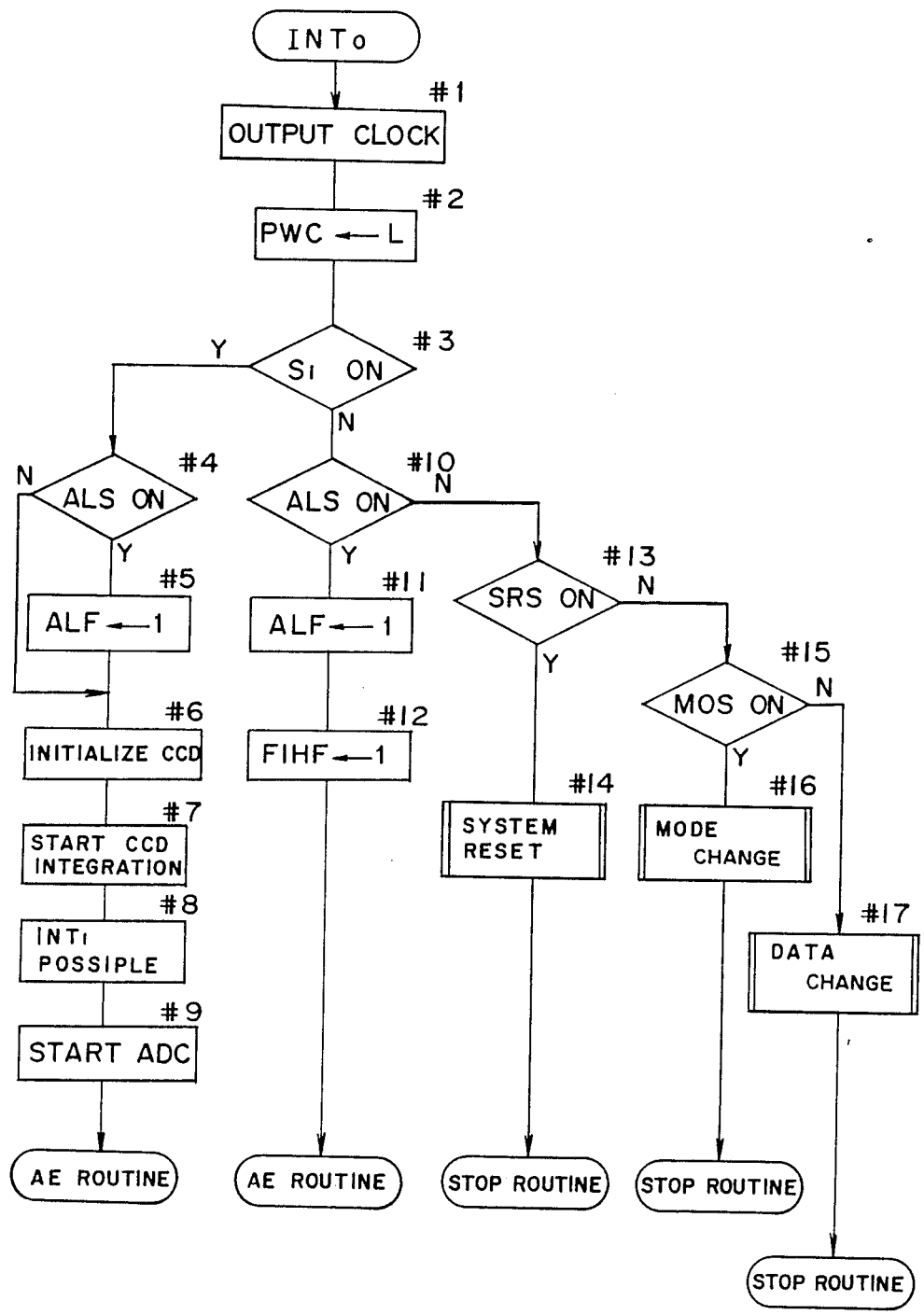
FIG. 4 through FIG. 29 are flowcharts showing the control to be performed by a microcomputer provided in the camera of a camera system which embodies the present invention.

When either of the light measuring switches S1, the AE lock switch ALS, the reset switch SRS, the mode change-over switch MOS, the data setting switches US and DS is turned on, the voltage level of the interruption terminal $\overline{INT_0}$ becomes low and in synchronization of the fall of the signal level, the microcomputer MCB starts its operation in accordance with the flowchart shown in FIG. 4.

First, at step #1, the microcomputer MCB actuates the reference clock generating circuit XB so that the reference clock STCK is outputted from the reference clock outputting terminal STCK. At step #2, the signal level of the power control terminal P5 is set to "L" to operate the DC-to-DC converter circuit VG. At steps #3, #10, #13, and #15, the microcomputer MCB determines which of the switches causes the interruption INT0. If the voltage level of the terminal P6 is "L" at step #3, it is decided that the interruption signal is inputted to the interruption terminal INT0 (hereinafter referred to as the interruption INT0 occurs) due to the operation of the light measuring switch S1, so that the program goes to step #4 and if the voltage level of the terminal P6 is "H" (hereinafter referred to as "terminal P6 is "H" or "L" instead of "the level of the terminal is "H" or "L"), the program goes to step #10. If the terminal P7 is "L" at step #10, it is decided that an interruption INT0 occurs by the operation of the AE lock switch ALS, so that the program goes to step #11, and if the terminal P7 is "H", the program goes to step #13. If the terminal P8 is "L" at step #13, it is decided that an interruption INT0 is caused by the operation of the reset switch SRS, then the program goes to step #14 (subroutine "system reset"), and if the terminal P8 is "H", the program goes to step #15. If the terminal P9 is "L" at step #15, it is determined that an interruption INT0 occurs by the operation of the mode change-over switch MOS, then the program goes to step #16 (subroutine "mode conversion"). If the terminal P9 is "H" at step #15, it is decided that an interruption INT0 is caused by the operation of the data setting switches US or DS and the program goes to step #17 (subroutine "data conversion"). When the program goes to either of subroutines #14, #16, and #17, the program goes to STOP routine after the program returns from the subroutine and the microcomputer MCB waits until an interruption INT0 occurs again.

If an interruption INT0 is caused by the operation of the light measuring switch S1, it is detected at step #4 whether or not the AE lock switch ALS is ON. If the terminal P7 is "L", it is decided that the AE lock switch ALS is ON, so that the program goes to step #5 so as to set the AE lock flag ALF. If the terminal P7 is "H" at step #4, it is decided that the AE lock switch ALS is OFF, then the program skips to step #6. At step #6, the CCD line sensor provided in the light receiving circuit AFD for detecting focusing condition is initialized. At step #7, CCD integration is started and at step #8, an interruption INT1 which occurs when the CCD integration has been completed is allowed. Thereafter, at step #9, the terminal P0 is set to "L" so as to output the light measuring start signal LSTA, to operate the A-D converter provided in the light measuring interface LIF so that the A-D conversion operation is started, then the program goes to step AE routine.

When the interruption INT0 occurs by the operation of the AE lock switch ALS, the AE lock flag ALF is set at step #11. Then, the flag FIHF is set at step #12, thereafter, the program goes to AE routine.

(AE routine)

Figure 5:
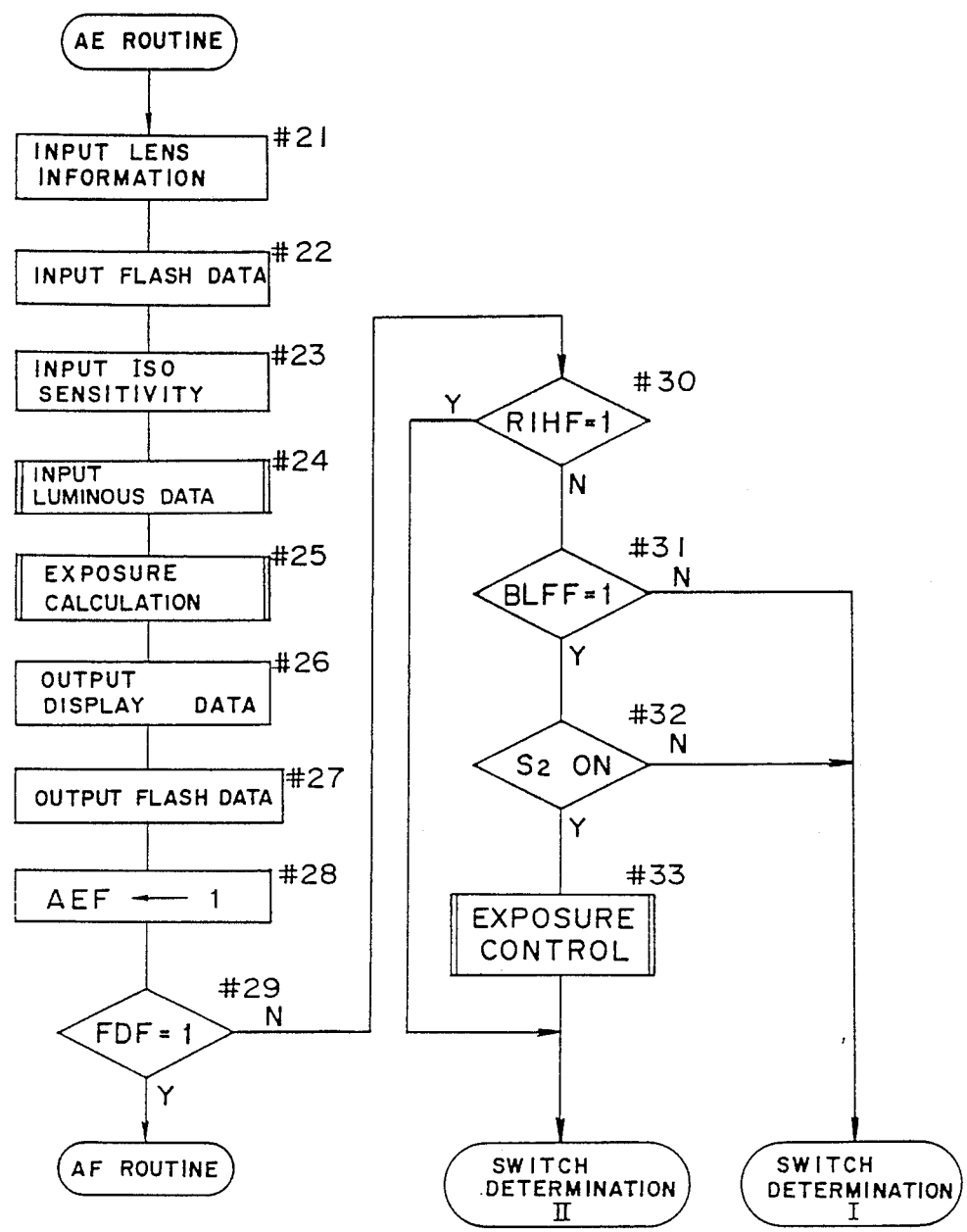

FIG. 5 is a flowchart showing the control to be executed in the AE routine. In this routine, through the serial data bus SDB, at step #21, lens information is inputted from the lens circuit LEC to the microcomputer MCB, then at step #22, flash data FCR0 and FCR1 are inputted from the flash circuit FLC thereto, and at step #23, an ISO sensitivity is inputted from the display circuit DSP thereto. Thereafter, at step #24, data of lights measured by the photodiodes PD0 through PD5 are inputted from the light measuring circuit LMA to the microcomputer MCB through the light measuring interface LIF and the serial data bus SDB. At step #25, an exposure calculation is performed using the above-described data. A subroutine of step #24 (input luminous data) and a subroutine of step #25 (exposure calculation) are described later (refer to FIGS. 12 through 24.)

After the exposure calculation is completed, at step #26, the display data shown in Table 4-1 are outputted to the display circuit DSP through the serial data bus SDB so as to display various photographing data. At step #27 data $CFR_0$ through $CFR_3$ are outputted to the flash circuit FLC through the serial data bus SDB. Then, at step #28, the flag AEF is set. Thereafter, the program goes to step #29.

It is detected at step #29 whether or not an automatic focusing operation (hereinafter referred to as AF operation) is completed. If the flag FDF is set, it is decided that the AF operation has not been completed, so that the program goes to the AF routine. If the flag FDF is reset, it is decided that the AF operation has been completed, then the program goes to step #30. The AF routine is described in detail (refer to FIG. 9.)

Figure 7:
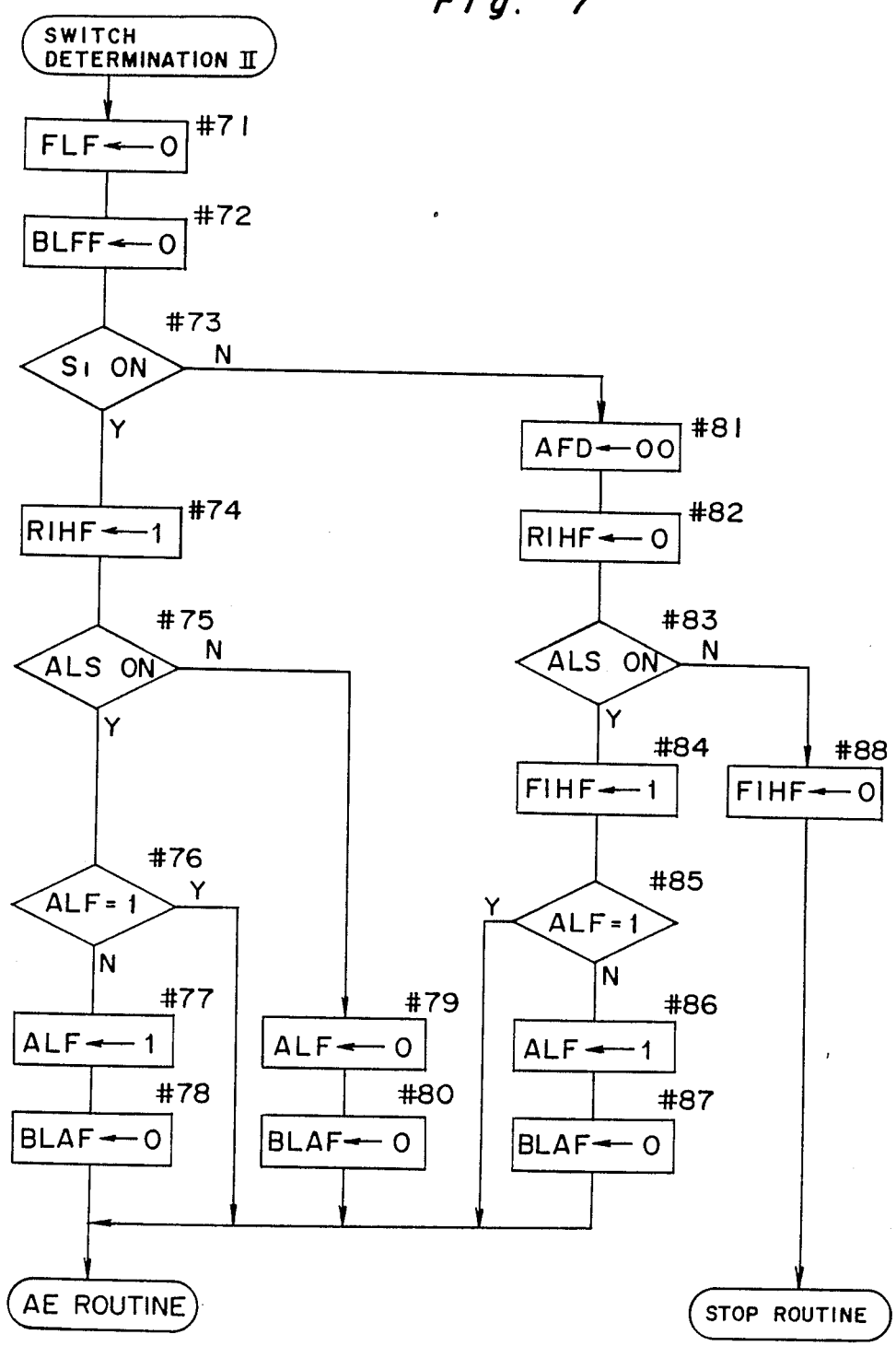

At step #30, it is detected whether or not a shutter release is prohibited. If the release prohibiting flag RIHF is set, it is decided that the shutter release is prohibited, so that the program goes to the switch determining routine II (FIG. 7). If the flag RIHF is reset, it is decided that the shutter release is allowed, so that the program goes to step #31.

It is detected at step #31 whether or not the AE lock is effected in response to the achievement of in-focus state which is described later. If the flag BLFF is set, it is decided that the AE lock is effected in response to the achievement of in-focus state, then the program goes to step #32. If the flag BLFF is not set, the program goes to the switch determining routine I (FIG. 6).

It is detected at step #32 whether or not the shutter release is carried out. If the terminal $P_{12}$ is "L", it is decided that the release button is pressed to the second stroke, i.e., the switch $S_2$ is turned on, so that the program goes to the subroutine "exposure control" (refer to step #33 in FIG. 24). When a photographing has been completed, the program goes to the switch determining routine II (FIG. 7). If the terminal $P_{12}$ is "H" at step #32, it is decided that the release button has not yet been pressed (switch $S_2$ is OFF), so that the program goes to the switch determining routine I (FIG. 6).

(Switch determining routine I)

Figure 6:
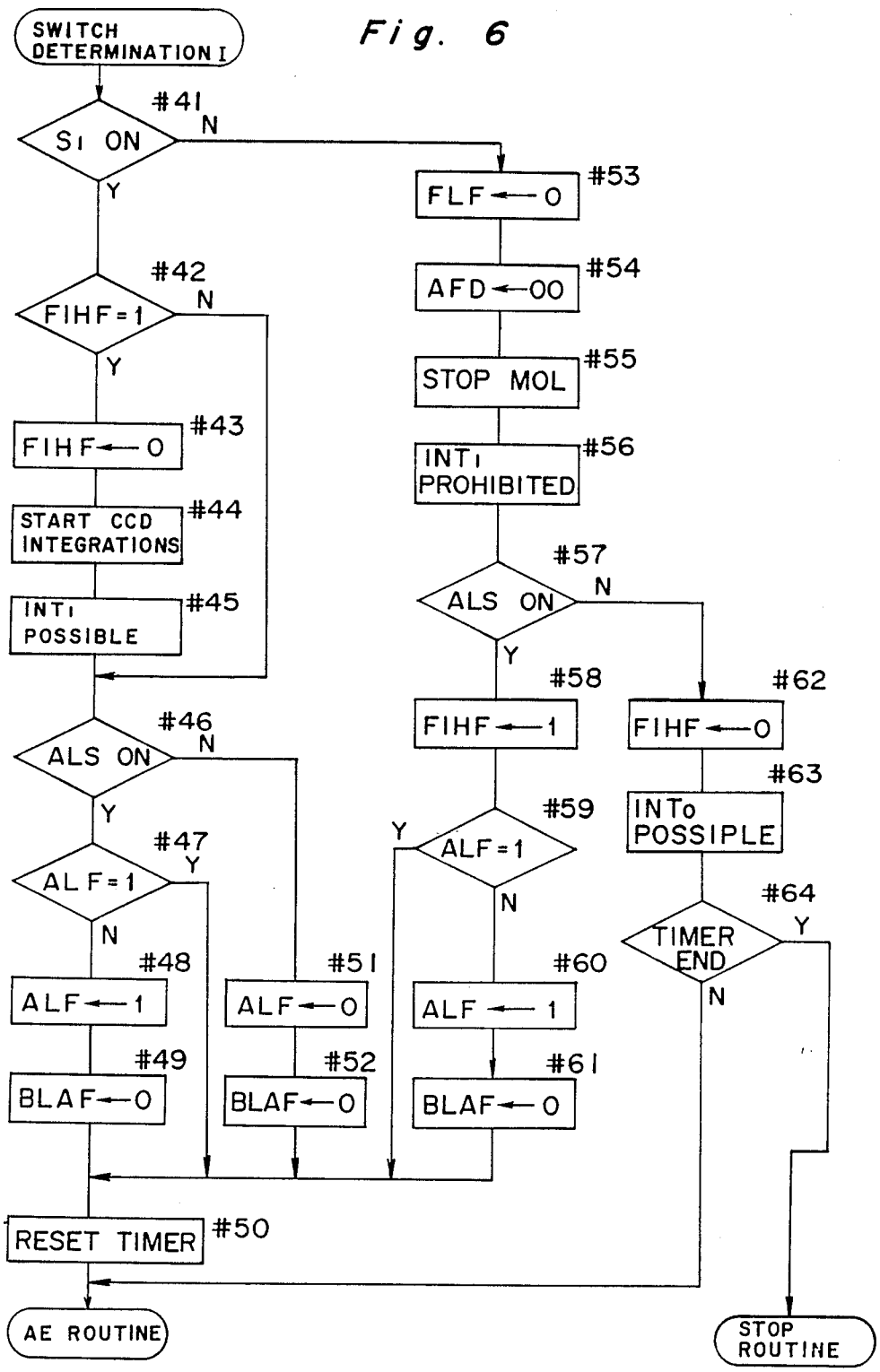

FIG. 6 is a flowchart showing the switch determining routine I. In this routine, first, at step #41, it is detected whether or not the light measuring switch $S_1$ is turned on. If the terminal $P_6$ is "L", it is decided that the switch $S_1$ is ON, then the program goes to step #42. If the terminal $P_6$ is "H", it is decided that the switch $S_1$ is OFF, then the program goes to step #53.

It is detected at step #42 whether or not the focusing condition detecting operation is prohibited. If the flag FIHF is set, it is decided that the focusing condition detecting operation is prohibited. Then, at step #43, the flag FIHF is reset, and the CCD integrations are started at step #44, and at step #45, it is enabled that the completion of the CCD integration causes the interruption $INT_1$. If the flag FIHF is reset at step #42, the program skips to step #46.

It is detected at step #46 whether or not the AE lock switch ALS is ON or OFF. If the terminal $P_7$ is "L", it is decided that the switch ALS is ON, then the program goes to step #47. If the terminal $P_7$ is "H", it is decided that the switch ALS is OFF, then the program goes to step #51.

At step #47, the state of the AE lock flag ALF is detected. If the AE lock flag ALF is set, the program skips to step #50, and if the AE lock flag ALF is reset, the program goes to step #48. The flag ALF is set at step #48, then a flag BLAF, showing that the AE lock has been completed by the AE lock switch ALS, is reset at step #49. Thereafter, the program goes to step #50. At step #50, a timer is reset to start its operation and the program returns to the AE routine (FIG. 5). A light measuring operation, an exposure calculation, and the input/output and indication of data are kept performed until the timer counts a predetermined period (for example, 10 seconds) after both the switch $S_1$ and ALS are turned off.

If the terminal $P_7$ is "H" at step #46, it is decided that the switch ALS is OFF, then at steps #51 and #52, the AE lock flag ALF and the flag BLAF are reset. At step #50, the timer is reset to start its operation, then the program returns to the AE routine (FIG. 5).

If the light measuring switch $S_1$ is OFF at step #41, a flag FIF is reset at step #53. Thereafter, at step #54, "00" is stored in the data AFD so that the indication showing the in-focus state is cleared. At step #55, the lens drive motor MOL is stopped and the interruption $INT_1$ caused by the completion of the CCD integrations is disabled at step #56. Accordingly, if the measuring switch $S_1$ is OFF, a focusing condition detecting operation is not performed. Thereafter, the program goes to steps subsequent to step #57 to execute the processing.

At step #57, it is detected whether the AE lock switch ALS is ON or OFF. If the terminal $P_7$ is "L", it is decided that the switch ALS is ON, then the flag FIHF is set at step #58. Thereafter, the program goes to step #59.

At step #59, the state of the AE lock flag ALF is detected. If the AE lock flag ALF is reset, the AE lock flag is set at step #60, then the flag BLAF, indicating that the AE lock in response to the AE lock switch ALS (hereinafter referred to as manual AE lock) is completed, is reset at step #61. Thereafter, the timer is reset to start its operation at step #50, and then the program returns to the AE routine (FIG. 5). On the other hand, if the AE lock flag ALF is set at step #59, the program skips to step #50 so as to reset the timer for its operation start, thus returning to the AE routine (FIG. 5).

Figure 8:
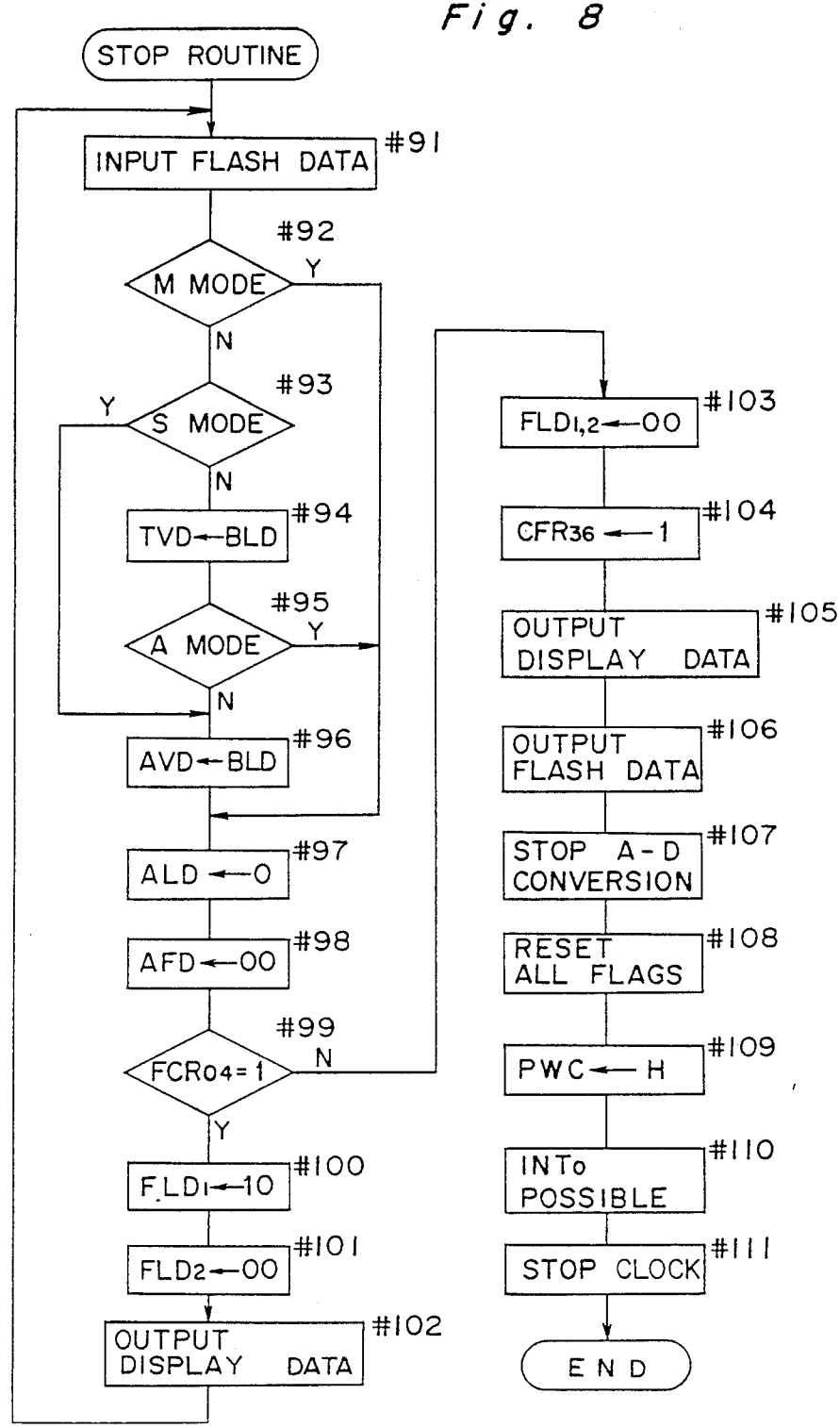

If the terminal $P_7$ is "H" at step #57, it is decided that the AE lock switch ALS is OFF, i.e., both the switches $S_1$ and ALS are OFF. Then, the program goes to step #62. At step #62, the flag FIHF is reset, then at step #63, the interruption $INT_0$ caused by the operations either of the switches $S_1$, ALS, SRS, MOS, US, and DS is allowed. Thereafter, the program goes to step #64. At step #64, as described above, it is detected whether or not the timer has counted the predetermined period (approximately 10 seconds). If the counter has not counted the predetermined period, the program returns to the AE routine so that a light measuring operation, an exposure calculation, and the input/output and indication of data are performed. If the timer has counted the predetermined period, the program goes to the STOP routine (FIG. 8). Then, the microcomputer MCB stops its operation until the interruption $INT_0$ occurs again.

(Switch determining routine II)

FIG. 7 is a flowchart showing the switch determining routine II. As apparent from the AE routine shown in FIG. 5, the microcomputer MCB processes the execution of this routine either when the exposure control is effected by the press of the release button to the second stroke (step #32 to #33) or the shutter release is prohibited at step #30.

First, the flag FLF and the flag BLFF are reset at steps #71 and #72, then it is detected at step #73 whether the light measuring switch $S_1$ is ON or OFF. If the terminal $P_6$ is "L", it is decided that the switch $S_1$ is ON. Then, the program goes to step #74. At step #74, the release prohibiting flag RIHF is set to prohibit subsequent shutter release operations, whereby even though the release button is erroneously kept pressed, a photographing operation is not performed, i.e., films are not wasted.

At step #75, it is detected whether the AE lock switch ALS is ON or OFF. If the terminal $P_7$ is "L", it is decided that the switch ALS is ON. Then, the program goes to step #76. If the terminal $P_7$ is "H", it is decided that the switch ALS is OFF, and then the program goes to step #79.

At step #76, the state of the AE lock flag ALF is detected. If the flag ALF is set, the program returns to the AE routine (FIG. 5). On the other hand, if the flag ALF is reset, the flag ALF is set at step #77. Then, the flag BLAF is reset at step #78, and thereafter, the program returns to the AE routine (FIG. 5).

If the program goes to step #79 after it is decided at step #75 that the AE lock switch ALS is OFF, the AE lock flag ALF and the flag BLAF are reset at steps #79 and #80. Thereafter, the program returns to the AE routine (FIG. 5).

At step #73, if the terminal $P_6$ is "H", it is decided that the light measuring switch $S_1$ is OFF, then, at step #81, "00" is stored in the data AFD to clear the indication showing that the in-focus state has been obtained. Then, the release prohibiting flag RIHF is reset at step #82, and subsequent shutter release operations are allowed, and then the program goes to step #83.

At step #83, the ON or OFF of the AE lock switch ALS is detected. If the terminal $P_7$ is "L", it is decided that the switch ALS is ON, then the flag FIHF is set at step #84. Thereafter, the program goes to step #85. If the terminal $P_7$ is "H", it is decided that the switch ALS is OFF, and the flag FIHF is reset at step #88. Thereafter, the program goes to the STOP routine (FIG. 8).

At step #85, the state of the AE lock flag ALF is detected. If the flag ALF is set, the program returns to the AE routine (FIG. 5). On the other hand, if the flag ALF is reset, the flag ALF is set at step #86 and the flag BLAF is reset at step #87. Then, the program returns to the AE routine (FIG. 5).

There is a case in which the AE lock switch ALS is turned on during the processings of the AE routine, the switch determining routine I, and the switch determining routine II. There is also a case in which after the AE lock switch ALS is turned off to unlock the AE lock, and then, the AE lock switch ALS is turned on to perform the AE lock. Under the AE lock mode, it is necessary to lock the value of a light measured at the time when the AE lock switch ALS is turned on. In this camera system, when the above-described two cases are detected (steps #47, #58, #76, #85), the flag BLAF indicating that the manual AE lock has been completed is reset (steps #49, #60, #78, #87) to lock a value of a light measured immediately after the flag BLAF is reset. Accordingly, the AE lock can be accurately performed in the above-described two cases.

(STOP routine)

FIG. 8 is a flowchart showing the STOP routine. In this routine, the data $FCR_0$ and $FCR_1$ are transmitted from the flash circuit FLC to the microcomputer MCB at step #91.

Next, the exposure control mode of the camera system is detected. First of all, it is detected whether or not the exposure control mode is (M) mode at step #92. If the content of the exposure control register MOR is "11", it is decided that the exposure control mode is (M) mode. Then, the program skips to step #97. If it is decided at step #92 that the exposure control mode is not (M) mode, it is then detected at step #93 whether the exposure control mode is (S) mode or not. If the content of the register MOR is "01", it is decided that the exposure control mode is (S) mode. Then, the program skips to step #96. If it is decided at step #93 that the exposure control mode is not (S) mode (that is, if it is decided that the exposure control mode is neither (M) mode nor (S) mode), at step #94, a blank indication data BLD is stored in an indication data TVD to clear the indication of the control exposure time Tv. It is detected at step #95 whether or not the exposure control mode is (A) mode. If the content of the register MOR is "10", it is decided that the exposure control mode is (A) mode. Then, the program skips to step #97. If it is decided at step #95 that the exposure control mode is not (A) mode, that is, if it is decided that the exposure control mode is (P) mode, the blank indication data BLD is stored in the indication data AVD to clear the control aperture value Av. Thereafter, the program goes to step #97.

The summary of step #92 through step #96 is as follows: If the exposure control mode is (P) mode, the indications of the control aperture value Av and the control exposure time Tv are cleared. If the exposure control mode is (S) mode, the indication of the control aperture value Av is cleared. If the exposure control mode is (A) mode, the indication of the control exposure time Tv is cleared. If the exposure control mode is (M) mode, the indications of the control aperture value Av and the control exposure time Tv are not cleared. Accordingly, only the aperture value Avs and exposure time Tvs both manually set are indicated, and the calculated aperture value Av and the calculated exposure time Tv are not indicated.

At step #97, "0" is stored in the indication data ALD so as to clear the indication that the AE lock is being carried out. Then, at step #98, "00" is stored in the indication data AFD to clear the indication that the infocus state has been obtained.

At step #99, it is detected whether or not the flash stopping signal FSTP is outputted from the flash circuit FLC. If the fifth bit $FCR_{04}$ of the data $FCR_0$ outputted from the flash circuit FLC is "1", it is decided that the flash stopping signal FSTP is outputted therefrom. Then, the program goes to step #100. At step #100, "10" is stored in the indication data $FLD_1$ so as to indicate that the flash light has been correctly emitted, then at step #101, "00" is stored in the indication data $FLD_2$ so as to clear the indication showing other flash information. Then, at step #102, the indication data are outputted from the microcomputer MCB to the display circuit DSP. Upon receipt of the indication data, the display circuit DSP displays the information of the data. Thereafter, the microcomputer MCB executes the processing from step #91.

If the fifth bit $FCR_{04}$ of the data $FCR_0$ outputted from the flash circuit FLC is "0" at step #99, it is decided that the flash stopping signal FSTP is not outputted therefrom. At step #103, "00" is stored in the indication data FLD$_1$ and FLD$_2$ to clear the indications of all the flash information. Then at step #104, the seventh bit CFR$_{36}$ of the data CFR$_3$ is set to stop the display circuit FDP and the indicator CHD provided in the flash circuit FLC from making indications.

Thereafter, at step #105, the microcomputer MCB outputs the indication data to the display circuit DSP through the serial data bus SDB and outputs the flash data CFR$_0$ through CFR$_3$ to the flash circuit FLC at step #106, whereby the information of the indication data is indicated by the display circuit DSP and the operations of the display circuit FDP and the indicator CHD provided in the flash circuit FLC are stopped.

Thereafter, at step #107, an "H" level signal is outputted (hereinafter referred to as "H" or "L" is outputted) from the terminal P$_0$ so as to clear the A-D conversion start signal LSTA, and to stop the operation of the A-D converter provided in the light measuring interface LIF. After all the flags are reset at step #108, "H" is outputted, at step #109, from the power control terminal P$_5$ to stop the operation of the DC-to-DC converter VG, which stops the operations of the AF interface AIF, the light receiving circuit AFD for detecting focusing condition, the light measuring interface LIF, the light measuring circuit LMA, the flash light measuring circuit LMF, the lens circuit LEC, the drive circuit DDR, and the encoders ENAP and the ENLE. Thereafter, at step #110, the microcomputer MCB allows the interruption INT$_0$, and at step #111, the output of the reference clock STCK and the operation of the reference clock generating circuit XB are stopped. Then, the microcomputer MCB waits until the interruption INT$_0$ is caused again by either of the switches S$_1$, ALS, SRS, MOS, US, and DS.

(Interruption INT$_1$)

Figure 9:
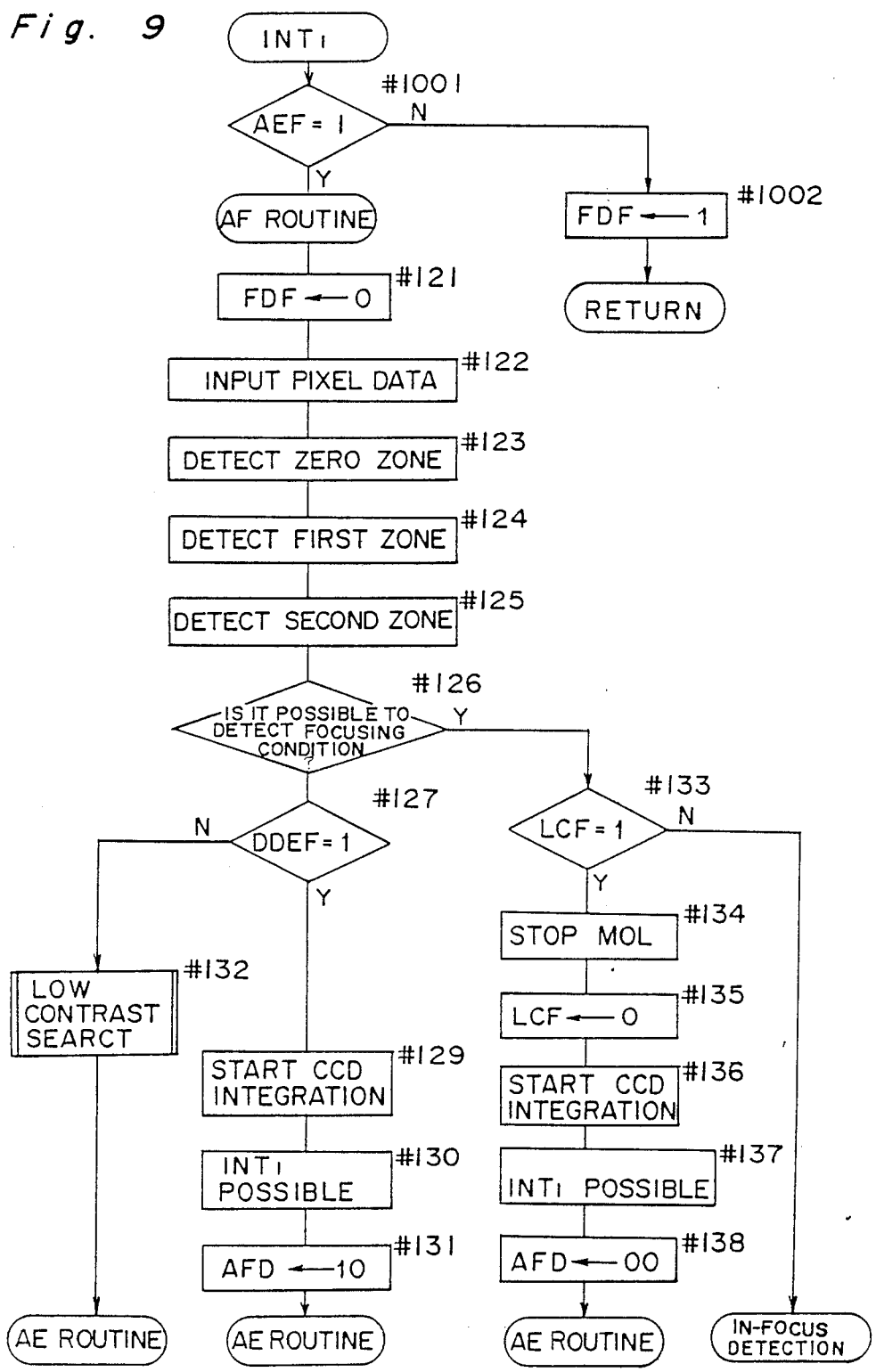

FIG. 9 is a flowchart showing the processing to be executed after the interruption INT$_1$ occurs due to the completion of the CCD integration of the line sensors ISL$_0$, ISL$_1$, ISL$_2$ provided in the light receiving circuit AFD for detecting focusing condition.

As previously described, upon completion of the CCD integration of the line sensors ISL$_0$, ISL$_1$, ISL$_2$, the AF interface AIF outputs an "L" level signal indicative of an integration completion to the terminal INT$_1$ of the microcomputer MCB, whereby the microcomputer MCB operates according to the flowchart shown in FIG. 9.

First, at step #1001, it is detected whether or not an exposure calculation is completed. If the flag AEF is set, it is decided that the exposure calculation is completed, then the program goes to step #121 (AF routine). If the flag AEF is reset, it is decided that the exposure calculation has not yet been completed, then the program goes to step #1002. At step #1002, the flag FDF is set and then the program returns to the step at which the processing is executed when the interruption INT$_1$ occurs. This is to perform the operation for an exposure control and make a data indication. After light measuring, calculations, and indication operations are performed, the program immediately returns to the AF routine (see step #29 in FIG. 5).

(AF routine)

Next, the AF routine is described hereinbelow.

First, the flag FDF is reset at step #121. Thereafter, at step #122, the data of the pixels of the CCD line sensors ISL$_0$, ISL$_1$, and ISL$_2$ are inputted to the microcomputer MCB. Based on these data, the detection of the in-focus states of the zero zone, the first zone, and the second zone and the detection of a defocus direction, and the calculation of the defocus amount are performed at steps #123, #124, and #125. Then it is examined at step #126 whether or not it is possible to detect focusing condition. If the detection of the focusing condition is possible in at least one of the three zones, the program goes to step #133. If it is impossible to detect the focusing condition in any one of the three zones, the program goes to step #127.

At step #127, it is detected whether or not a low contrast search has been effected. If the flag DDEF is reset, it is decided that the low contrast search has not been carried out. Then, the program goes to step #132 so as to carry out a low contrast search. On the other hand, if the flag DDEF is set, it is decided that the low contrast search is completed. Then, the program goes to step #129. At step #129, the CCD integrations are resumed, and the interruption INT$_1$ is allowed at step #130. Then at step #131, "10" is stored in the indication data AFD to warn the photographer that it is impossible to detect focusing condition. Then, the program goes to AE routine (FIG. 5). Accordingly, once the low contrast search is made, no low contrast searches are performed any more. When the low contrast search is carried out at step #132, the program goes to the AE routine when the low contrast search has been completed.

Figure 10:
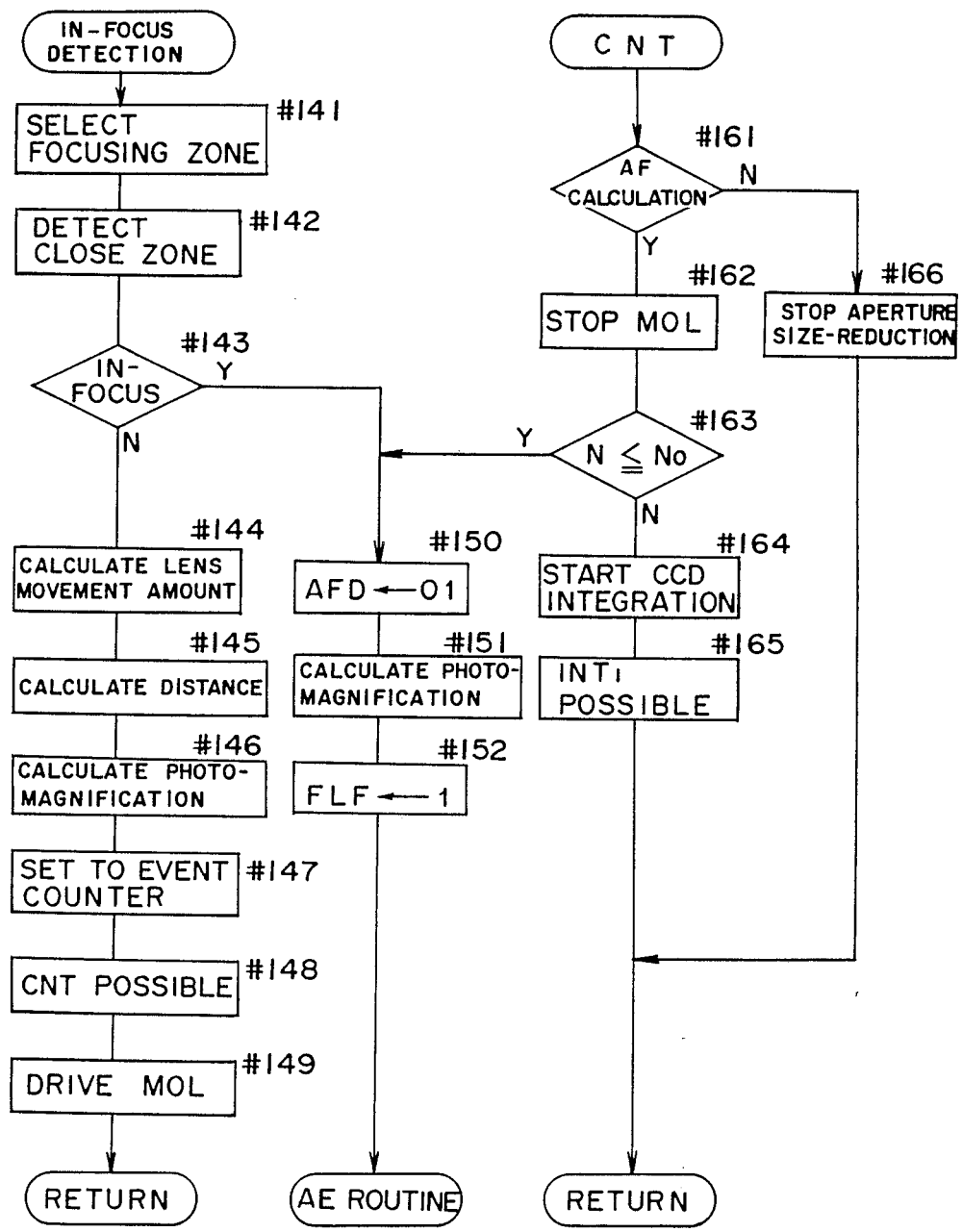

At step #126, if the program goes to step #133 because there is a zone where focusing condition can be detected, it is detected whether or not the low contrast search is being performed. If the low contrast flag LCF is reset, it is decided that the low contrast search is not being performed, so that the program goes to the in-focus detection routine (FIG. 10). If the flag LCF is set at step #133, it is decided that the low contrast search is being performed. Then, the program goes to step #134.

At step #134, the lens drive motor MOL is stopped, and the low contrast flag LCF is reset at step #135. As described later, the lens is moving during the low contrast search. Therefore, when the lens drive motor MOL is stopped at step #134, the in-focus state, the defocus direction, and defocus amount found according to the pixels of the CCD line sensors ISL$_0$, ISL$_1$, ISL$_2$ do not correspond to the actual lens position, so that the above-described data are not reliable. Therefore, at step #136, the CCD integrations are resumed with the lens position fixed and the interruption INT$_1$ is allowed at step #137. Then, the program goes to the AE routine so that the pixel data outputted from the CCD line sensors can be obtained. If a warning indicating that a focusing condition cannot be detected is indicated, at step #138, "00" is stored in the indication data AFD to clear the warning indication. Then, the program goes to the AE routine (FIG. 5).

(In-focus detection and interruption CNT)

FIG. 10 is a flowchart showing the in-focus detection routine and the processing to be executed when the counter interruption CNT occurs. In the in-focus detection routine, focusing condition detecting operations and infocus determining operations are performed.

When the program goes to the in-focus detection routine, at step #141, a zone for focusing (hereinafter referred to as main zone) is selected from the zero through the second zone. In principle, a zone in which an object nearest the photographing lens is disposed (a zone in which the amount of a rear focus is maximum) is selected as the main zone. Needless to say, if there is only one zone where focusing condition can be detected, the zone is adopted as the main zone. The method for selecting a zone is disclosed in U.S. patent application Ser. No. 196,254 the present applicant previously proposed.

Thereafter, it is detected at step #142 whether or not zones except the main zone are adjacent zones. That is, it is detected whether or not there are objects (hereinafter referred to as adjacent object) which are close to the object (hereinafter referred to as main object) located in the main zone selected at step #141. The adjacent object herein means in principle the same object as the main object. If the defocus amount of an object with respect to the main object is less than a predetermined value (80 μm in this embodiment), it is decided that the object is an adjacent object.

Specifically, in a portrait (photographing magnification $\beta = 1/10$) in which a face is photographed as large as possible, if the difference of photographing distance between two objects is less than 2 cm (about the height of the nose), it is decided that the objects are adjacent objects. In a portrait ($\beta = \frac{1}{4}$) in which a person is photographed widthwise from his face to waist, if the difference of photographing distance between two objects is less than 14 cm (about the height between the top of the nose and the ear), it is decided that the objects are adjacent objects. In a photograph (photographing magnification $\beta = 1/100$) in which several men are photographed, if the difference of photographing distance between two objects is less than 95 cm (about depth between a person's face in the front row and a person's face in the rear row), it is decided that objects located in this range are adjacent objects.

The microcomputer MCB stores the data of the main zone and the adjacent zone(s) in which adjacent objects are present, and as described later, selects a light measuring calculation based on these data.

Next, at step #143, it is decided whether or not the object image located within the main zone selected at step #141 is in focus. If the object image is not in focus, at step #144, a lens movement amount is calculated according to the defocus amount. Thereafter, the photographing distance (D) as well as the photographing magnification $\beta$ are calculated at steps #145 and #146.

The methods for calculating the photographing distance (D) and the photographing magnification $\beta$ are described hereinbelow.

Assuming that the lens drive amount is N and the defocus amount is DF, the following relationship is established.

$$N = K \times DF \quad (1)$$

where K is a constant called a conversion coefficient, which varies depending on lenses. The conversion coefficient (K) is outputted from the lens drive circuit LEC to the microcomputer MCB. The conversion coefficient (K) is described in detail, for example, in Japanese Patent Laid-Open Publication No. 142528/1984. The photographing distance $D_0$ is expressed as follows, which is well known.

$$D_0 = k/n_0 \quad (2)$$

$$k = a \cdot f^2 \quad (3)$$

$n_0$: lens movement amount from a position in which a lens is focused on the infinite point
f: focal length of lens
a: constant The constant (k) and the focal length (f) of the lens are inputted from the lens circuit LEC to the microcomputer MCB. Accordingly, assuming that the photographing distance calculated when a focusing condition is detected is $D_1$, its apex value is $Dv_1$ (inputted from the lens circuit LEC), and the lens movement amount from the position in which the lens is focused on the infinite point to the present position is $n_1$, the following relationship is established:

$$Dv_1 = 2\log_2 D_1 \quad (4)$$

$$D_1 = k/n_1 \quad (5)$$

The lens movement amount to focus is expressed by the equation (1). Accordingly, the lens movement amount $n_2$ from the position at which the lens is focused on the infinite point to the in-focus position is expressed as follows:

$$n_2 = n_1 \pm N \quad (6)$$

where (+) of (±) means a front focus and (−) means a rear focus. Accordingly, the photographing distance (D) at the in-focus position, namely, the photographing distance (D) of the main object is expressed as follows from the equation (2):

$$D = k/n_2 \quad (7)$$

The apex value Dv is expressed as follows similarly to the equation (4):

$$Dv = 2\log_2 D \quad (8)$$

The photographing magnification $\beta$ can be found from the following equation:

$$\beta = f/D \quad (9)$$

Thereafter, the pulse number (N) corresponding to the lens movement amount found at step #144 is set to an event counter at step #147 and the counter interruption CNT is allowed at step #148. As described later, since "L" is outputted from the terminal $P_{15}$, the pulse outputted from the encoder ENLE can be inputted to the terminal CNT. The microcomputer MCB transmits data to the drive circuit DDR at step #149, the circuit DDR drives the lens drive motor MOL to drive the lens. Thereafter, the program returns to the step at which the interruption $INT_1$ occurs. If it is decided at step #29 in the AE routine (FIG. 5) that the AF operation has not been completed and then the program goes to AF routine, the program returns to the AE routine, and the processings are executed from step #21.

In a camera system in which only the constant (k) is inputted from the lens circuit LEC and the photographing distance Dv at the time when focus condition is detected is not inputted, as described in Japanese Patent Laid-Open Publication No. 150921/1983, a counter for monitoring the lens movement amount from the position at which the lens is focused on the infinite point to the present position may be provided so that the lens movement amount $n_2 = n_1 \pm N$ (where $n_1$ means the present count value of the counter) from a position at which the lens is focused on the infinite point to the in-focus position is found and the photographing distance (D) of the main object is found based on the lens drive amount $n_2$.

When it is decided at step #143 that an object image located in the main zone is focused, i.e., when it is decided that the defocus amount of an object located in the main zone is less than a predetermined value (for example, 30 μm), the program goes to step #150, and "01" is stored in the indication data AFD to make the display circuit DSP display that the in-focus state is obtained. Thereafter, the microcomputer MCB calculates at step #151 the photographing magnification β based on the distance information (D) outputted from the lens circuit LEC when focusing condition is detected (or the distance information $D_1$ calculated according to the lens movement amount $n_1$ from the position at which the lens is focused on the infinite point to the position where focusing condition is detected and the constant (k)) and the information of the focal length (f). Then, the focus lock flag FLF is set at step #152, and the program goes to the AE routine (FIG. 5). Therefore, if an in-focus state is obtained, the CCD integrations are not performed any longer and microcomputer MCB does not allow the interruption $INT_1$, so that the program goes to the AE routine.

Next, the counter interruption CNT is described hereinbelow.

When the number of pulses, inputted to the terminal CNT, counted by the event counter provided in the microcomputer MCB has reached a predetermined number, the event counter causes an interruption CNT, whereby processing is executed from step #161. First, it is decided whether the interruption CNT is caused during the stopping down or while the AF operation is being carried out. That is, it is detected whether the pulse inputted to the terminal CNT is outputted from the encoder ENAP or the encoder ENLE.

If the terminal $P_{15}$ is "H", it is decided that the pulse is outputted from the encoder ENAP, i.e., the stopping down operation is being performed, then the program goes to step #166 at which data is transferred to the drive circuit DDR so that the magnets APM are repelled, whereby the stopping down operation is stopped. Then, the program returns to the step at which the processing is executed when the interruption CNT occurs.

If the terminal $P_{15}$ is "L", it is decided that the pulse is outputted from the encoder ENLE, that is, it is decided that the AF operation is being performed. Then the program goes to step #162 at which data is transferred to the drive circuit DDR to stop the lens drive motor MOL. Thereafter, the program goes to step #163.

It is decided at step #163 whether or not the lens movement amount (N) is greater than the predetermined value $N_0$. If the lens movement amount (N) is larger, it means that when a defocus amount is calculate at step #144, the defocus amount is large, which causes the image to be blurred. Accordingly, there is a possibility that the defocus amount measured in this case includes an error, so that this amount is not reliable. In order to overcome this problem, according to the embodiment, if the lens movement amount (N) is greater than the predetermined value $N_0$, the CCD integrations are resumed at step #164 and the interruption $INT_1$ is enabled at step #165 so that it is confirmed whether or not an in-focus state is obtained, whereby the AF accuracy can be improved. After the interruption $INT_1$ is allowed at step #165, the program returns to the step at which the processing of the interruption CNT occurs.

If it is decided at step #163 that the lens movement amount (N) is less than or equal to the predetermined value $N_0$, the program goes to step #150 without checking the in-focus state by deciding that there is no error in the calculated defocus amount, namely, it is reliable, and then above-described processings (step #150 through #152) are performed. Then, the program goes to the AE routine (FIG. 5).

As previously described, when the in-focus state is obtained, the program goes to the AE routine without performing the CCD integrations and allowing the interruption $INT_1$. Therefore, the program no longer goes to the AF routine (FIG. 9). That is, once the in-focus state is obtained, the AF operation is not performed until the interruption $INT_1$ is allowed at step #8 after the interruption $INT_0$ occurs with the light measuring switch $S_1$ turned off, then turned on, and the CCD integrations are started at step #7. In other words, a so-called focus lock is effected with the light measuring switch $S_1$ being ON. That is, according to the camera system of the embodiment, a one-shot AF operation is accomplished.

(Low contrast search)

Figure 11:
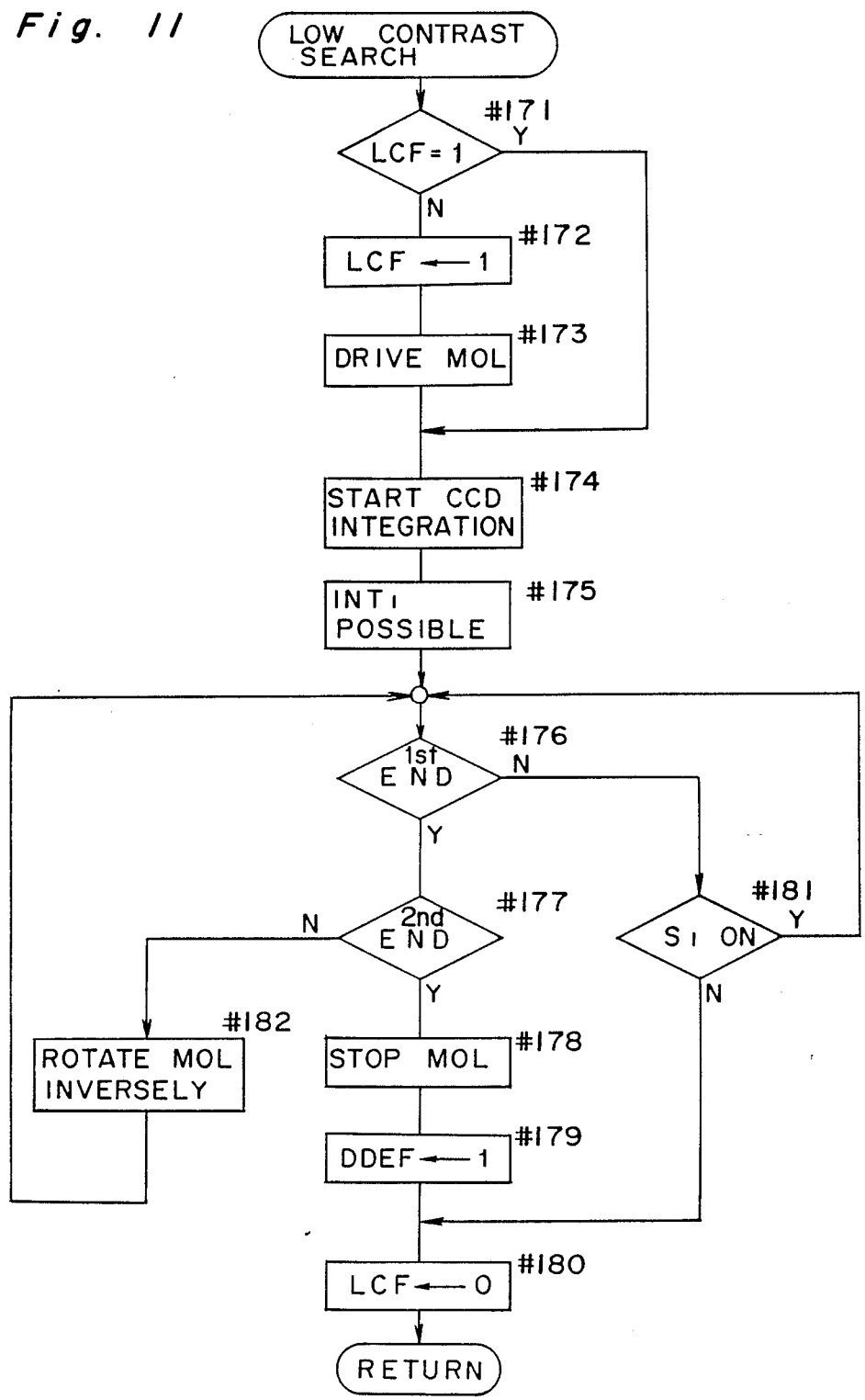

FIG. 11 is a flowchart showing the subroutine "low contrast search". In this subroutine, it is decided at step #171 whether or not a low contrast search is being executed. If the low contrast flag LCF is reset, it is decided that the low contrast search has not been carried out, then the C program goes to step #172. Thereafter, the flag LCF is set, then data is outputted to the drive circuit DDR to drive the lens drive motor MOL, whereby the low contrast search operation is started at step #173. On the other hand, if the flag LCF is set at step #171, it is decided that the low contrast search is being executed, then the program skips to step #174.

At step #174, the CCD integrations are started, and at step #175, the interruption $INT_1$ is allowed due to the completion of the CCD integrations.

Thereafter, it is decided at step #176 whether or not the lens has reached the end of its movable range. This decision is made by detecting whether or not a pulse is inputted to the terminal CNT within a certain period. When the lens reaches the end of its movable range, the lens is not allowed to move further. Therefore, a pulse is not outputted from the encoder ENLE, i.e., if a pulse is not inputted to the terminal CNT within a certain period, it is decided that the lens has reached the end of its movable range. A switch which is turned on or off when the lens has reached the end of its movable range may be provided according to which it can be detected whether or not the lens has reached the end of its movable range.

If it is decided at step #176 that the lens has not reached the end of its movable range, the program goes to step #181 at which the ON or OFF of the light measuring switch $S_1$ is checked. If "L" is inputted to the terminal $P_6$, it is decided that the switch $S_1$ is ON, then the program returns to step #176. If "H" is inputted to the terminal $P_6$, it is decided that the switch $S_1$ is OFF. Then, the program goes to step #180.

If it is decided at step #176 that the lens has reached the end of its movable range, the program goes to step #177. At step S177, it is detected whether or not the lens has moved the end of its movable range either once or twice. If it is detected that the lens has reached the end of its movable range for the first time, the program goes to step #182 at which data is outputted to the drive circuit DDR so as to rotate the lens drive motor MOL reversely. Then, the program returns to step #176 so that the low contrast search is performed in the reverse direction. If it is decided at step #177 that the lens has reached the end of its movable range for the second time, data is outputted to the drive circuit DDR to stop the lens drive motor MOL at step #178.

The above-described operation is briefly described as follows: The low contrast search is executed with the lens moved in a direction (for example, to the closest direction) from the current position. If an in-focus position cannot be detected before the lens reaches the end of its movable range, the lens is moved in the opposite direction (for example, distant direction) so as to execute the low contrast search of the region between the initial position and the other end (for example, the position at which the lens is focused on the infinity point), whereby the low contrast search can be executed in the entire movable range. If, as a result of the low contrast search, the lens reaches the other end (for example, the position at which the lens is focused on the infinity point) of its movable range without obtaining a position at which focusing condition can be detected, the lens is stopped from being driven and the low contrast search is terminated.

When the lens drive motor is stopped at step #178, the flag DDEF is set at step #179 so as to memorize that the low contrast search has been made, and a low contrast flag LCF is reset at step #180 as so to indicate that the low contrast search has not been executed. Then, the program returns to the AF routine (FIG. 9).

(Subroutine in AE routine)

Next, the subroutine (FIG. 12 through FIG. 24) in the AE routine are described hereinbelow.

(Input of luminous data)

Figure 12:
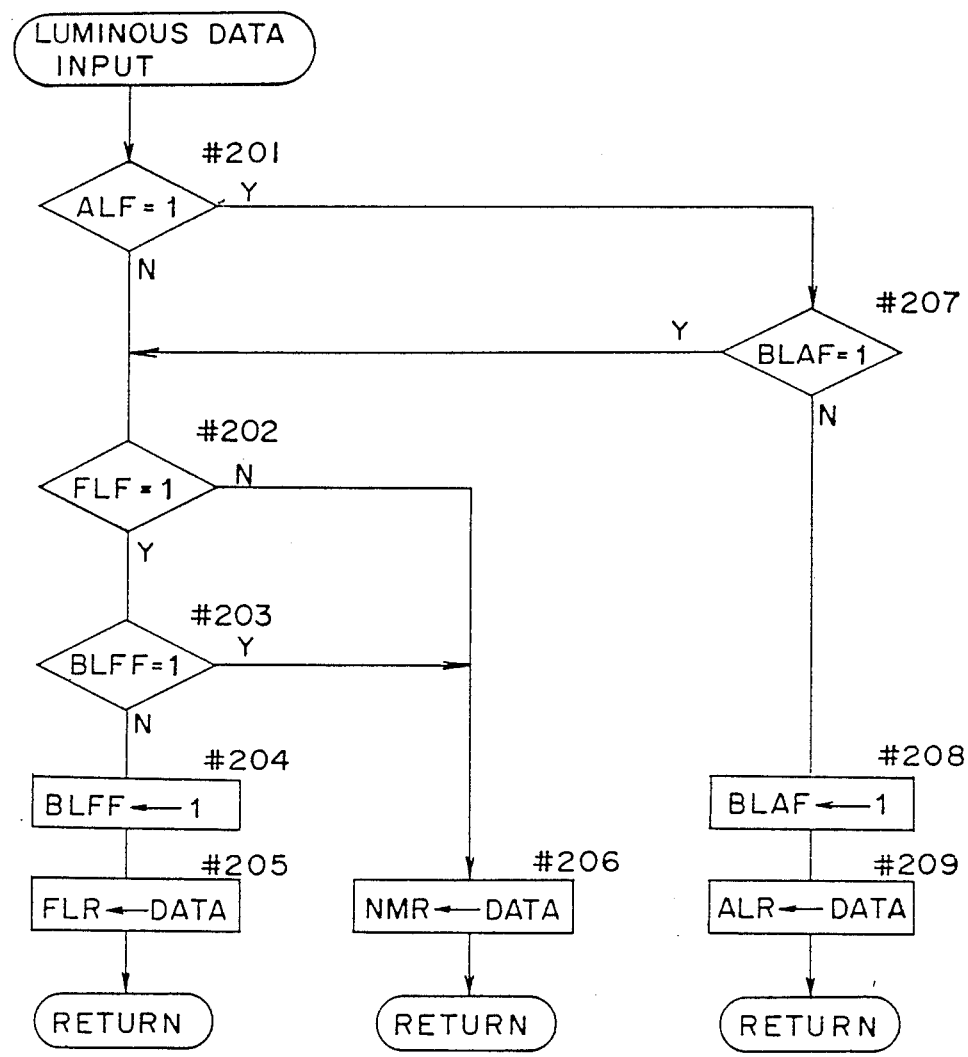

FIG. 12 is a flowchart showing the subroutine "input of luminous data" (step #24) in the AE routine. In this subroutine, values of measured lights which have entered the photodiodes $PD_0$ through $PD_5$ are inputted to the input/output terminal $SIO_0$ of the microcomputer MCB through the light measuring interface LIF and the serial data bus SDB, and the values of the measured lights are stored in three registers FLR, NMR, and ALR according to the state (for example, AE lock) when it is inputted to the microcomputer MCB.

First, it is detected at step #201 whether or not the AE lock switch ALS is ON. If the AE lock flag ALF is set, it is decided at that the AE lock switch ALS is ON, then the program goes to step #207. If the flag ALF is reset, it is decided that the AE lock switch ALS is not ON, then the program goes to step #202. If the flag BLAF is set at step #207, it is decided that the AE lock is completed, and the program goes to step #202. It is detected at step #202 whether or not a focus lock is completed. If the focus lock flag FLF is set, it is decided that the focus lock is completed, so that the program goes to step #203. If the focus lock flag FLF is reset, it is decided that the focus lock is not completed, then the program goes to step #206.

It is detected at step #203 whether or not the AE lock, which is performed when the in-focus state is detected, is completed. If the flag BLFF is set, it is decided that the AE lock, which is performed when the in-focus state is detected, is completed. Then, the program goes to step #206. If the flag BLFF is reset, it is decided that the AE lock is not completed, then the program goes to C. step #204.

At step #204, the flag BLFF is set to indicate that the AE lock, which is performed when the in-focus state is detected, is completed and the values of measured lights are stored in the focus AE lock register FLR, then the program returns to the AE routine (step #25 in FIG. 5).

At step #206, the measured values of the lights are stored in a normal register NMR, then the program returns to the AE routine (step #25 in FIG. 5).

If it is decided at step #207 that AE lock is not completed by the AE lock switch ALS, the program goes to step #208 at which the flag BLAF is set to indicate that the manual AE lock is completed and the values of the measured lights are stored in the AE lock register ALR. Then, the program returns to AE routine (step #25 in FIG. 5).

In these circumstances, the data of measured light is stored in the register ALR immediately after the AE lock switch is turned on, in the register FLR immediately after in-focus condition is obtained, and in the register NMR at other times.

(Exposure calculation)

Figure 13A:
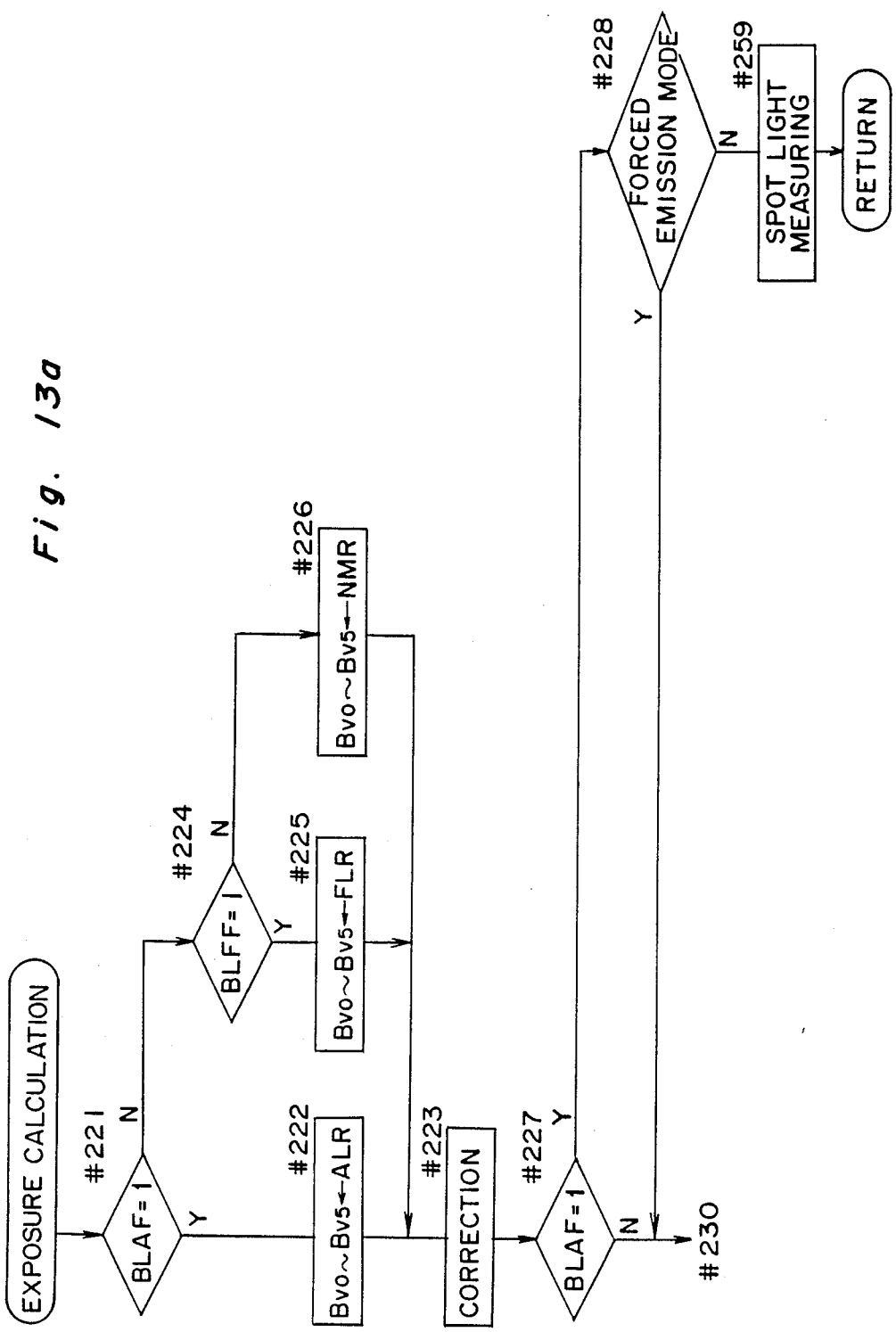
Figure 13B:
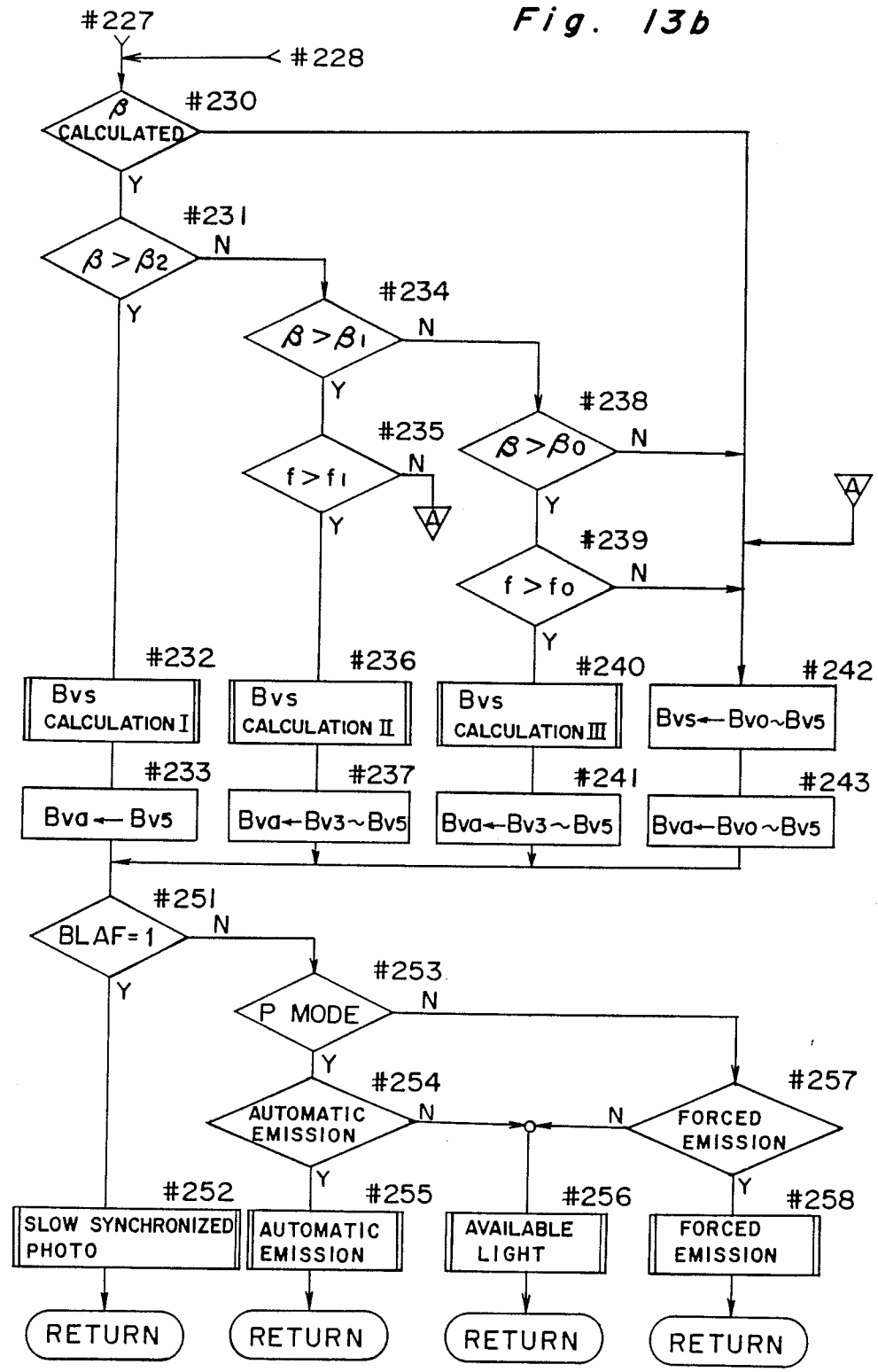

FIGS. 13a and 13b are flowcharts showing the subroutine "exposure calculation" (step #25) in the AE routine (FIG. 5).

In this subroutine, first, it is detected at step #221 whether or not the manual AE lock is made. If the flag BLAF is set, it is decided that the manual AE lock is executed, then the program goes to step #222 at which the values of the measured lights stored in the AE lock register ALR are stored in six registers $Bv_0$ through $Bv_5$. The registers $Bv_0$ through $Bv_5$, respectively, store the values of the light measured by the photodiodes $PD_0$ through $PD_5$.

On the other hand, at step #221, if the flag BLAF is reset, it is decided that the manual AE lock is not executed, so that the program goes to step #224. It is detected at step #224 whether or not the AE lock, which is performed when the in-focus state is detected, is completed. If the flag BLFF is set, it is decided that the AE lock is executed, then the program goes to step #225 at which the measured light values stored in the focus AE lock register FLR are stored in the registers $Bv_0$ through $Bv_5$. If the flag BLFF is reset, it is decided that the AE lock, which is performed when the in-focus state is detected, is not executed, so that the program goes to step #226 at which the measured light values stored in the normal register NMR are stored in the registers $Bv_0$ through $Bv_5$.

When the measured light values are stored in the registers $Bv_0$ through $Bv_5$, the microcomputer MCB corrects measured light values at step #223 on the light receiving area and optical characteristics of the photodiodes $PD_0$ through $PD_5$, the minimum (open) aperture value, an error in luminance measured according to the minimum aperture value (these two values are inputted from the lens circuit LEC.)

As apparent from the foregoing description, according to the camera system in accordance with the embodiment, the manual AE lock is executed prior to other operations.

After the measured light values $Bv_0$ through $Bv_5$ are corrected, it is detected at step #227 whether or not the manual AE lock is executed. If it is decided that the flag BLAF is set, that is, the manual AE lock is executed, the program goes to step #228. At step #228, the emission mode of the flash emitting device is detected and if it is decided that the high-order two bits $FCR_{07}$ and $FCR_{08}$ of the data $FCR_0$ are not "00", i.e., if the flash emitting device is not set to the forced emission mode, the program goes to the subroutine "spot light measuring" (step #259).

If it is decided at step #227 that the manual AE lock is not performed or that the emission mode of the flash device is the forced emission mode at step #228, the processings are executed at steps subsequent to step #230. That is, only when the manual AE lock is executed and the flash emission mode is not the forced emission mode, the program goes to the subroutine "spot light measuring".

As described later, since the forced emission mode is not executed in (P) mode, the spot light measuring can be obtained by operating the AE lock switch ALS in (P) mode.

It is decided at step #230 whether or not the photographing magnification $\beta$ is calculated. If the photographing magnification $\beta$ is calculated, the program goes to step #231 at which a predetermined calculation is performed according to the photographing magnification $\beta$ and the focal length (f) of the photographing lens so as to calculate the luminance Bvs of the main object and the luminance Bva of the background. If the photographing magnification $\beta$ is not calculated, the program goes to step #242 so as to calculate the luminance Bvs of a main object and the luminance Bva of the background.

The program may go from step #230 to #242 only when the photographing lens is not mounted on the camera assuming that the photographing magnification $\beta$ is 1/60 until the photographing magnification $\beta$ is calculated at step #151 of the in-focus detection routine (FIG. 10). At this time, it is detected whether or not the photographing lens is mounted on the camera according to the data outputted from the lens circuit LEC.

At step #231, the photographing magnification $\beta$ is compared with a predetermined magnification $\beta_2$ (for example, 1/40). If $\beta > \beta_2$, the program goes to step #232 at which "Bvs calculation I" is performed to calculate the luminance Bvs of the main object. As described later, in the "Bvs calculation I", the luminance Bvs is calculated on five data of the measured light values of Bv0 through Bv4. Therefore, the luminance Bva of the background can be calculated on the measured light value Bvs at step #233.

If $\beta \leq \beta_2$ at step #231, the program goes to step #234 at which the photographing magnification $\beta$ is compared with a predetermined magnification $\beta_1$ ($\beta_1 < \beta_2$, for example, 1/60). If $\beta > \beta_1$ (that is, $\beta_1 < \beta < \beta_2$), the program goes to step #235. At step #235, the focal length (f) of the photographing lens is compared with a predetermined focal length ($f_1$) (for example 28 mm). If $f > f_1$, the program goes step #236 at which "Bvs calculation II" is performed to calculate the luminance Bvs of the main object. As described later, in the "Bvs calculation II", the luminance Bvs of the main object is calculated on three measured light values Bv0 through Bv2. Accordingly, the luminance Bva of the background can be calculated at step #237 on the measured light values Bv3 through Bv5. If $f \leq f_1$ at step #235, the program goes to step #242.

If $\beta \leq \beta_1$ at step #234, the program goes to step #238 at which the photographing magnification $\beta$ is compared with a predetermined photographing magnification $\beta_0$ ($\beta_0 < \beta_1 < \beta_2$, for example, 1/100). If $\beta > \beta_0$ (namely, $\beta_0 < \beta < \beta_1$), the program goes to step #239. At step #239, the focal length (f) of the photographing lens is compared with a predetermined focal length $f_0$ ($f_0 > f_1$, for example, 50 mm). If $f > f_0$, the program goes to step #240 at which the "Bvs calculation III" is performed to calculate the luminance Bvs of the main object. As described later, in the "Bvs calculation III", the luminance Bvs is calculated on three measured light data Bv0 through Bv2. Therefore, the luminance Bva of the background can be calculated on the measured light values Bv3 through Bv5 at step #241.

If $\beta \leq \beta_0$ at step #238 or $f \leq f_0$ at step #239, the program goes to step #242. At step #242, the luminance Bvs of the main object is calculated on all the measured light values Bv0 through Bv5, and similarly the luminance Bva of the background is calculated on all the measured values Bv0 through Bv5 at step #243. That is, an average light measuring is carried out at steps #242 and #243.

In "Bvs calculation I", "Bvs calculation II", and "Bvs calculation III", as described later, the luminance Bvs of the main object is calculated by performing a weighted mean with predetermined weights (refer to Table 7 through 9) applied to the respective measured values Bv0 through Bv4, but the luminance Bva of the background and the luminance Bvs of the main object to be calculated at step #242 are calculated by an arithmetic mean. That is, at step #233, Bva = Bvs, at steps #237 and #241, Bva = (Bv3 + Bv4 + Bv5)/3, at step #242, Bvs = (Bv0 + Bv1 + Bv2 + Bv3 + Bv4 + Bv5)/6, at step #243, Bva = (Bv0 + Bv1 + Bv2 + Bv3 + Bv4 + Bv5)/6

TABLE 7

|     | first zone | zero zone | second zone |
|-----|------------|-----------|-------------|
| Bv0 | 2          | 2         | 2           |
| Bv1 | 2          | 2         | 1           |
| Bv2 | 1          | 2         | 2           |
| Bv3 | 1          | 1         | 1           |
| Bv4 | 1          | 1         | 1           |

TABLE 8

|     | first zone | | zero zone | second zone | |
|-----|------------|------|-----------|------|------|
|     | 0 far | 0 near |  | 0 near | 0 far |
| Bv0 | 1 | 2 | 2 | 2 | 1 |
| Bv1 | 2 | 2 | 1 | 1 | 0 |
| Bv2 | 0 | 1 | 1 | 2 | 2 |

TABLE 9

|     | first zone | | | zero zone | | | | second zone | | |
|-----|---|---|---|---|---|---|---|---|---|---|
|     |   | 0 n | | 1 n | | 1 f | | 0 n | | |
|     | 0 f | 2 n | 2 f | 2 n | 2 f | 2 n | 2 f | 1 f | 1 n | 0 f |
| Bv0 | 0 | 1 | 1 | 1 | 1 | 1 | 1 | 1 | 1 | 0 |
| Bv2 | 1 | 1 | 1 | 1 | 1 | 0 | 0 | 0 | 1 | 0 |
| Bv2 | 0 | 1 | 0 | 1 | 0 | 1 | 0 | 1 | 1 | 1 | f: far, n: near
i far: object in (i) zone is far from main object
i near: object in (i) zone is near main object
(i = 0, 1, 2)

The method for calculating the luminance Bvs of the main object according to the photographing magnification $\beta$ and the focal length (f) of the photographing lens is shown in Table 6. In Table 6, "Bvs calculation IV" shows the calculation to be performed at step #242.

TABLE 6

|  | photographing magnification β | | |
|---|---|---|---|
|  | $\beta_0$ | $\beta_1$ | $\beta_2$ |
| focal length $f_1$ | IV | IV | IV | I |
| $f_0$ | IV | IV | II | I |
|  | IV | III | II | I |

I: Bvs operation I
II: Bvs operation II
III: Bvs operation III
IV: Bvs operation IV After the luminance Bvs of the main object and the luminance Bva of the background are calculated, the program goes to steps #251 through #258 at which the exposure control values such as the shutter speed Tv the aperture value Av, and the flash emission amount Iv are calculated depending on the luminances Bvs and Bva in accordance with the predetermined calculation.

First, it is decided at step #251 whether or not the manual AE lock is accomplished. If the flag BLAF is set, it is decided that the manual AE lock is executed, so that the program goes to the subroutine "slow synchronized photographing" (step #252). If the flag BLAF is reset, it is decided that the manual AE lock is not effected, then the program goes to step #253. It is detected at step #253 whether or not the exposure control mode is (P) mode. If the content of the exposure control mode register MOR is "00", it is decided that the exposure control mode is (P) mode, so that the program goes to step #254. If the content of the exposure control mode register MOR is not "00", it is decided that the exposure control mode is not (P) mode, then the program goes to step #257. It is detected at step #254 whether or not the flash emission mode is the automatic emission mode. That is, if the content of the emission mode register FMR is "01", it is decided that the flash emitting device is set to the automatic emission mode, so that the program goes to the subroutine "automatic emission" (step #255). If it is not "01", the program goes to the subroutine "available light" (step #256). It is decided at step #257 whether or not the flash emission mode is the forced emission mode. That is, if the content of the emission mode register FMR is "00", it is detected that the flash emitting device is set to the forced emission, so that the program goes to the subroutine "forced emission" (#258). If not, the program goes to the subroutine "available light" (step #256).

In the subroutines of "slow synchronized photographing", "available light", "automatic emission", "forced emission", and "spot light measuring", the exposure control value is calculated according to the respective calculation method, then the program returns to the AE routine (step #27 in FIG. 5).

As described above, the program goes to the subroutine "slow synchronized photographing" only when the manual AE lock is performed and the flash emission mode is the forced emission mode. When the exposure control mode is (P) mode, the program goes either to the subroutine "automatic emission" or to the subroutine "available light" and under the other exposure control modes, the program goes either to the subroutine of "available light" or to "forced emission".

(Bvs calculation)

Figure 14:
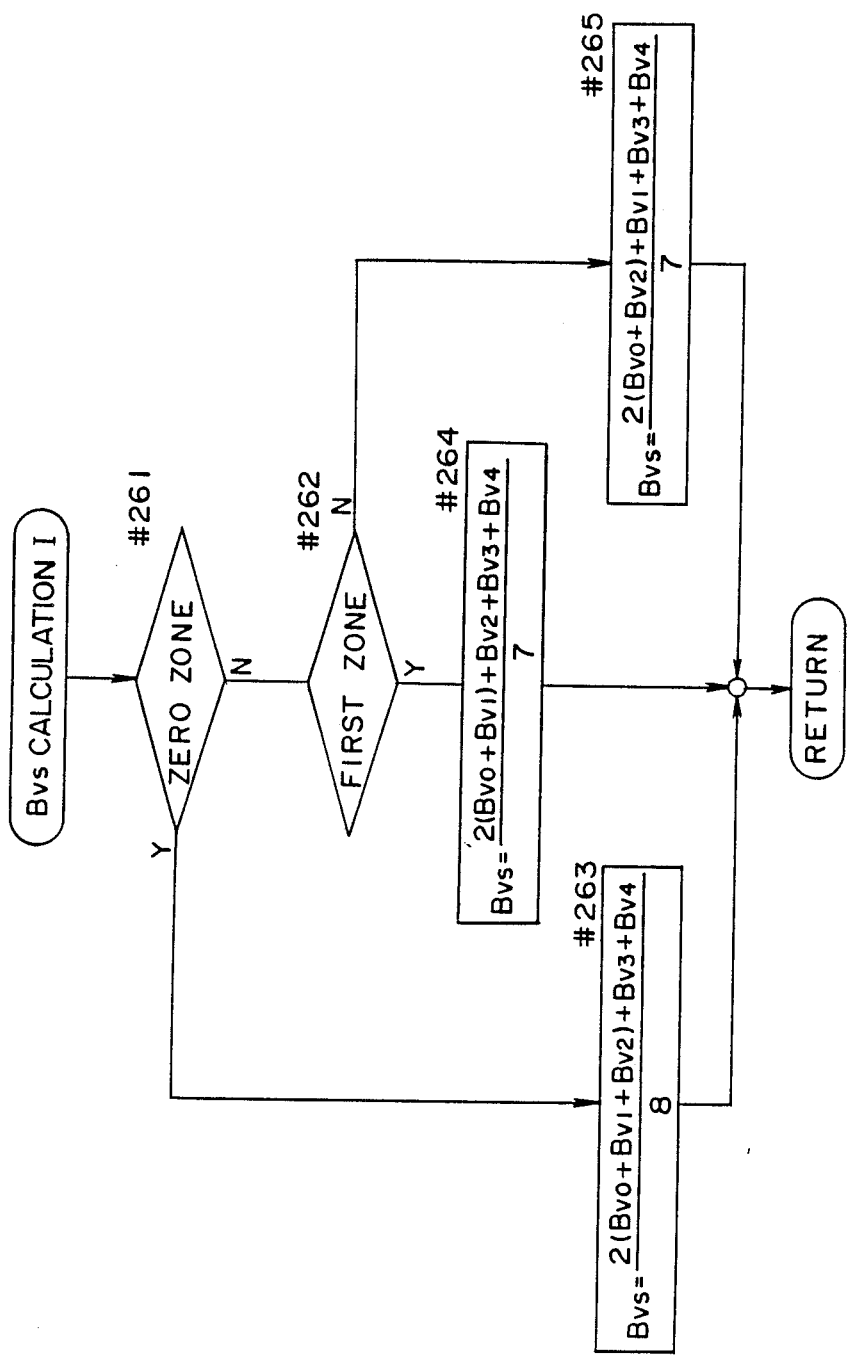

FIG. 14 is a flowchart showing the subroutine "Bvs calculation I". In this routine, the luminance Bvs of the main object is calculated by the weighted mean with weights in Table 7 applied to five measured light data Bv0 through Bv4.

In this routine, first it is decided which of the focusing condition detecting zones 0 through 2 is the main zone. That is, it is detected at steps #261 and #262 which zone is selected at step #141 in the in-focus detection routine (FIG. 10). If it is decided at step #261 that zero zone is the main zone, the program goes to step #263. If it is decided at step #262 that the first zone is the main zone, the program goes to step #264. If it is decided that neither the zero zone nor the first zone is the main zone, that is, if it is decided that the second zone is the main zone, the program goes to step #265.

As previously described, if the photographing magnification β is greater than the predetermined magnification $\beta_2$ (1/40 in this embodiment), for example in "bust shot", the "Bvs calculation I" is processed. Therefore, when the processing of this routine is executed, it is supposed that lights reflected from the main object are incident on most part of the light measuring range LMR (refer to FIG. 2). Accordingly, in this case, the weight of the value of the lights obtained in the light measuring region in the vicinity of the main zone is made to be great and the weights of the measured values of the other light measuring regions are made to be small so as to calculate a weighted mean, which is the luminance Bvs of the main object (the measured value Bv5 of the most outer frame is used to calculate the luminance Bva of the background).

Specifically describing, as shown in Table 7, when the main object is located in the center (zero zone) of the photographing image plane, that is, when the zero zone is the main zone, the luminance Bvs of the main object is calculated by the weighted mean with the weights of the measured light values Bv0, Bv1, and Bv2 of the regions 1, 2, and 3 in the light measuring region LMR in FIG. 2 being 2, and the weights of the measured light values Bv3 and Bv4 of the regions 4 and 5 in the light measuring region LMR in FIG. 2 being 1 (at step #263). That is, $$Bvs = \frac{2(Bv0 + Bv1 + Bv2) + Bv3 + Bv4}{8}.$$

On the other hand, when the main object is located to the left (first zone) to some degree with respect to the center, that is, when the first zone is the main zone, the luminance Bvs of the main object is calculated at step #264 by a weighted mean with the weights of the measured light values Bv0 and Bv1 in the regions 1 and 2 being 2 and with the measured values Bv2, Bv3, and Bv4 in the regions 3, 4, and 5 being 1. That is, $$Bvs = \frac{2(Bv0 + Bv1) + Bv2 + Bv3 + Bv4}{7}.$$

When the main object is located to the right (second zone) to some extent with respect to the center, i.e., when the second zone is the main zone, the luminance Bvs of the main object is calculated in the manner similar to the above (step #265). That is, $$Bvs = \frac{2(Bv0 + Bv2) + Bv1 + Bv3 + Bv4}{7}.$$

When the luminance Bvs of the main object is calculated, the program returns to the subroutine "exposure calculation" (step #233 in FIG. 13).

Figure 15:
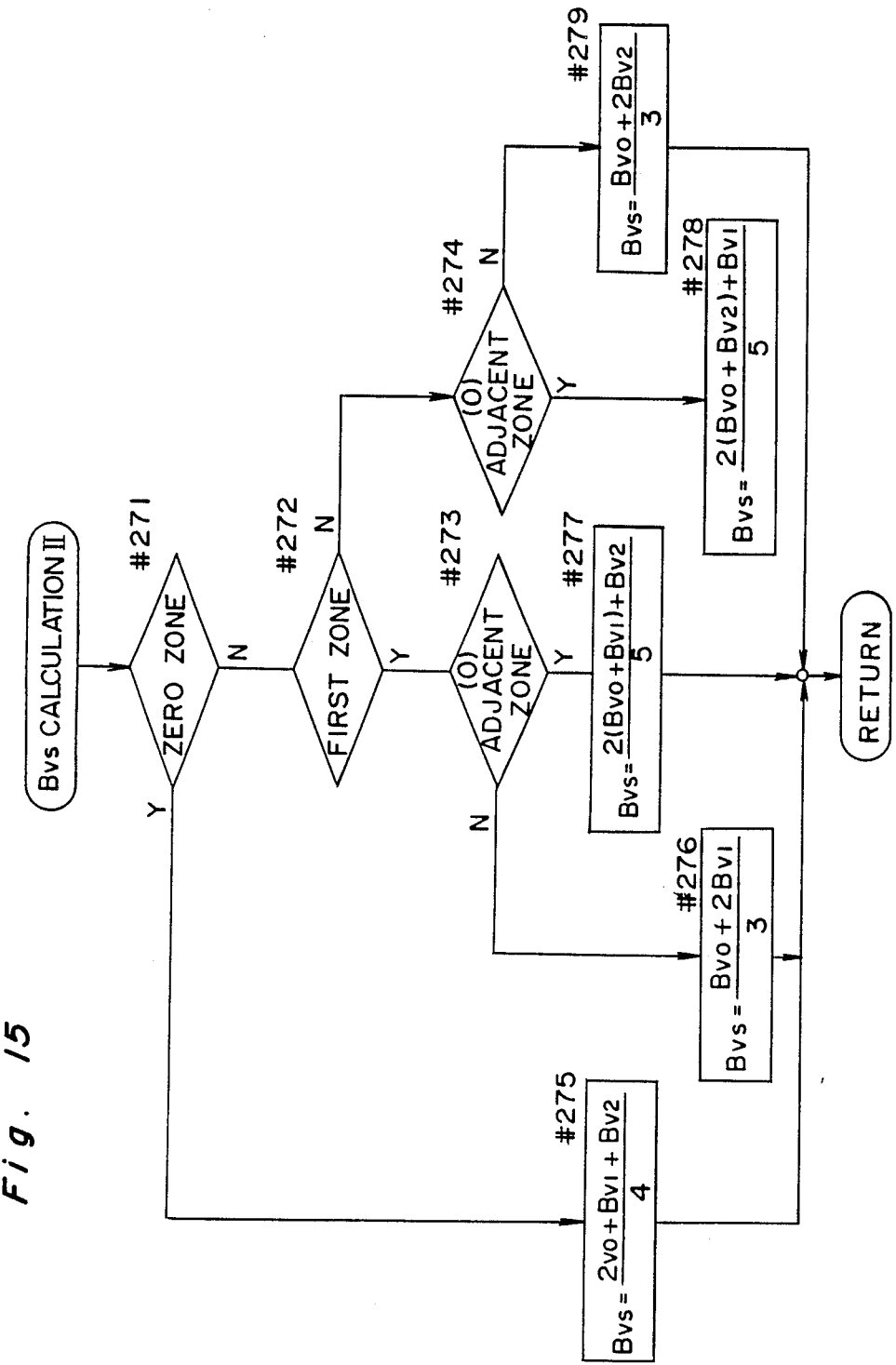

FIG. 15 is a flowchart showing the subroutine "Bvs calculation II". In this subroutine, the luminance Bvs of the main object is calculated by the weighted mean with weights applied to three measured light values Bv0, Bv1, and Bv2 shown in Table 8.

In this subroutine, similarly to the "Bvs calculation I", first, it is decided at steps #271 and #272 which of the zero through second zones is the main zone. If it is decided at step #271 that the zero zone is the main zone, the program goes to step #275. If it is decided at step #272 that the first zone is the main zone, the program goes to step #273. If neither the zero zone nor the first zone is the main zone, that is, if it is decided that the second zone is the main zone, the program goes to step #274.

If it is decided that the first zone or the second zone is the main zone, it is detected at steps #273 or #274 whether or not the zero zone is an adjacent zone (refer to "in-focus detection routine", step #142 in FIG. 10). If it is decided that the zero zone is the adjacent zone, the program goes to steps #277 or #278. If it is decided that the zero zone is not the adjacent zone, the program goes to steps #276 or #279.

As previously described, only when the photographing magnification $\beta$ has the following relationship with respect to the predetermined magnifications $\beta_1$ (1/60 in this embodiment) and $\beta_2$, namely, $\beta_1 < \beta \leq \beta_2$ (for example, full-length figure in a lengthwise direction photography where the picture having a vertical dimension greater than a horizontal dimension is taken) and the focal length (f) of the photographing lens is longer than a predetermined value $f_1$ (28 mm in this embodiment), the processing of the "Bvs calculation II" is performed. Thus, since the photographing magnification $\beta$ is smaller than that at the time when the processing of the "Bvs calculation I" is performed, a light value measured in a region smaller than the case of the "Bvs calculation I" is used. Similarly to the "Bvs calculation I", a weighted mean is calculated by increasing the weight of a value measured in the vicinity of the main zone in which the main object is present. Thus, the luminance (Bvs) of the main object is calculated.

Specifically describing, as shown in Table 8, when the main object is located in the center (zero zone) of the photographing image plane FLM, i.e., when the zero zone is the main zone, the luminance Bvs of the main object is calculated by the weighted mean at step #275 with the weight of the measured light value Bv0 in the region 1 in the region to be measured shown in FIG. 2 being 2 and with the weight of the measured light values Bv1 and Bv2 in the regions 2 and 3 in the region to be measured shown in FIG. 2 being 1. That is, $$Bvs = \frac{2Bv0 + Bv1 + Bv2}{4}.$$

In the case in which the main object is located to the left (first zone) to a slight amount with respect to the center of the photographing image plane FLM, i.e., in case that the first zone is the main zone, when the zero zone is the adjacent zone, the luminance Bvs of the main object is calculated at step #277 by the weighted mean with the weights of the measured values Bv0 and Bv1 in the region 1 and 2 being 2 and with the weight of the measured value Bv2 in the region 3 being 1. That is, $$Bvs = \frac{2(Bv0 + Bv1) + Bv2}{5}.$$

If the zero zone is not the adjacent zone, the luminance Bvs of the main object is calculated at step #276 by the weighted mean with the weight of the measured value Bv1 in the region 2 being 2 and with the weight of the measured value Bv0 in the region 1 being 1. That is, $$Bvs = \frac{Bv0 + Bv1}{3}.$$

In this case, the measured light value Bv2 in the region 3 is not used when the luminance Bvs of the main object is calculated. This is because when the main object is located in the first zone, and if the zero zone is not the adjacent zone, i.e., if an object located in the zero zone is not an object (the same object as the main object) adjacent to the main object, the same object as the main object cannot be present in the second zone opposite to the first zone with the zero zone located therebetween. Even though an object located in the second zone is not the same object as the main object located in the first zone, the luminance of the object located in the second zone provides much influence on the measured light value Bv2 if the object located in the second zone is adjacent to the main object to some extent. Therefore, the measured light value Bv2 is not used to calculate the luminance Bva of the background.

On the other hand, if the main object is located to the right (second zone) to a slight degree relative to the center of the photographing image plane, i.e., if the second zone is the main zone, the luminance of the main object is calculated similarly to the case in which the first zone is the main zone. If it is decided that the zero zone is the adjacent zone at step #274, the luminance of the main object Bvs is calculated at step #278 by the following equation.

$$Bvs = \frac{2(Bv0 + Bv2)Bv1}{5}.$$

If it is decided at step #274 that the zero zone is not the adjacent zone, the luminance Bvs of the main object is calculated at step #279 by the following equation:

$$Bvs = \frac{Bv0 + 2Bv2}{3}.$$

When the luminance Bvs of the main object is calculated, the program returns to the subroutine "exposure calculation" (step #237 in FIG. 13b).

Figure 16A:
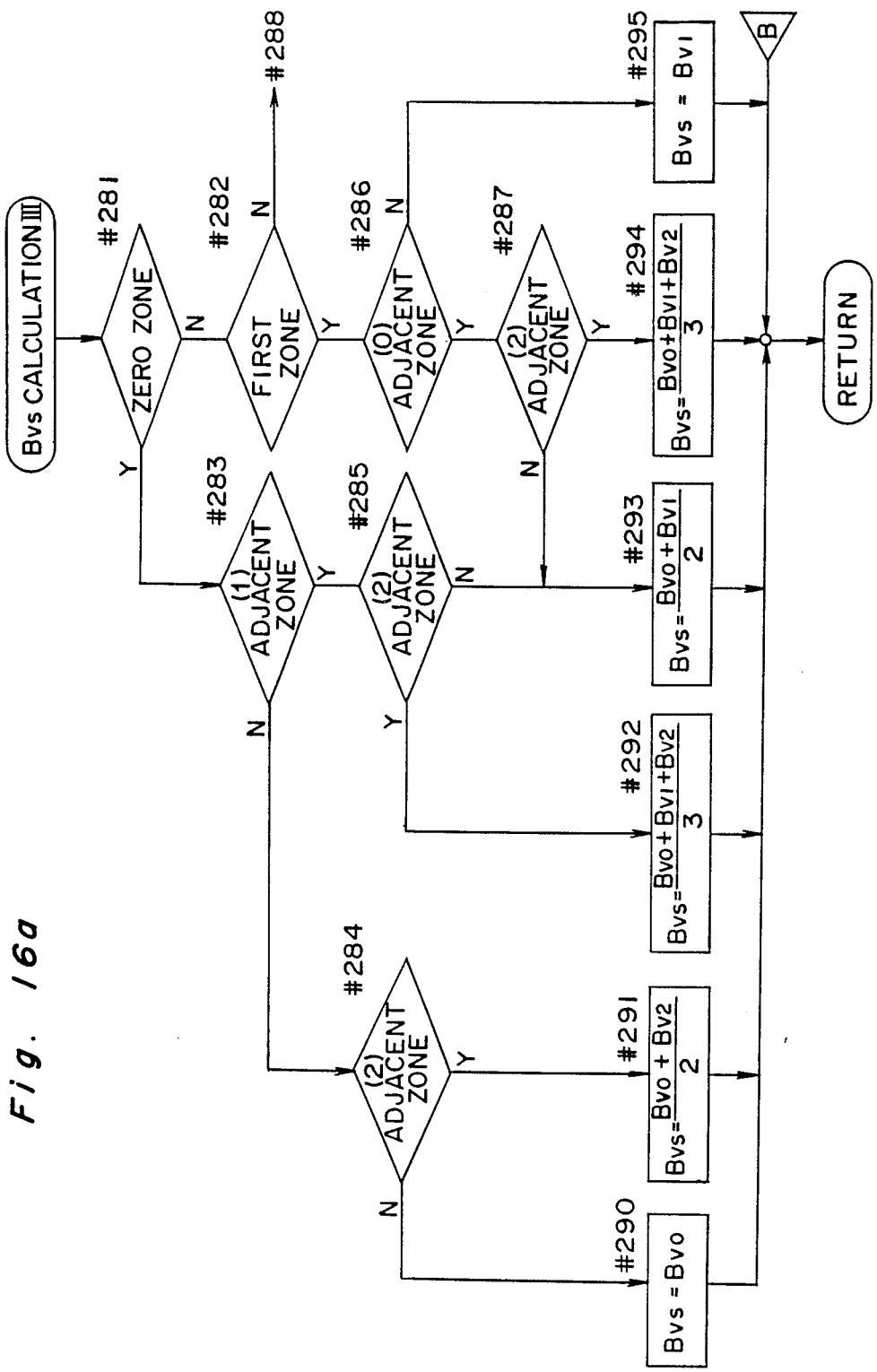
Figure 16B:
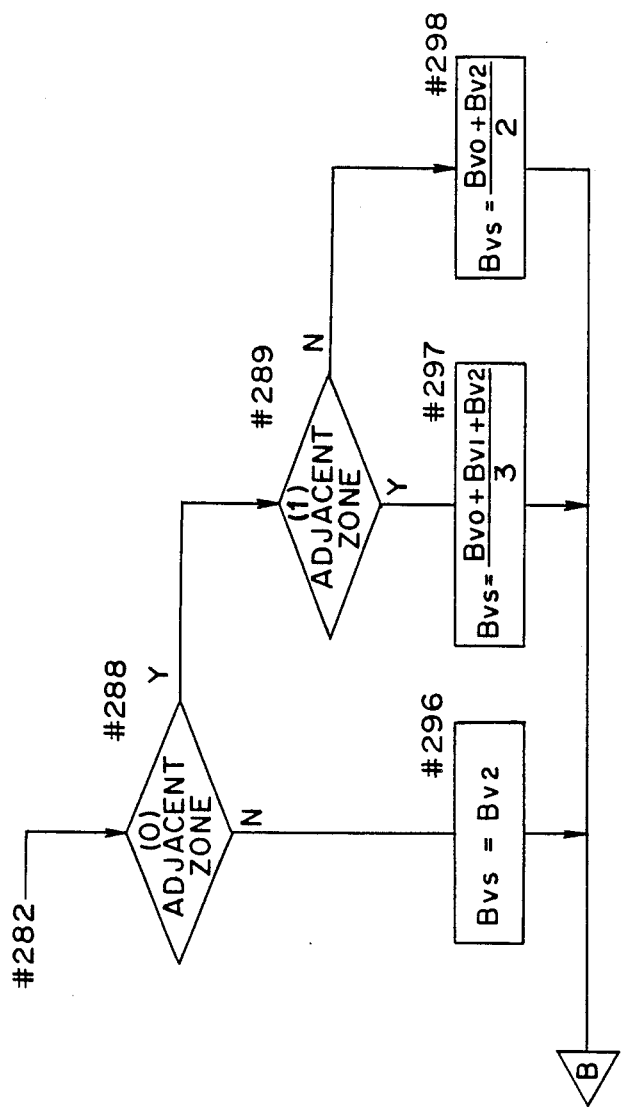

FIGS. 16a and 16b are flowcharts showing a subroutine "Bvs calculation III". In this routine, the luminance Bvs of the main object is calculated by the weighted mean adding the weights shown in Table 9 to three measured light data Bv0, Bv1, and Bv2.

In this routine, similarly to the subroutine "Bvs calculation I" and "Bvs calculation II", it is decided at steps #281 and #282 which of the zero zone through the second zone is the main zone. If it is decided at step

281 that the zero zone is the main zone, the program goes to step #283. If it is decided at step #282 that the first zone is the main zone, the program goes to step #286. If it is decided that neither the zero zone nor the first zone is the main zone, i.e., if the second zone is the main zone, the program goes to step #288.

When the program goes to step #283 after deciding that the zero zone is the main zone, it is detected whether or not the first zone is the adjacent zone. Thereafter, it is detected at steps #284 and #285 whether or not the second zone is the adjacent zone. If it is decided that neither the first zone nor the second zone is the adjacent zone, the c program goes to step #290. If it is decided that the first zone is not the adjacent zone and the second zone is the adjacent zone, the program goes to step #291. If it is decided that both the first and second zones are the adjacent zones, the program goes to step #292. If it is decided that the first zone is the adjacent zone and the second zone is not the adjacent zone, the program goes to step #293.

When the program goes to step #286 after deciding that the first zone is the main zone, it is detected whether or not the zero zone is the adjacent zone. If it is decided at step #286 that the zero zone is the adjacent zone, the program goes to step #287 at which it is detected whether or not the second zone is the adjacent zone. If it is decided that the second zone is not the adjacent zone, the program goes to step #293. If it is decided that the second zone is the adjacent zone, the program goes to step #294. If it is decided at step #286 that the zero zone is not the adjacent zone, the program goes to step #295.

In the case that it is decided that the second zone is the main zone, similarly to the case in which the first zone is the main zone, the program goes to step #297 if both the zero zone and the first zone are the adjacent zones. If it is decided that the zero zone is the adjacent zone and the first zone is not the adjacent zone, the program goes to step #298. If it is decided that the zero zone is not the adjacent zone, the program goes to step #296.

As previously described, the processing of the "Bvs calculation III" is executed only when the relationship between the photographing magnification $\beta$ and a predetermined magnifications $\beta_0$ (1/100 in the embodiment) and $\beta_1$ is $\beta_0 < \beta \leq \beta_1$ (for example, full-size figure in a widthwise direction photography where a picture having a horizontal dimension greater than a vertical dimension is taken) and the focal length (f) of the photographing lens is longer than a predetermined value $f_0$ (50 mm in the embodiment). Thus, the photographing magnification $\beta$ is smaller than that in the case of the processing of "Bvs calculation II". Accordingly, an arithmetic mean is performed by using only a measured light value in a region to which the main zone or the adjacent zone is related, whereby the luminance Bvs of the main object is calculated.

More specifically, as shown in Table 9, if there are no adjacent zones, the value of a region (zero, first, and second zones correspond to the regions 1, 2, and 3 (refer to FIG. 2)) to which the main zone is most related is the luminance Bvs of the main object. And assuming that the zero zone is the main zone and the second zone is the adjacent zone, the luminance Bvs of the main object is calculated by the arithmetic mean of the measured light values Bv0 and Bv2 in the regions 1 and 3 to which the zero and second zone are related much. That is, $$Bvs = \frac{Bv0 + Bv2}{2}.$$

Similarly to the "Bvs calculation II", if the first (second) zone is the main zone and the zero zone is not the adjacent zone, the measured light value Bv2 (Bv1) in the region to which the second (first) zone is related most greatly is not used when the luminance Bvs of the main object or the luminance Bva of the background is calculated.

When the luminance Bvs of the main object is calculated in this manner, the program returns to the subroutine "exposure calculation" (step #241 in FIG. 3b) to perform the processing.

(Calculation of exposure control value)

Figure 17:
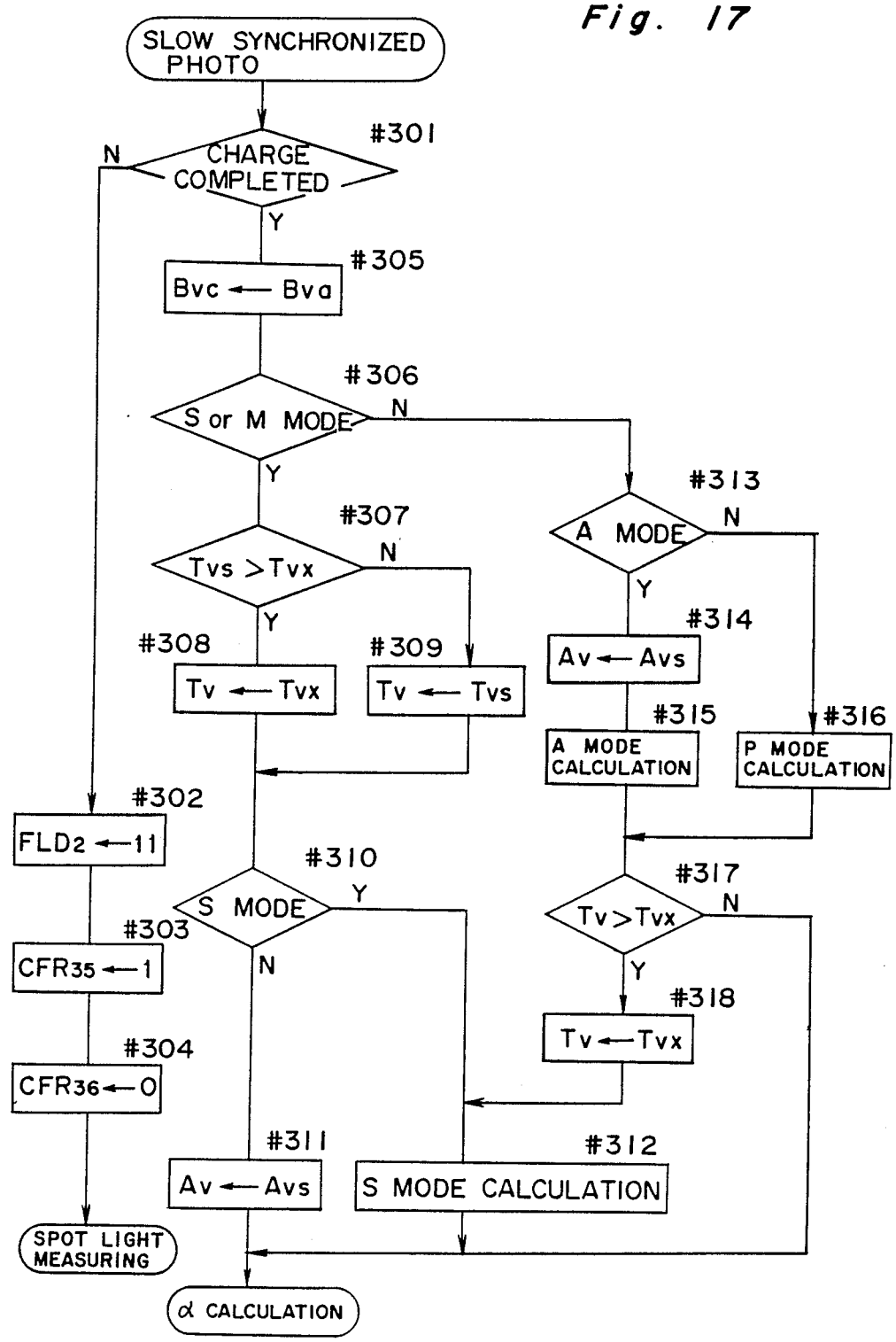
Figure 21:
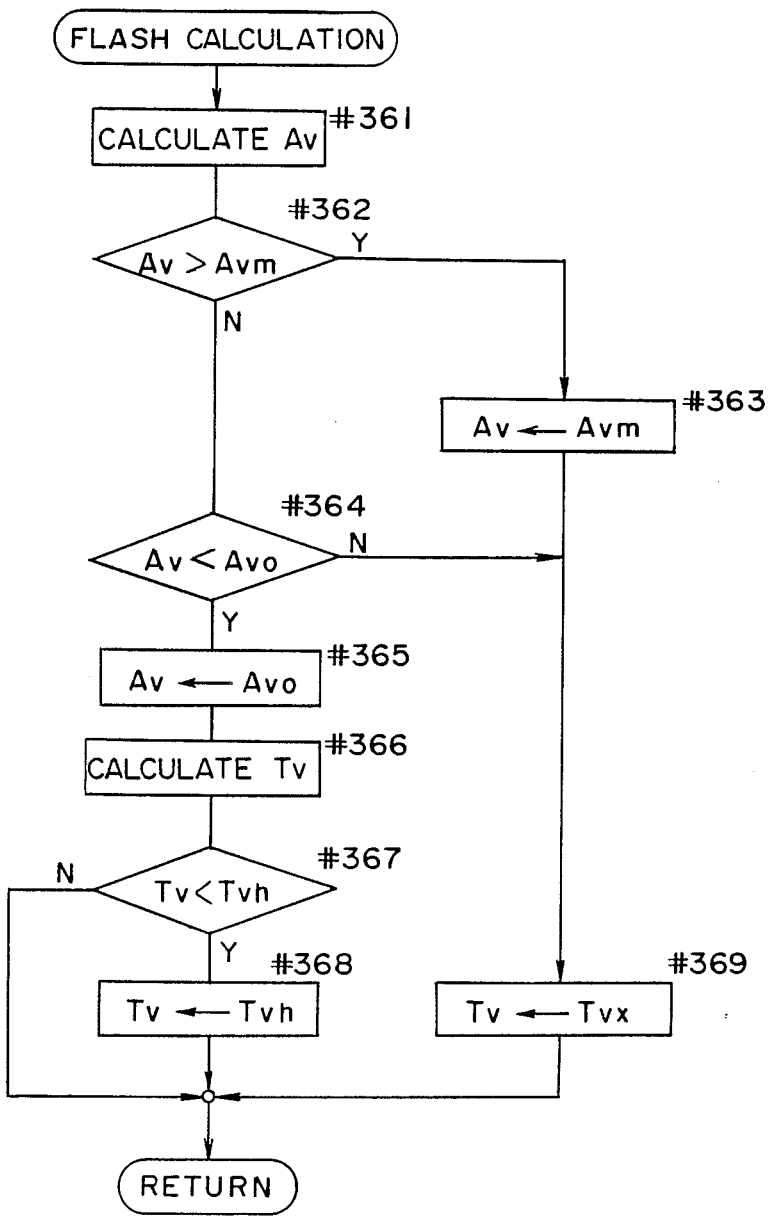

FIG. 17 is a flowchart showing a subroutine of "slow synchronized photographing" (step #252 in FIG. 13b). In this subroutine, it is detected at step #301 whether or not the voltage of the main capacitor MC provided in the flash circuit FLC is charged over a predetermined voltage (300 V). If the sixth bit $FCR_{05}$ of the data $FCR_0$ is reset, it is decided that the voltage of the main capacitor MC is less than the predetermined voltage, so that the program goes to step #302. If the voltage of the main capacitor MC is charged over the predetermined value, the program goes to step #305. When the program advances to step #302, "11" is stored in the indication data $FLD_2$ so as to indicate that the main capacitor MC is being charged. The sixth bit $CFR_{35}$ of the data $CFR_3$ is set at step #303 to prohibit a flash emission, and the seventh bit $CFR_{36}$ of the data $CFR_3$ is reset at step #304 so that the indicator CHD provided in the flash circuit FLC makes the indication. Then, the program goes to the spot light measuring routine (FIG. 21).

When the program goes to step #305 after deciding at step #301 that the voltage charged with the main capacitor MC reaches the predetermined voltage, the luminance Bva of the background is used as the control luminance value Bvc for calculating an exposure control value. This is because the slow synchronized photographing is effected by determining the exposure control value so that the background may be exposed correctly and by controlling the amount of the flash light so that the main objects may be exposed properly. Thereafter, the exposure control mode is detected at steps #306 and #313. If the exposure mode is (S) or (M), the program goes to step #307. If it is (A), the program goes to step #314. If it is (P), the program goes to step #316.

It is detected at step #307 whether or not a shutter speed Tvs set by a photographer is faster than a flash synchronizing shutter speed Tvx (for example, 1/100 sec.). If it is decided that the former is faster than the latter, the control shutter speed Tv is set at step #308 to the flash synchronizing shutter speed Tvx. If the latter is faster than the former, the control shutter speed Tv is set at step #309 to the shutter speed Tvs set by a photographer. And then, it is detected whether the exposure control mode is (S) or (M). If it is (M), the control aperture value Av is set at step #311 to an aperture value Avs set by a photographer. If it is (S), an (S) mode calculation is performed at step #312 according to the following equation so as to calculate the control aperture value Av:

$Av = Bvc + Sv - Tv.$

If the exposure mode is (A), the control aperture value Av is set to an aperture value Avs set by a photographer at step #314, and an (A) mode calculation is performed at step #315 according to the following equation so as to calculate the control shutter speed Tv:

$$Tv = Bvc + Sv - Av$$

If the exposure mode is (P), the control shutter speed Tv and the control aperture value Av are calculated at step #316 based on the predetermined program line. The control shutter speed Tv calculated the flash synchronizing shutter speed Tvx mentioned above is compared with at step #317. If the former is faster than the latter, the control shutter speed Tv is set to the flash synchronizing shutter speed Tvx at step #318 because a flash synchronization cannot be effected with shutter speed faster than the flash shutter speed Tvx, then the program goes to step #312 so as to calculate the control aperture value again.

When the control shutter speed Tv and the control aperture value Av are calculated, the program goes to the routine (FIG. 18) for executing an $\alpha$ calculation.

In the embodiment, unless the main capacitor provided in the flash circuit is charged to the predetermined voltage, the flash emission is prohibited and the flash emission mode is switched to a spot light measuring photographing (refer to steps #301 through #304), but the flash emission may be always performed irrespective of the charge condition of the main capacitor MC by omitting step #301 through #304, which is described later.

Figure 18:
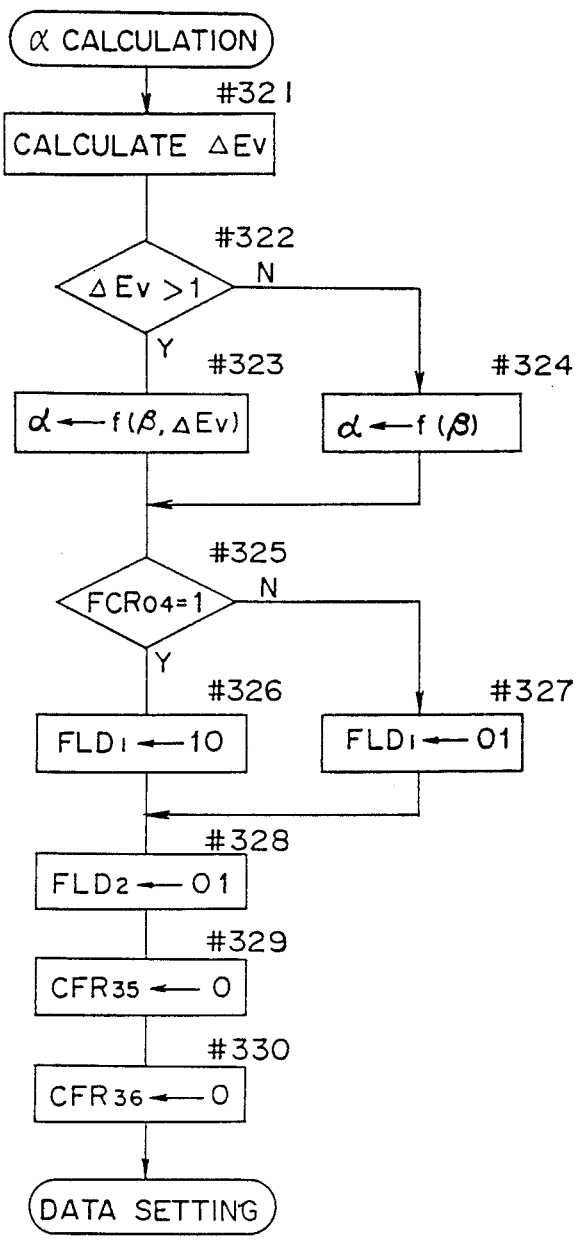

FIG. 18 is a flowchart showing the routine for executing the $\alpha$ calculation. In this routine, first, at step #321, the microcomputer MCB calculates the difference $\Delta Ev$ between a control luminance value Bvc (namely, the luminance Bva of the background) and the luminance Bvs of the main object, namely, the exposure value to be compensated by the flash emission is calculated at step #321:

$$\Delta Ev = Bvc - Bvs = Av + Tv - Sv - Bvs$$

Thereafter, based on the $\Delta Ev$ and the photographing magnification $\beta$, an excessive exposure amount $\alpha$ (hereinafter referred to as emission compensation amount or merely compensation amount) when the flash emitting device emits a light to obtain correct exposure without ambient light is calculated. First, it is detected at step #322 whether or not the luminance difference $\Delta Ev$ is greater than 1. If the luminance difference $\Delta Ev$ is greater than 1, that is, the exposure amount to be compensated by the flash emission is large, at step #323, the compensation amount $\alpha$ is calculated depending on the luminance difference $\Delta Ev$ and the photographing magnification $\beta$. On the other hand, if the luminance difference $\Delta Ev$ is less than 1, that is, the exposure amount to be compensated by the flash emission is small, at step #324, the compensation amount $\alpha$ is calculated depending on only the photographing magnification $\beta$.

The luminance $\Delta Ev$ is the difference between the luminance of the main object and that of the background. The microcomputer MCB calculates the compensation amount $\alpha$ and reduces the emission amount so that the flash emitting device emits an amount corresponding to the difference $\Delta Ev$. The reason for this is as follows:

The quantity of a light reflected from the main object changes according to the photographing magnification $\beta$, namely, the size of the main object with respect to the image plane. Therefore, unless the emission amount is compensated, the main object cannot be exposed correctly. For example, if the photographing magnification $\beta$ is small, the quantity of light reflected from the main object is small. Accordingly, unless the emission amount is reduced, the exposure amount with respect to the main object exceeds the proper amount. In order to prevent this, the compensation amount $\alpha$ with respect to the emission amount is calculated according to the photographing magnification $\beta$ and the luminance difference $\Delta Ev$. Specifically, the smaller the photographing magnification is, the greater the compensation amount $\alpha$ is so that the flash emitting device stops emitting light even though the amount of the light reflected from the main object is small.

In the camera system of the embodiment, the compensation amount $\alpha$ under various conditions are calculated according to the actual photographings and theoretical analysis, and the compensation amount $\alpha$ thus calculated is stored in ROM of the microcomputer MCB, which is read as necessary.

It is detected at step #325 whether or not the flash stopping signal FSTP is outputted. If the fifth bit $FCR_{04}$ of the data $FCR_0$ is set, it is decided that the flash stopping signal FSTP is outputted, and "10" is stored in the indication data $FLD_1$ at step #326 so that the microcomputer MCB make the display circuit DSP display that flash light is correctly emitted. If the fifth bit $FCR_{04}$ of the data $FCR_0$ is reset, it is decided that the flash stopping signal FSTP is not outputted, and "01" is stored in the indication data $FLD_1$ at step #327 so that the display circuit DSP indicates that the main capacitor MC is completely charged (when the program goes to this routine, the electric charge in the main capacitor MC is completed.)

Thereafter, "01" is stored at step #328 so that the display circuit DSP makes an indication that the camera system is under the flash emission mode. Then, at step #329, the sixth bit $CFR_{35}$ of the data $CFR_3$ is reset to enable a flash emission and at step #330 the seventh bit $CFR_{36}$ of the data $CFR_3$ is reset to allow the operation of the display circuit FDP and the indicator CHD provided in the flash circuit FLC, then the program goes to the data setting routine (FIG. 19).

Figure 19:
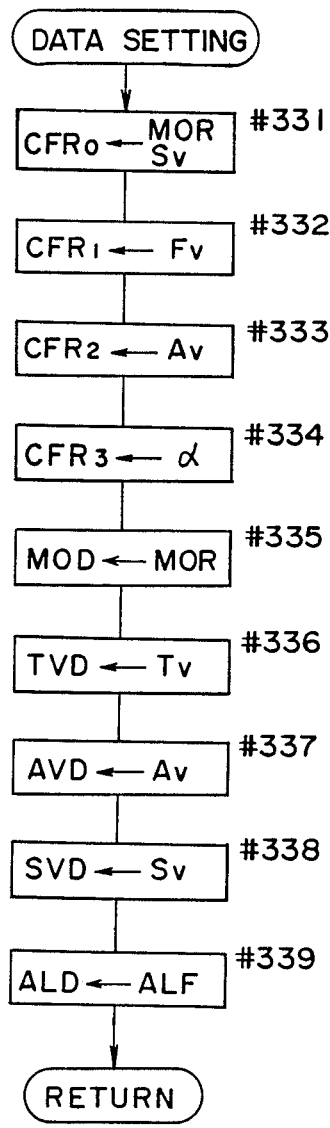

FIG. 19 is a flowchart showing the routine for a data setting. In this routine, data to be transferred to the flash circuit FLC and the display circuit DSP are set, but the data (for example, $FLD_1$) set before the program goes to this routine are excluded.

First, the data $CFR_0$ through $CFR_3$ to be transferred from the microcomputer MCB to the flash circuit FLC are set (refer to Table 5). The exposure control mode of the camera system and the film sensitivity Sv are set in the data $CFR_0$ at step #331 and the focal length Fv of the photographing lens is set in the data $CFR_1$ at step #332. The control aperture value Avc is set in the data $CFR_2$ at step #333 and the emission compensation amount $\alpha$ is set in the data $CFR_3$ (low-order five bits) at step #334.

Thereafter, the control shutter speed Tv is set in the indication data TVD at step #336, the control aperture value Av is set in the indication data AVD at step #337, and the film sensitivity Sv is set in the indication data SVD. At step #329, the content of the AE lock flag ALF is set in the indication data ALD so that the display circuit DSP displays whether or not the AE lock is being effected.

When the data are set, the program returns to the "AE routine" (step #26 in FIG. 5).

Figure 20:
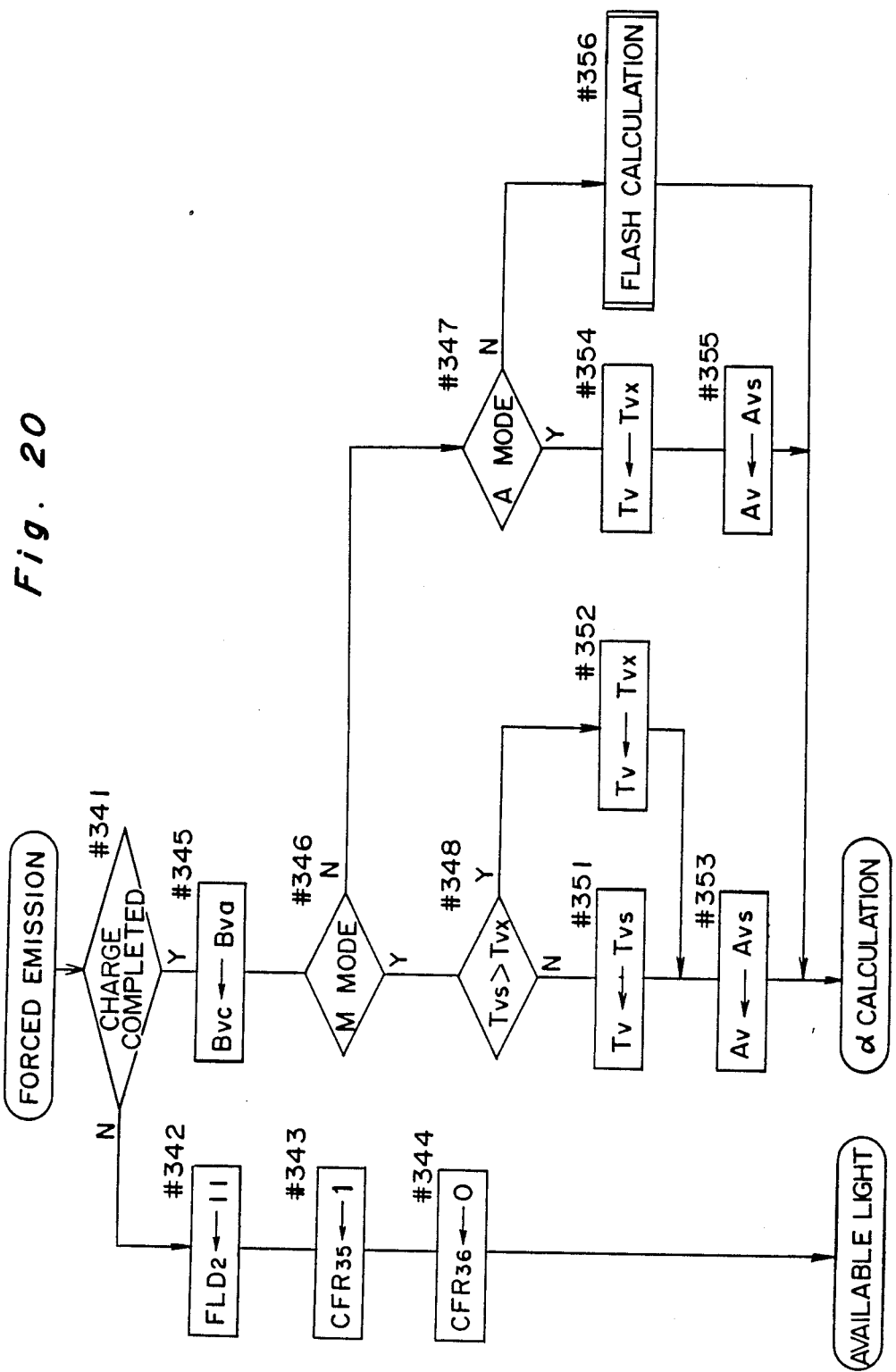

FIG. 20 is a flowchart showing the subroutine for executing "forced emission". In this subroutine, similarly to "slow synchronized photographing", it is detected at step #341 whether or not the charge of the main capacitor MC of the flash circuit FLC is completed. If it is not charged yet, "11" is stored at step #342 in the indication data $FLD_2$ so that the display circuit DSP indicates that the main capacitor MC is being charged. Then, at step #343, the sixth bit $CFR_{35}$ of the data $CFR_3$ is set to prohibit the flash emission, and at step #344, the seventh bit $CFR_{36}$ of the data $CFR_3$ is reset so that the indicator CHD provided in the flash circuit FLC makes an indication (indication for showing that the main capacitor MC is being charged.) Thereafter, the processing of the available light routine (FIG. 22) is executed.

At step #341, if it is decided that charge of the main capacitor MC is completed, the processing steps subsequent to step #345 are executed. The luminance Bva of background is selected at step 345 as the control luminance value Bvc. Thereafter, the exposure control mode of the camera system is detected at steps #346 and #347. If the exposure control mode is (M), the program goes to step #348, and if it is (A), the program goes to step #353, and if it is (S), the program grows to step #356. As previously mentioned, there is no possibility that the program goes to this subroutine in (P) mode.

If the exposure control mode is (M), at step #348, shutter speed Tvs set by a photographer is compared with the synchronizing shutter speed Tvx. If the former is slower than the latter, i.e., if the flash synchronizing is possible, the control shutter speed Tv is set to the shutter speed Tvs at step #351. If the former is not slower the latter, at step #352, the control shutter speed Tv is set to the synchronizing shutter speed Tvx. In both of the cases, the control aperture value Av is set to aperture value Avs set by a photographer at step #355.

If the exposure control mode is (A), the control shutter speed Tv is set to the synchronizing shutter speed Tvx at step #354, and the control aperture value Av is set to aperture value Avs set by a photographer at step #355.

If the exposure control mode is (S), the program goes to the subroutine "flash calculation" at step #356 so as to calculate the control shutter speed Tv and the control aperture value Av.

After the exposure control values Tv and Av are set, the program goes to the α calculation routine (FIG. 18) at which the above-described processing of "data setting" is executed, then the program returns to the AE routine (step #26 in FIG. 5).

In this embodiment, the flash emission is switched to available light photography (refer to steps #341 through 344) without using a flash emission if the main capacitor MC provided in the flash circuit FLC is not yet charged to the predetermined voltage, but similarly to the slow synchronized photographing (FIG. 17), the flash emission may be always effected irrespective of the charge condition of the main capacitor by omitting the executions to be executed at step #341 through step #344.

FIG. 21 is a flowchart showing the subroutine for executing "flash calculation".

In this subroutine, the aperture value Av is calculated at step #361 assuming that the shutter speed is set to the synchronizing shutter speed Tvx by the following equation. That is, $$Av = Bvc + Sv - Tvx$$

Thereafter, at step #362, the aperture value Av calculated at step #361 is compared with the maximum aperture value Avm (aperture value corresponding to the minimum aperture). If the former is greater than the latter, that is, if the aperture becomes smaller than the minimum aperture, the control aperture Av is set to the maximum aperture value Avm at step #363. The maximum aperture value Avm is outputted from the lens circuit LEC to the microcomputer MCB.

When the aperture value Av calculated at step #361 is less than the maximum aperture value Avm, the aperture value Av is compared with the minimum aperture value Av0 (aperture value corresponding to open aperture) at step #364. The minimum aperture value Av0 is also outputted from the lens circuit LEC to the microcomputer MCB. If the aperture value Av is greater than the minimum aperture value Av0, that is, the aperture value Av calculated at step #361 is within the controllable range ($Av0 \leq Av \leq Avm$), the aperture value Av is adopted as the control aperture value Av.

If the aperture value Av calculated at step #361 is smaller than the minimum aperture value Av0 at step #364, the control aperture value Av is set to the minimum aperture value Av0 at step #365 so as to calculate the shutter speed Tv at step #366 by the following equation:

$$Tv = Bvs + Sv - Av0$$

The shutter speed calculated at step #366 is compared with the predetermined shutter speed Tvh at step #367. The predetermined shutter speed Tvh is the slowest shutter speed for preventing camera shake. The longer the focal length (f) is, the faster is the shutter speed Tvh (for example, if f=50 mm, Tvh=6 (1/60 sec)). The shutter speed Tvh is stored in the ROM of the microcomputer MCB, which is read from the ROM as necessary. At step #367, if the shutter speed Tv is slower than the predetermined value Tvh, at step #368, the control shutter speed Tv is set to the shutter speed Tvh and the program returns. If the shutter speed Tv is not slower than the predetermined value Tvh, the control shutter speed Tv, is set to the shutter speed Tv calculated at step #366 then the program returns.

If the aperture value calculated at step #361 is greater than the maximum aperture value Avm or in the controllable range, namely, $Av \geq Av0$, the control shutter speed Tv is set to the flash synchronizing shutter speed Tvx at step #369, then the program returns.

As described above, in the flash calculation routine, the aperture value Av is calculated by assuming that the shutter speed Tv is the synchronizing limit shutter speed Tvx, and if the value Av is smaller than the minimum aperture value Av0, the aperture value Av is set to the minimum aperture value Av0, whereby the shutter speed Tv is calculated. If the shutter speed Tv calculated by setting the aperture value Av to the minimum aperture value Av0 is the shutter speed at which the camera shake may occur (Tv<Tvh), the shutter speed Tv is set to the limit shutter speed Tvh which do not cause the camera shake. According to this arrangement, when a flash is used (as described later, in the automatic emission mode, the processing of this routine is executed) except the slow synchronized photographing, the camera shake may not happen.

Figure 22:
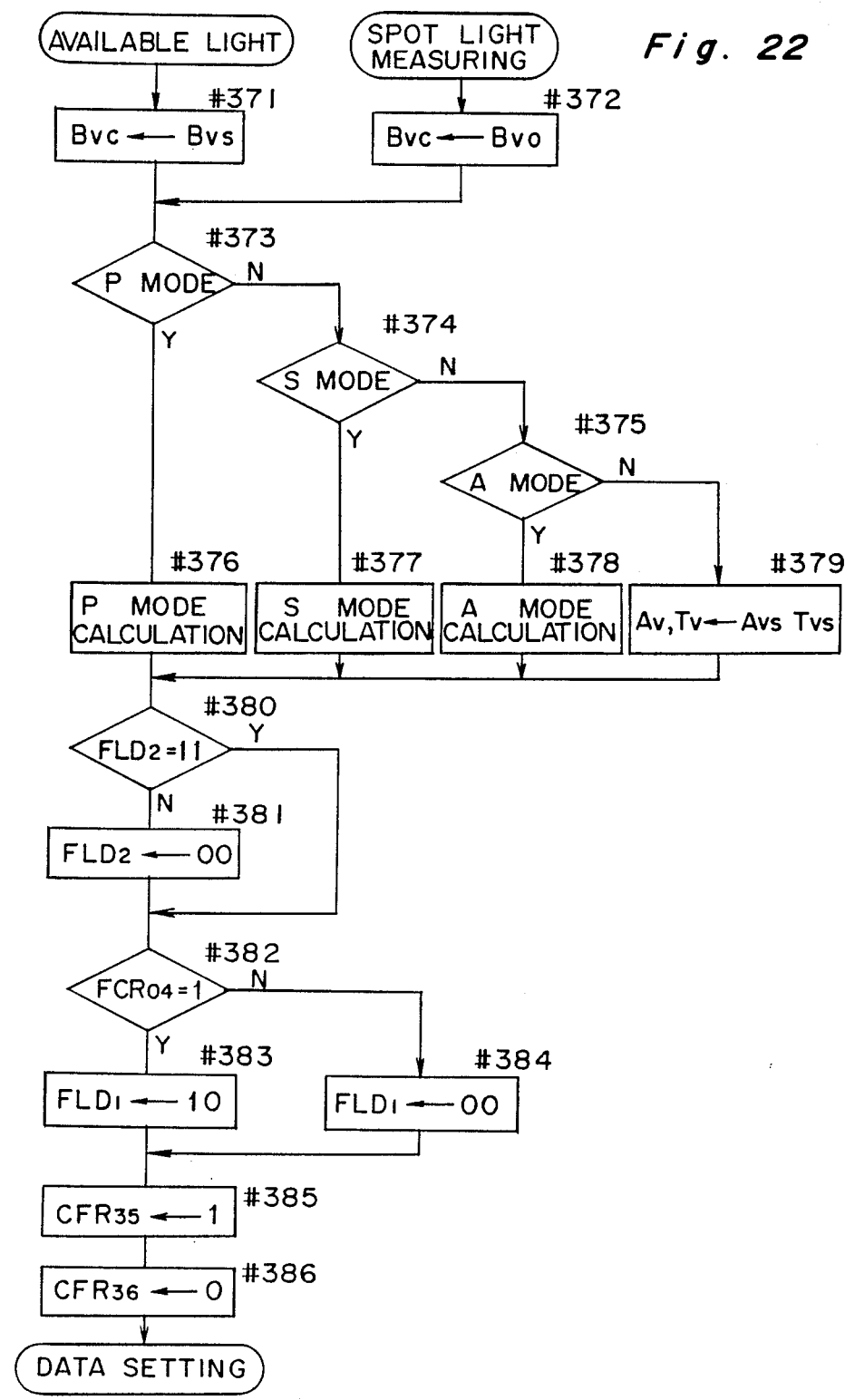
Figure 23A:
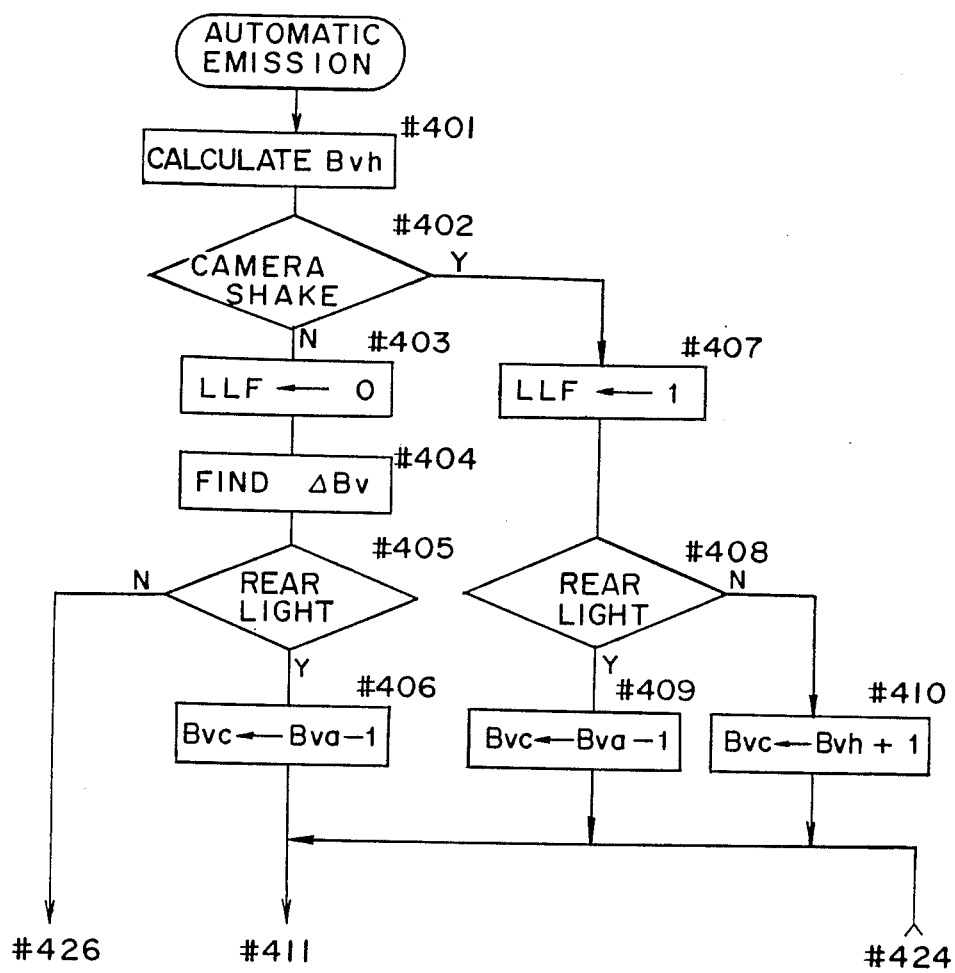
Figure 23B:
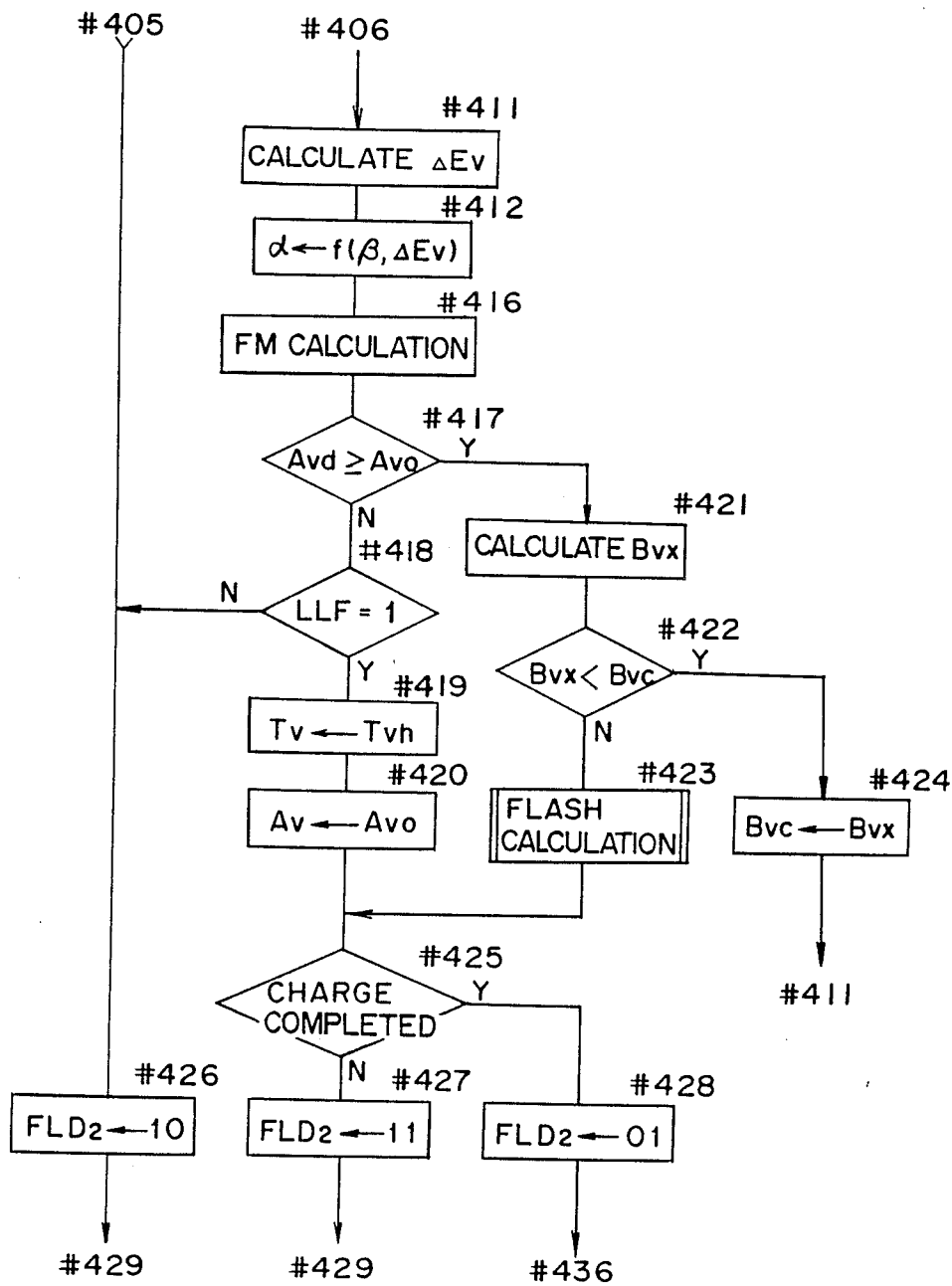
Figure 23C:
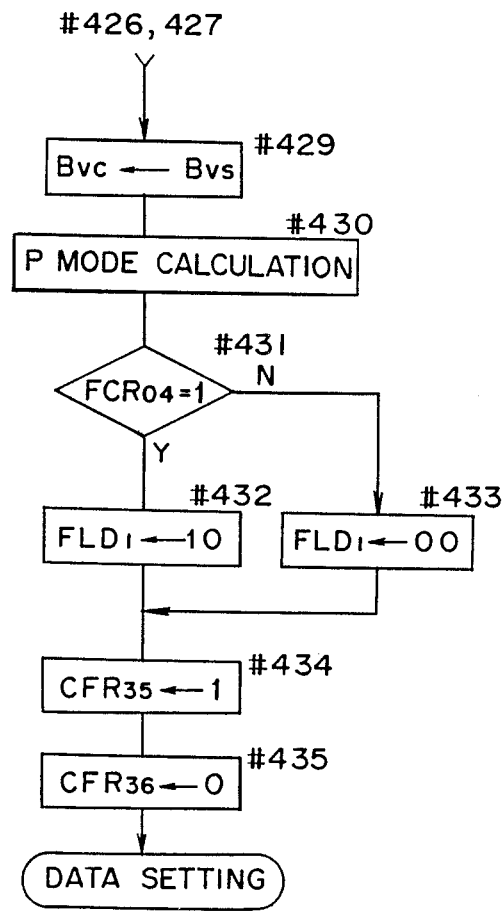
Figure 23D:
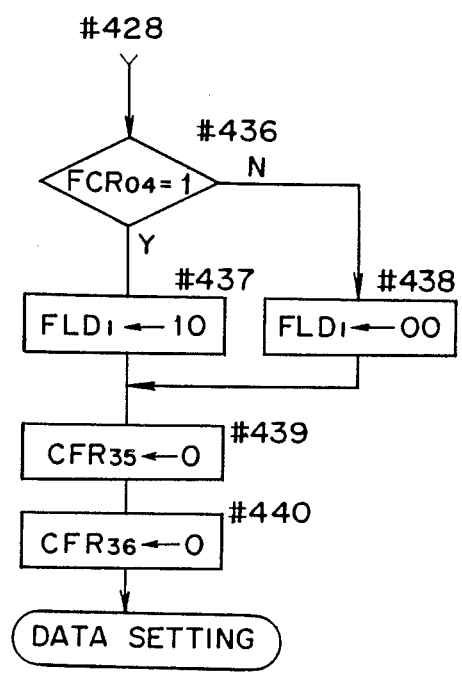

FIG. 22 is a flowchart showing the subroutine "available light" and "spot light measuring".

In the subroutine "available light", the control luminance value Bvc is set to the luminance Bvs of the main object at step #371. In the subroutine "spot light measuring", the control luminance value Bvc is set to the measured value Bv0 in the region 1 located in the center of the photographing image plane. In both cases, the program goes to steps subsequent to step #373.

The exposure control mode of the camera system is detected at step #373 through #375.

If "00" is stored in the exposure control mode register MOR, it is decided at step #373 that the exposure control mode is (P) and the control aperture value Av and the control shutter speed Tv are calculated at step #376 based on the predetermined program line.

If "01" is stored in the exposure control mode register MOR, it is decided that the exposure control mode is (S) at step #374, so that (S) mode calculation is performed as follows so as to calculate the control aperture value Av, and the control shutter speed Tv is set to the shutter speed Tvs set by a photographer at step #377:

$$Av = Bvc + Sv - Tvs.$$

If "10" is stored in the exposure control mode register MOR, it is decided at step #375 that the exposure control mode is (A), so that the (A) mode calculation is performed by the following equation so as to calculate the control shutter speed Tv, and the control aperture value Av is set to the aperture value Avs set by a photographer at step #378:

$$Tv = Bvc + Sv - Avs.$$

If it is decided that the exposure control mode is not (P), (S), or [A], namely, the exposure control mode is (M), the control aperture value Av and the control shutter speed Tv are set to the aperture value Avs and the shutter speed Tvs both set by a photographer, respectively at step #379.

As previously described, in this embodiment, in the routine of the "slow synchronized photographing" or the "forced emission" in which the flash emission is used, if the main capacitor MC provided in the flash circuit FLC is not charged to the predetermined voltage, the processing of these routines are suspended and instead the processing of the "spot light measuring" or "available light" which do not require the flash emission is executed. Therefore, when the control aperture value AV and the control shutter speed Tv are set, it is detected at step #380 whether or not the program progresses from the subroutine "slow synchronized photographing" to the subroutine "spot light measuring" or from the subroutine "forced emission" to the routine "available light". When the program progresses from the subroutine "slow synchronized photographing" or the subroutine "forced emission" to these routines, "11" is always stored in the indication data FLD2 (refer to step #302 in FIG. 17 and step #342 in FIG. 20). Accordingly, the abovedescribed progresses of the program from the subroutine "slow synchronized photographing" or "forced emission" to the subroutine "spot light measuring" or "available light" are detected according to the data stored in the indication data FLD2. If the program goes from the subroutine "slow synchronized photographing" or the "forced emission" to this routine, the program skips to step #382. If not, that is, if the exposure control mode without using the flash emission is set by the photographer and the program goes from steps #254 and #257 to step #266 or from step #228 to step #259 in the subroutine "exposure calculation" (FIGS. 13a, 13b), "00" is stored in the indication data FLD2 at step #381 so that the display circuit DSP clears the indication of the flash information, then the program goes to step #382.

At step #382, it is detected whether or not the flash stopping signal is outputted from the flash circuit FLC. If the fifth bit FCR04 of the data FCR0 is set, it is decided that the flash stopping signal is outputted, and "10" is stored at step #383 in the indication data FLD1 so that the display circuit DSP makes the indication to that effect. If the flash stopping signal is not outputted, "00" is stored in the indication data FLD1 at step #384 so that the display circuit DSP clears the indication of the flash information. Thereafter, at step #385, the sixth bit CFR35 of the data CFR3 is set to set the flash emitting device to the non-emission mode, and at step #386 the seventh bit CFR36 of the data CFR3 is reset to enable the operations of the display circuit FDP and the indicator CH of the flash circuit FLC. Thereafter, the program goes to the "data setting" routine (FIG. 19) previously described and returns to the AE routine (step #26 in FIG. 5).

FIGS. 23a, 23b, 23c and 23d are flowcharts showing the subroutine "automatic emission". This subroutine is divided into four parts. The first part is to decide the exposure amount depending on natural light (step #401 through #410, #429 and #430). The second part is to calculate the flash emission amount to be compensated to expose the main object correctly (step #411 through #415). The third part is decided whether or not a flash light is required (step #416 through #425). The last part is to set data (step #426 through #428, step #431 through #440 and a data setting routine (FIG. 19)).

Figure 35:
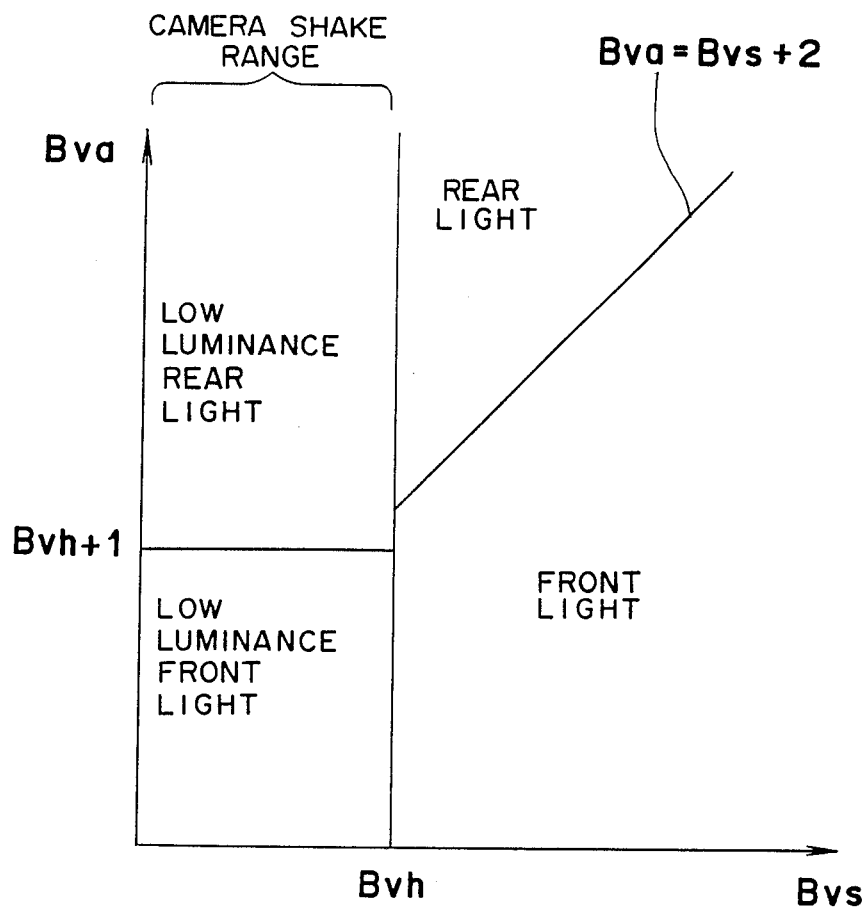
FIG. 35 is a graph showing a photographing state recorded in an automatic emission mode in the camera system which embodies the present invention.

The respective photographing conditions of this subroutine is described hereinbelow. The photographing conditions include a high luminance front light (light is emitted from back of photographer, hereinafter referred to merely front light), a high luminance rear light (hereinafter referred to as merely rear light), a low luminance front light, and a low luminance rear light. The light condition in the respective photographing conditions are as shown in FIG. 35. That is,

| | |
|---|---|
| front light | $Bvs \geq Bvh$ and $Bva < Bvs + 2$ |
| rear light | $Bvs \geq Bvh$ and $Bva \geq Bvs + 2$ |
| low luminance front light | $Bvs < Bvh$ and $Bva < Bvh + 1$ |
| low luminance rear light | $Bvs < Bvh$ and $Bva \geq Bvh + 1$ |

First, the photographing to be made under a front light is described. In this case, the exposure control values Av and Tv are determined based on the luminance Bvs of the main object, and the main object is photographed without a flash emission.

First, the threshold luminance value Bvh which is the lowest value preventing camera shake is calculated at step #401. The luminance value Bvh is the luminance value that correct exposure is obtained when the shutter speed is set to the value Tvh which is the slowest shutter speed for preventing camera shake and the aperture value is set to the minimum aperture value Avo:

$$Bvh = Tvh + Av0 - Sv.$$

When the minimum aperture value Av0 is smaller than 3 Ev (F2.8), the aperture value Av0 is not used, but the following equation may be used:

$$Bvh = Tvh + 3 - Sv.$$

Thereafter, it is detected at step #402 whether or not the luminance Bvs of the main object is in the range in which the camera shake may occur. Under the front light condition, as apparent from FIG. 35, the luminance Bvs of the main object is not in that range. Accordingly, the program goes to step #402 so as to reset the low luminance flag LLF. Thereafter, the difference between the luminance Bvs of the main object and the luminance Bva of the background $\Delta Bv = Bva - Bvs$ is calculated at step #404 and it is detected at step #405 whether or not a photograph is taken under a rear light at step #405. Under the front light, the program goes from step #405 to #426, then "10" is stored in the indication data $FLD_2$ so that the display circuit DSP displays that the mode is the non-emission mode. Then, the control luminance value Bvc is set to the luminance Bvs of the main object at step #429, and the control aperture value Av and the control shutter speed Tv are calculated at step #430 in accordance with the predetermined program. Thereafter, it is detected at step #431 whether or not the flash stopping signal FSTP is outputted from the flash circuit FLC. If the flash stopping signal FSTP is outputted, "10" is stored in the indication data $FLD_1$ at step #432 so that the display circuit DSP indicates that flash light is correctly emitted. If the flash stopping signal is not outputted, "00" is stored in the indication data $FLD_1$ at step #433 so as to clear the indication that the flash light is correctly emitted. At step #434, the sixth bit $CFR_{35}$ of the data $CFR_3$ is set to prohibit a flash emission, and at step #435, the seventh bit $CFR_{36}$ of the data $CFR_3$ is reset to allow the operations of the display circuit FDP and the indicator CHD provided in the flash circuit FLC. Then, the program goes to the data setting routine (FIG. 19), and then returns to the AE routine (step #26 in FIG. 5).

Next, a photographing under the rear light is described. In the case of the rear light, the main object is exposed correctly, and the background is over-exposed by 1 Ev than the main object, whereby the exposure control value is determined so that the contrast under the rear light is kept and the effect of the rear light appears on a picture.

Similarly to the front light, when the program goes from #401 to #405, the rear light is detected. Then, the program goes to step #406. Then, the control luminance value Bvc is set to the value which is less than the luminance Bva of the background by 1 Ev. Since the control aperture value Av and the control shutter speed Tv are calculated by the control luminance value Bvc, the background is over-exposed by 1 Ev.

Similarly to the "αcalculation routine" (FIG. 18), the difference $\Delta Ev$ between the control luminance value Bvc and the luminance value Bvs of the main object is calculated at step #411, wherein the difference $\Delta Ev$ is light amount to be supplemented by the flash emission so that the main object may be exposed correctly. And then, the compensation amount α is calculated depending on the photographing magnification $\beta$ and the difference $\Delta Ev$. As described above, in consideration of the light which is reflected from the main object and which changes according to the photographing magnification $\beta$ (the ratio which the main object forms in the photographing image plane FLM), the compensation amount α is calculated so that the flash light may emit by the shortage amount of light with only natural light. The compensation amount α can be found by determining the relationship between the compensation amount α and the photographing magnification $\beta$ as well as the shortage light amount $\Delta Ev$ based on data obtained by photograph taken in various conditions. The compensation amount α can be formulated according to the abovedescribed photographing magnification $\beta$ and the shortage light quantity $\Delta Ev$ experimentally obtained. Or a ROM which stores data of the compensation amount based on the photographing magnification $\beta$ and the shortage light amount $\Delta Ev$ may be prepared.

After the compensation amount α is found, at step #416, the aperture value Avd is calculated by performing the FM operation according to the following equation in consideration of the compensation amount α:

$$Avd = Iv - \alpha + Sv - Dv.$$

wherein the aperture value Avd is the maximum aperture value with which flash light is correctly emitted. In the above equation, Iv is the maximum emission amount of the flash emitting device and Dv is a photographing distance. At step #417, it is detected whether or not the main object will be correctly exposed with the compensation light amount α. If the aperture value Avd calculated at step #416 is smaller than the minimum aperture value Av0, a proper amount of flash light does not reach the main object and even if the aperture size is increased to the greatest extent, an emission amount is short, which causes the main object to be exposed inappropriately. If the aperture value Avd is greater than the minimum aperture value Av0, the main object will be exposed properly with the aperture value Av of $Av0 \leq Av \leq Avd$.

If it is decided at step #417 that the main object will not be appropriately exposed, the program goes to step #418 at which it is detected whether or not camera shake will happen. That is, if the low luminance flag LLF is set, it is decided that camera shake may happen, the program goes to step #419, and if the flag LLF is reset, the program goes to step #426. Assuming that a photograph is taken under the rear light, the flag LLF is reset. Accordingly, if the main object is not exposed appropriately, the program goes from step #418 to step #426, and the microcomputer MCB executes the processing as in the case of the front light.

If it is decided at step #417 that it is possible to expose the main object correctly, the program goes to step #421. At this step #421, the luminance value Bvx is calculated according to the following equation:

$$Bvx = Tvx + Avd - Sv,$$

the luminance value Bvx is the luminance value of an object which is correctly exposed with the synchronizing shutter speed Tvx and the aperture value Avd calculated at step #416. Then, the control luminance value Bvc is compared with the luminance value Bvx at step #422. If $Bvx \geq Bvc$ at step #422, the program goes to the subroutine "flash calculation" in which the control shutter speed Tv and the control aperture value Av are determined according to the control luminance value Bvc at step #423. At this time, as previously described, the following equation is satisfied:

$$Bvc = Av + Tvx - Sv.$$

While, according to step #421, the following equation is satisfied:

$$Bvx = Avd + Tvx - Sv.$$

Accordingly, the following equation is satisfied:

$$Bvc - Bvx = Av - Avd.$$

Consequently, if $Bvx < Bvc$, $Av > Avd$ so that the control aperture value Av becomes greater than the maximum aperture value Avd with which flash light is correctly emitted, therefore, the emission amount is short and the main object is not exposed properly. Conversely, if $Bvx \geq Bv$, $Av \geq Avd$. This control aperture value Av does not cause the emission amount to be short. As described above, at step #422, the luminance values Bvc is compared with the luminance value Bvx to detect whether or not the main object is exposed properly. If $Bvx < Bvc$, the program goes to step #424 at which the control luminance value Bvc is set to the luminance value Bvx, and then, the processing is resumed from step #411. Owing to the control aperture value Av and the luminance value Bvx, while the background is overexposed, the main object is exposed properly.

If it is decided at step #422 that $Bvx \geq Bvc$, the program goes to the subroutine "flash calculation" (step #423 in FIG. 22) at which the control shutter speed Tv and the control aperture value Av are determined, then the program goes to step #425. It is detected at step #425 whether or not the main capacitor MC in the flash circuit FLC is charged to the predetermined voltage. If the sixth bit $FCR_{05}$ of the data $FCR_0$ is set, it is decided that the main capacitor MC is charged in the predetermined voltage, so that the program goes to step #428. If not, the program goes to step #427.

At step #427, "11" is stored in the indication data $FLD_2$ so that the display circuit DSP indicates that the main capacitor MC is being charged, then the same as in the case of the front light, processing is continued from step #429. Accordingly, in this case, a control shutter speed Tv and a control aperture value Av are newly determined by the luminance Bvs of the main object.

At step #428, "00" is stored in the indication data $FLD_2$ so that the display circuit DSP indicates that the camera system is in the emission mode. Then, the program goes to step #436. At step #436, it is detected whether or not the flash stopping signal FSTP is outputted from the flash circuit FLC. If it is decided that the flash stopping signal FSTP is outputted, "10" is stored in the indication data $FLD_1$ at step #437 so that the display circuit DSP indicates that the flash light is correctly emitted, while if it is decided that the flash stopping signal FSTP is not outputted, "01" is stored in the indication data $FLD_1$ at step #438 so that the display circuit DSP indicates that the charging operation of the main capacitor MC is completed. Thereafter, the sixth bit $CFR_{35}$ of the data $CFR_3$ is reset at step #439 to allow the flash emission, and the seventh bit $CFR_3$ of the data $CFR_3$ is reset at step #440 to allow the operation of the display circuit FDP and the indicator CHD. Then, the program goes to the data setting routine (FIG. 19). Thereafter, the program returns to AE routine (step #26 in FIG. 5)

Next, photographings performed in a low luminance front light or in a low luminance rear light are described. Under these conditions, the photographing operation is carried out with the shutter speed set to a speed higher than the value Tvh with which camera shake may occur and with flash emission in order to compensate a shortage light amount due to this shutter speed.

In these cases, when the program goes from step #401 to step #402, different from a photographing effected in a high luminance, it is decided at step #402 that the luminance Bvs of the main object is located in the region in which the camera shake may occur, and the program goes to step #407 at which the low luminance flag LLF is set. Based on the luminance Bva of the background, it is detected whether the photographing condition, namely, the light condition of the image plane, is in a low luminance front light or a low luminance rear light at step #408. That is, it is detected whether the photographing is being carried out in the region III or IV in FIG. 35. If it is decided that the photographing condition is the low luminance front light (region IV in FIG. 35), the program goes to step #410 at which the control luminance value Bvc is set to 1 Ev greater than the luminance Bvh which is the lower limit of luminance that camera shake may not occur:

$$Bvc = Bvh + 1.$$

With this arrangement, the main object is inappropriately exposed under only available light, and owing to the control luminance value Bvc, the control shutter speed Tv is always set to a shutter speed higher than the slowest shutter speed Tvh for preventing camera shake. Therefore a photographed image is not blurred.

On the other hand, if it is decided that the main object is photographed in a low luminance rear light (region III in FIG. 35), the program goes to step #409, and similarly to the rear light, the control luminance value Bvc is set so that the main object is correctly exposed and the background is over-exposed by 1 Ev. That is, $$Bvc = Bva - 1.$$

Thereafter, similarly to the case of the rear light, the program goes from step #411 to #417 in the both cases. If it is detected at step #417 that $Avd \geq Av0$, processing identical to the case of the rear light is executed. If it is decided at step #417 that $Avd < Av0$, that is, if it is decided that the flash light does not reach the main object in a sufficient amount so that the main object is not exposed sufficiently, the program goes from step #418 to step #419 because the low luminance flag LLF is set unlike the rear light. At step #419, the control shutter speed Tv is set to the limit value Tvh, and then, the control aperture value Av is set to the minimum aperture value Av0 at step #420, whereby the degree to which the exposure amount becomes short can be minimized. Then, the program goes to step #425, and the same processing as the case of the rear light is executed.

(Exposure control)

Figure 24:
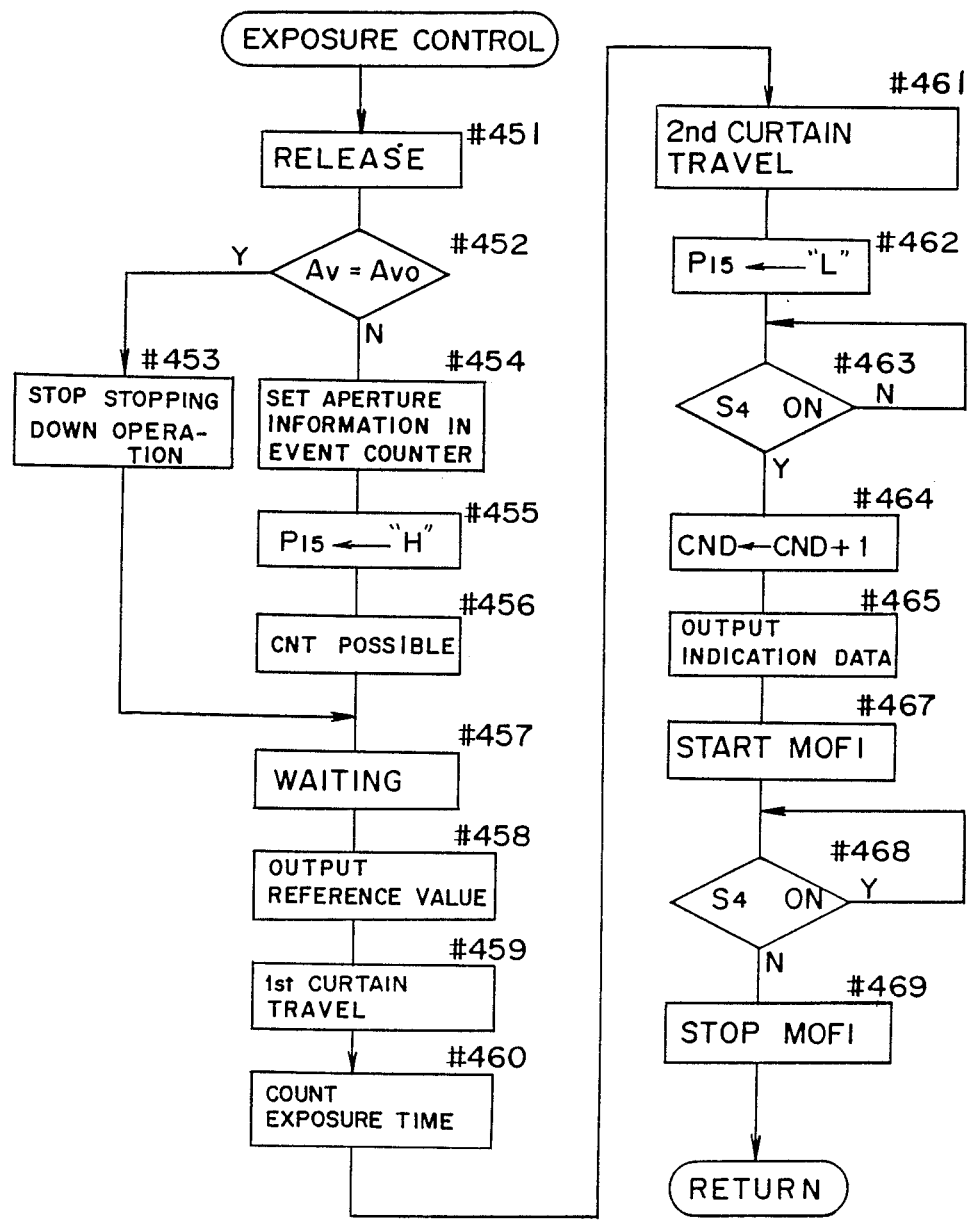

FIG. 24 is a flowchart showing the subroutine "exposure control". When the release button is depressed to the second stroke so as to turn on the release switch S₂, the program goes from step #32 to #33 of the AE routine, that is, the program goes to step #451 in FIG. 24 to execute the processing.

First, data for repelling the release magnets RLM is transferred to the drive circuit DDR so as to move away the mirror provided diagonally in the photographing optical path from the optical path and release the aperture. Thus, the aperture begins to be stopped down at step #451. Thereafter, it is detected at step #452 whether or not the control aperture value Av equals to the minimum aperture value Av0. If the control aperture value Av is equal to the minimum aperture value Av0, data for repelling the magnet APM is transferred to the drive circuit DDR so as to stop the stopping down operation at step #453, then the program goes to step #457. If the control aperture value Av is unequal to the minimum aperture value Av0, the difference between the control aperture value Av and the minimum aperture value Av, namely, the information of the aperture step difference Av−Av0 is set in the event counter at step #454, and "H" is outputted from the terminal P₁₅ so that the pulse outputted from the encoder ENAP is inputted to the counter terminal CNT at step #455. Thereafter, the counter interruption CNT is allowed at step #456. Then, the program goes to step #457. When the stopping down operation is completed, the event counter causes the counter interruption CNT. As previously described about the counter interruption routine CNT (FIG. 10), data for repelling the magnets APM is transmitted to the drive circuit DDR. Thus, the aperture stopping down operation is completed.

At step #457, the microcomputer MCB waits until the mirror completely moves away from the photographing optical path. The waiting period is set to be longer than the period required for the aperture size to be reduced to the minimum.

Thereafter, at step #458, the corrected reference value Sv+α for stopping flash emission is outputted to the light measuring interface LIF. Consequently, the D-A converter mounted in the interface LIF converts the reference value Sv+α into an FSL signal which is an analogue amount. Thereafter, the FSL signal is outputted to the flash light measuring circuit LMF.

As described previously, the flash light measuring circuit LMF comprises the light receiving element PDF. The light receiving element PDF receives a light which has been reflected from the main object, passed through the photographing lens, the aperture, and reflected from the film. The flash light measuring circuit LMF performs a logarithmic compression of the electric current emitted from the light receiving element PDF, thus converting the electric current into a voltage. Thereafter, the flash light measuring circuit LMF adds the information Sv of the film sensitivity and the emission amount compensation amount α to each other, namely, Sv+α, then adds the voltage corresponding to Sv+α to the voltage obtained by the logarithmic compression, and then, performs the logarithmic expansion of the voltage obtained by the addition, thereby converting the added voltage into electric current. On the other hand, when an contact Sx is turned on, the flash control circuit FCC outputs an emission start signal STA to the emission control circuit XCC and an integration start signal ISTA to the flash light measuring circuit LMF through the terminal J₇. In response to the signal ISTA, the flash light measuring circuit LMF starts integrating the logarithmically expanded electric current. Thereafter, when the integrated value reaches the proper exposure amount, the flash light measuring circuit LMF outputs the flash stopping signal FSTP to the flash control circuit FCC through the terminal P₆. In response to the flash stopping signal FSTP, the flash control circuit FCC outputs the emission stop signal STOP to the emission control circuit XCC to stop the flash emission. Accordingly, the emission amount corresponding to the compensation amount α is reduced, which appropriately exposes the main object using the flash light and the natural light. The construction of the flash light measuring circuit LMF is disclosed, for example, in Japanese Utility Model Laid-Open Publication No. 121034/1986.

Next, at step #459, data for repelling the attracting portions of the magnets 1CM is transmitted from the microcomputer MCB to the drive circuit DDR, whereby the first curtain of the shutter travels. When the exposure time counted by the microcomputer MCB at step #460 becomes equal to the control exposure time Tv (already set), data for repelling the attraction portions of the magnets 2CM is transmitted to the drive circuit DDR. As a result, the second curtain of the shutter travels at step #461. Thereafter, at step #462, "L" is outputted from the terminal P₁₅ so that the pulse generated by the encoder ENLE can be inputted to the counter terminal CNT.

Thereafter, the microcomputer MCB waits at step #463 until the photograph completion detecting switch S₄ is turned on. As described above, the switch S₄ is turned on when the mirror pivots downward, the aperture is fully opened, and the travelling of the second curtain of the shutter is completed. When the switch S₄ is turned on, "1" is added to the indication data CND at step #464 and the indication data is transferred to the display circuit DSP so that at step #465 the display circuit DSP indicates the number of exposed frames of the film, exposure information, and so on. Then, at step #467, data for driving the film feeding motor MOFI is transmitted to the motor control circuit MOD through the drive circuit DDR to wind up the film, whereby the charge mechanism interlocked with the film-winding mechanism is actuated. As a result, the shutter, the mirror, and the diaphragming mechanism are cocked. At step #468, the microcomputer MCB waits until the photograph completion detecting switch S₄ is turned off. As described previously, when the film-winding mechanism, the shutter, the mirror, and the diaphragming mechanism have been cocked, the switch S₄ is turned off. When the switch S₄ is turned off, at step #469, the data for stopping the film feeding motor MOFI is transmitted to the motor control circuit MOD through the drive circuit DDR. Thereafter, the program goes to the switch determining routine II (FIG. 7).

If the microcomputer detects that the film is excessively tensed while the film is being wound, the film is rewound by a known method although the step for performing this operation is not shown in any of the flowcharts.

The above is the description of the operation of the embodiment to be performed when the light measuring switch S₁ or the AE lock switch ALS are turned on.

(System reset)

Figure 25:
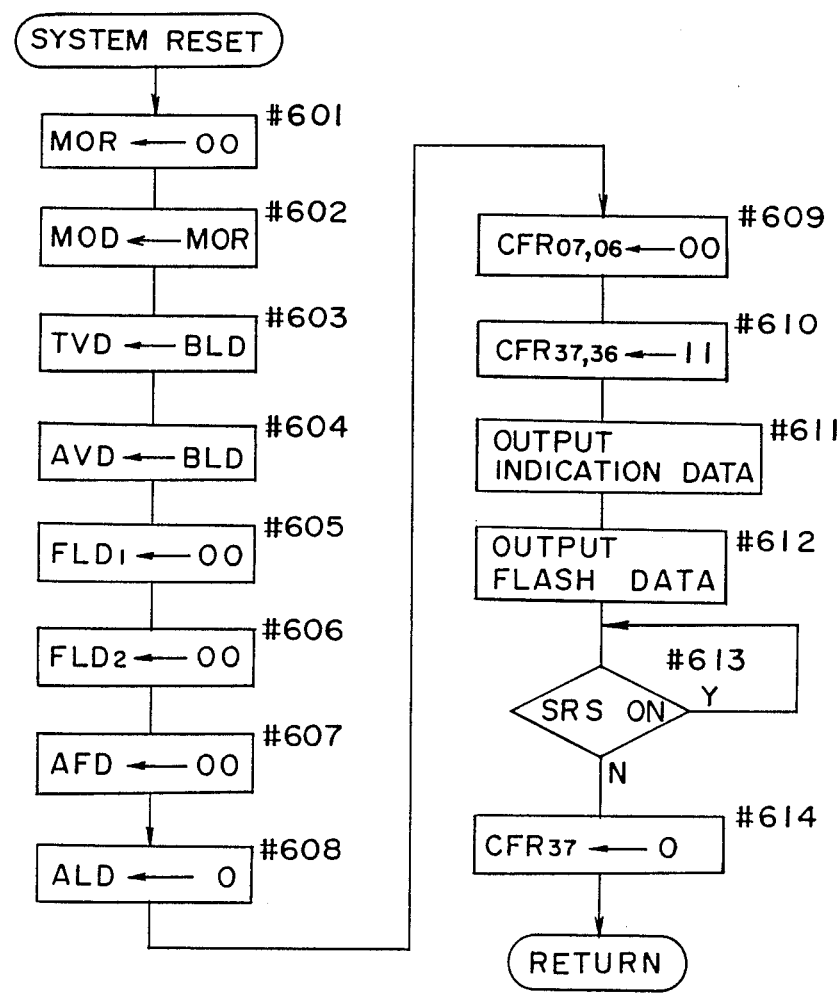

FIG. 25 is a flowchart showing the subroutine for "system reset". In this subroutine, the exposure control mode of the camera system is set to (P), and the flash emitting device is set to the automatic emission mode, the automatic flash stopping mode, and the illumination angle automatic change-over mode.

As described previously, when the reset switch SRS is turned on, the voltage level of the interruption terminal $INT_0$ falls and the microcomputer MCB operates according to the flowchart shown in FIG. 4. The program goes to the subroutine "system reset" (step #14) through steps #1, #2, #3, #10, and #13 and executes processing from step #601 shown in FIG. 25.

First, "00" is stored in the mode register MOR, i.e., the exposure control mode is set to (P) mode at step #601, and the content of the register MOR, namely, "00" is stored in the indication data MOD so that the display circuit DSP indicates the exposure control mode, namely, (P) mode. Then, the blank indication data BLD is stored in the indication data TVD and AVD at step #603 and #604, "00" is stored in the indication data $FLD_1$ and $FLD_2$ at steps #605 and #605, "00" is stored in the indication data AFD at step #607, and "0" is stored in the indication data ALD at step #608 so that the display circuit DSP clears the indications of the control exposure value, the flash data, the in-focus state, and the AE lock state. Then, at step #609, "00" is stored in the high-order two bits $CFR_{07}$ and $CFR_{06}$ of the data $CFR_0$ so as to inform the flash emitting device that the exposure control mode is (p). Further, at step #610, the most significant bit $CFR_{37}$ of the data $CFR_3$ is set so that the system reset of the flash emitting device is effected, and the seventh bit $CFR_{36}$ of the data $CFR_3$ is set so as to stop the operations of the display circuit FDP and the indicator CHD provided in the flash circuit FLC.

When the above-described data have been set, the indication data is transmitted to the display circuit DSP through the data bus SDB, at step #611, and the flash data $CFR_0$ through $CFR_3$ are transmitted to the flash circuit FLC through the data bus SDB at step #612.

Thereafter, the microcomputer MCB waits until the reset switch SRS becomes OFF at step #613. If the "H" is inputted to the terminal $P_8$, it is decided that the reset switch SRS is OFF, so that the program goes to step #614. Accordingly, if the reset switch is kept depressed, the system reset is effected only once. When the program goes to step #614 after the reset switch becomes OFF, the most significant bit $CFR_{37}$ of the data $CFR_3$ is reset to inform the microcomputer MCF of the flash circuit FLC that the camera system has been reset. Thereafter, the program returns and goes to the above-described STOP routine (FIG. 8), and the microcomputer MCB waits until the interruption $INT_0$ occurs again.

(Change of exposure control mode)

Figure 26A:
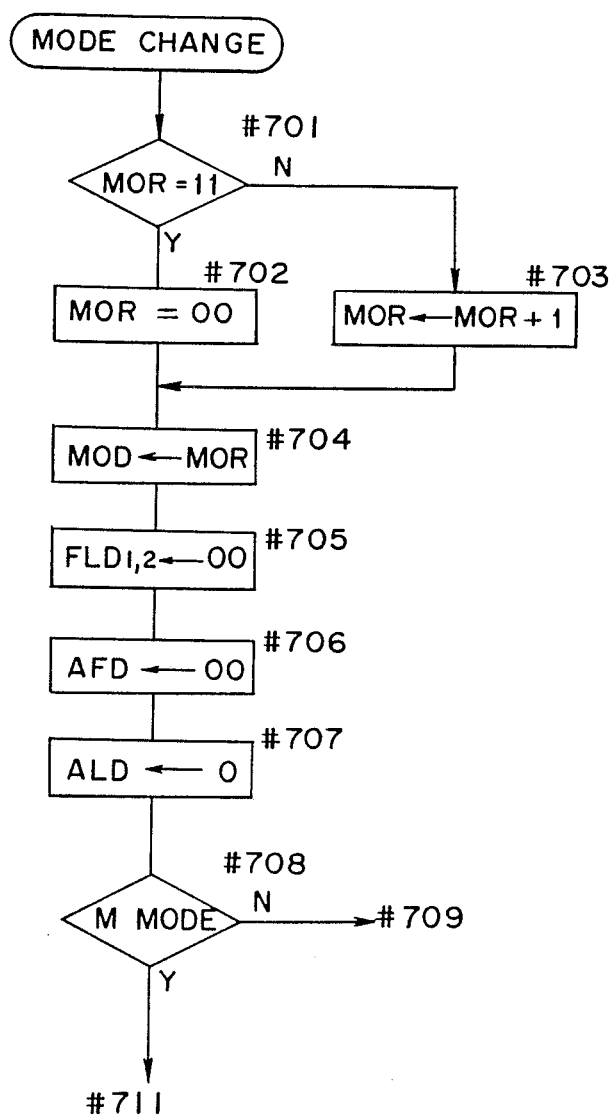
Figure 26B:
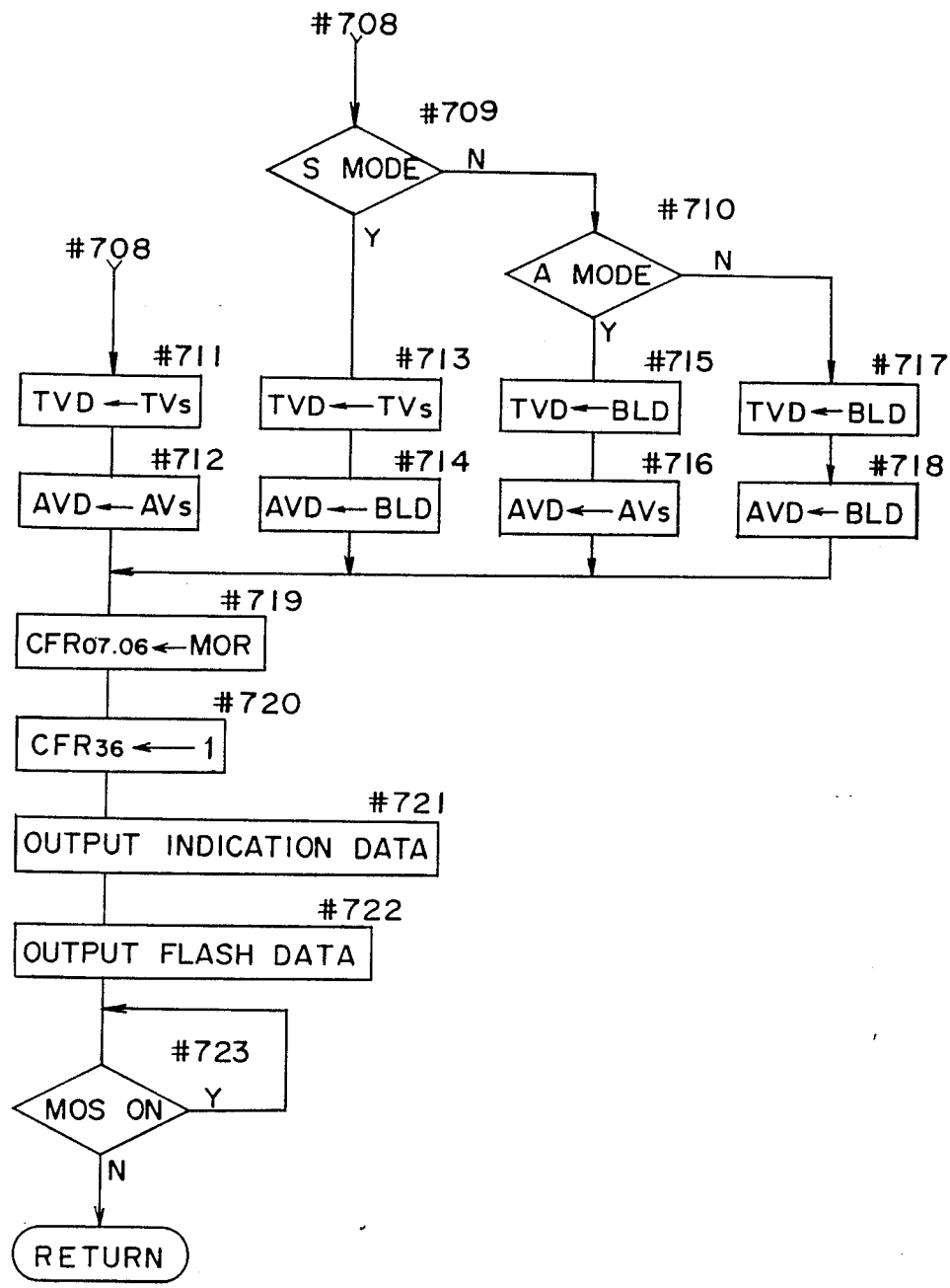

FIGS. 26a and 26b are flowcharts showing the subroutine "mode change". In this subroutine, the exposure control mode of the camera system is changed. As described above, every time the mode change-over switch MOS is turned on, the exposure control mode changes in the order of P, S, A, M, and to P.

As previously described, when the mode change-over switch MOS is turned on, the voltage level of the interruption terminal $INT_0$ falls, and the program goes to the subroutine "mode change" (step #16) through step #1, #2, #3, #10, #13, and #15, then the processing is executed from step #701 shown in FIG. 26.

First, the content of the mode register MOR is checked at step #701. If the content of the register MOR is "11", "00" is stored in the register MOR at step #702. If the content of the register MOR is not "11", the register MOR is incremented, that is, "1" is added to the content of the register MOR. After the mode register MOR is set, the content of the register MOR is transferred to the indication data MOD at step #704 so that the display circuit DSP changes the indication of the exposure control mode.

Thereafter, so that the display circuit DSP clears the indications of the flash data, the in-focus state, and the AE lock state, "00" is stored at step #705 in the indication data $FLD_1$ and $FLD_2$, "00" is stored in the indication data AFD at step #706, and "0" is stored in the indication data ALD at step #707.

Thereafter, it is detected at step #708 through #710 to which of the exposure control modes the camera system is switched. If the exposure control mode is switched to (M) mode, the shutter speed Tvs previously set is stored in the indication data TVD at step #711 and the aperture value Avs previously set is stored in the indication data AVD at step #712 so that the display circuit DSP makes an indication of the shutter speed Tvs and the aperture value Avs both set previously. When the exposure control mode is switched to (S) mode, the shutter speed Tvs previously set is stored in the indication data TVD at step #713 and the blank indication data BLD is stored in the indication data AVD at step #714 so that the display circuit DSP indicates only the shutter speed Tvs set previously. When the exposure control mode is switched to (A) mode, the blank indication data TVD is stored in the indication data TVD at step #715 and the aperture value Avs previously set is stored in the indication data AVD at step #716 so that the display circuit DSP indicates only the aperture value Avs previously set. When the exposure control mode is switched to (P) mode, the blank indication data BLD is stored at steps #717 and #718 in the indication data TVD and AVD so that the display circuit DSP is prohibited to indicate the shutter speed Tv and the aperture value Av.

When the indication data TVD and AVD are set, the content of the mode register MOR is transferred to the high-order two bits $CFR_{07}$ and $CFR_{06}$ of the data $CFR_0$ at step #719 so as to inform the flash circuit FLC of the exposure mode. Thereafter, at step #720, the seventh bit $CFR_{36}$ of the data $CFR_3$ is set to prohibit the operations of the display circuit FDP and the indicator CHD provided in the flash circuit FLC.

When the indication data and the flash data are set, through the data bus SDB, the indication data are transferred to the display circuit DSP at step #721, and the flash data is transferred to the flash circuit FLC at step #722.

Thereafter, the microcomputer MCB waits at step #723 until the mode change-over switch becomes OFF. Accordingly, even if the exposure control mode change-over switch MOS is kept ON, the exposure control mode is not switched again. When the switch MOS is turned OFF, the program returns from this subroutine and progresses to the STOP routine (FIG. 8), and the microcomputer MCB waits until the interruption $INT_0$ occurs again.

[Data setting]

Figure 27A:
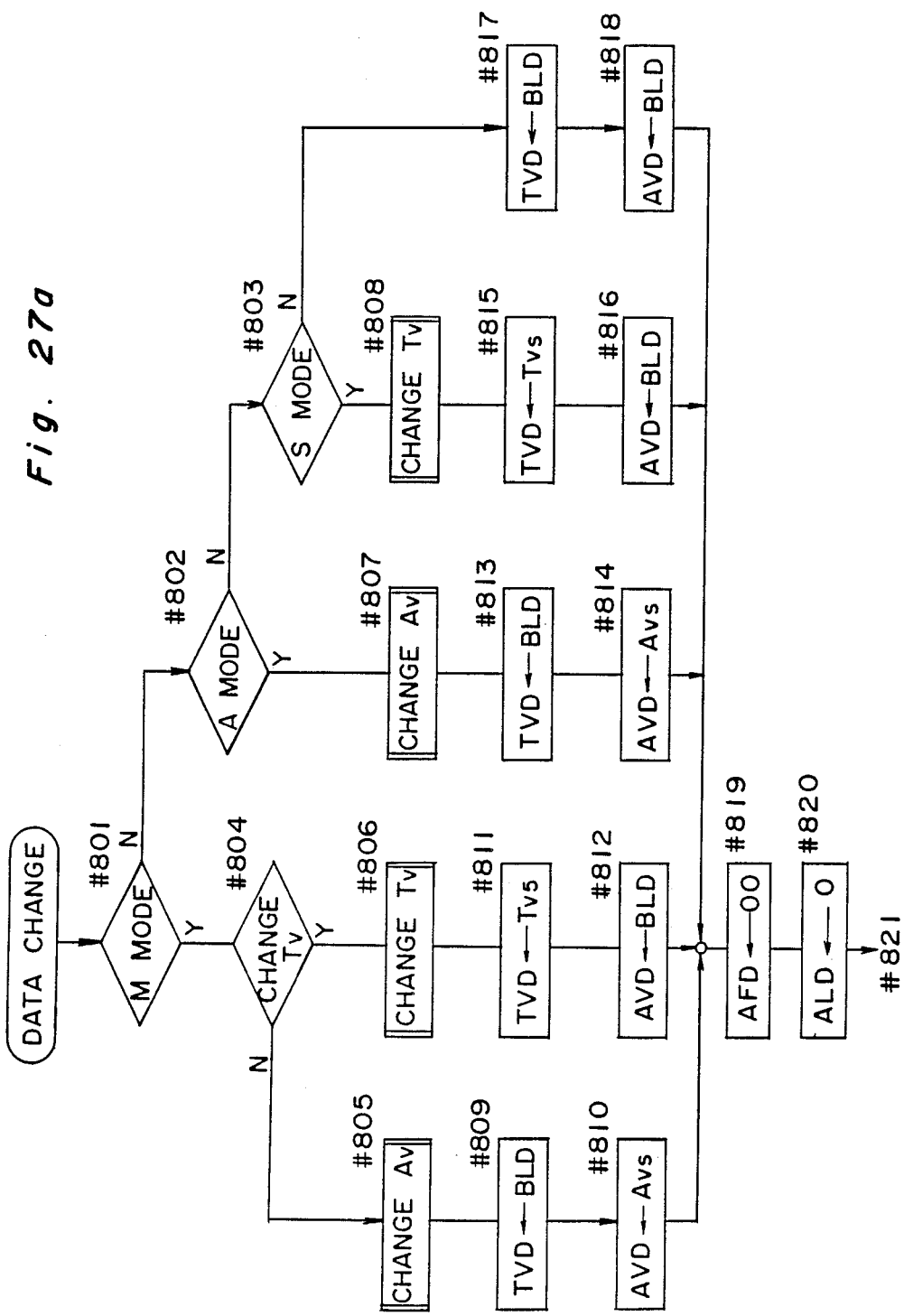
Figure 27B:
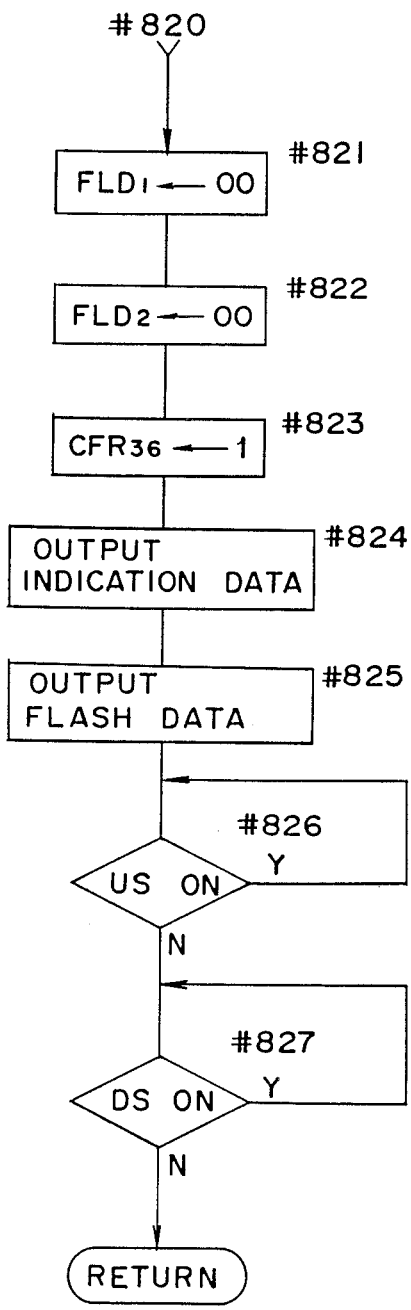

FIGS. 27a and 27b are flowcharts showing the subroutine "data change".

As previously described, when either the data setting switch US or DS is turned on, the voltage level of the interruption terminal INT₀ falls and the microcomputer MCB operates in accordance with the flowchart shown in FIG. 4. After going through steps #1, #2, #3, #13, and #15, the program goes to the subroutine "data change" (#17), i.e., the processing is executed from step #801 of the flowchart shown in FIGS. 27a and 27b.

First, the exposure control mode is detected at step #801 through step #803. If the exposure control mode is (M), the program goes to step #804 at which it is detected which of the shutter speed Tvs and the aperture value Avs is going to be changed. When the change-over switch ASS is ON, that is, and "L" is inputted to the terminal P₁₄, it is decided that the aperture value Avs is going to be changed, then the program goes to step #805 so as to change the aperture value Avs. On the other hand, when the change-over switch ASS is OFF, that is, and "H" is inputted to the terminal P₁₄, it is decided that the shutter speed Tvs is going to be changed, so that the program goes to step #806 to change the shutter speed Tvs.

If the exposure control mode is (A), the aperture value is changed at step #807 regardless of whether the change-over switch ASS is ON or OFF. If the exposure control mode is (S), the shutter speed Tvs is changed at step #808 regardless of whether the switch ASS is ON or OFF.

When the shutter speed Tvs or the aperture value Avs has been changed, at steps #809 through #816, the data which indicates the changed shutter speed Tvs or aperture value Avs is stored in the indication data TVD or AVD, and the blank indication data BLD is stored in the indication data AVD or TVD so that the display circuit DSP indicates only the changed shutter speed Tvs or aperture value Avs.

When the exposure control mode is (P), the data is not changed in this subroutine because neither the shutter speed Tvs nor the aperture value Avs is set, and the blank indication data BLD is stored in the indication data TVD and AVD at steps #817 and #818 so that the display circuit DSP is prohibited to indicate neither the shutter speed Tvs nor the aperture value Avs.

When the shutter speed Tvs and the aperture value Avs have been changed and the indication data TVD and AVD have been set, "00" is stored in the indication data AFD at step #819, "0" is stored in the indication data ALD at step #820, "00" is stored in the indication data FLD₁ at step #821, and "00" is stored in the indication data FLD₂ at step #822 so that the display circuit DSP clears the indication of the in-focus state, the indication of the AE lock, and the indication of the flash information. Thereafter, at step #823, the seventh bit CFR₃₆ of the data CFR₃ is set at step #823 to stop the operation of the display circuit FDP and the indicator CHD of the flash circuit FLC. Then, the indication data are transmitted from the microcomputer MCB to the display circuit DSP through the data bus SDB at step #824, and the flash data are transmitted to the flash circuit FLC through the data bus SDB at step #825.

When the data have been outputted, the microcomputer MCB waits until the setting switches US and DS are both OFF at steps #826 and #827, and then the program returns from this subroutine. Thereafter, the program goes to the STOP routine (FIG. 8), and the microcomputer MCB waits until the interruption INT₀ occurs again.

Figure 28:
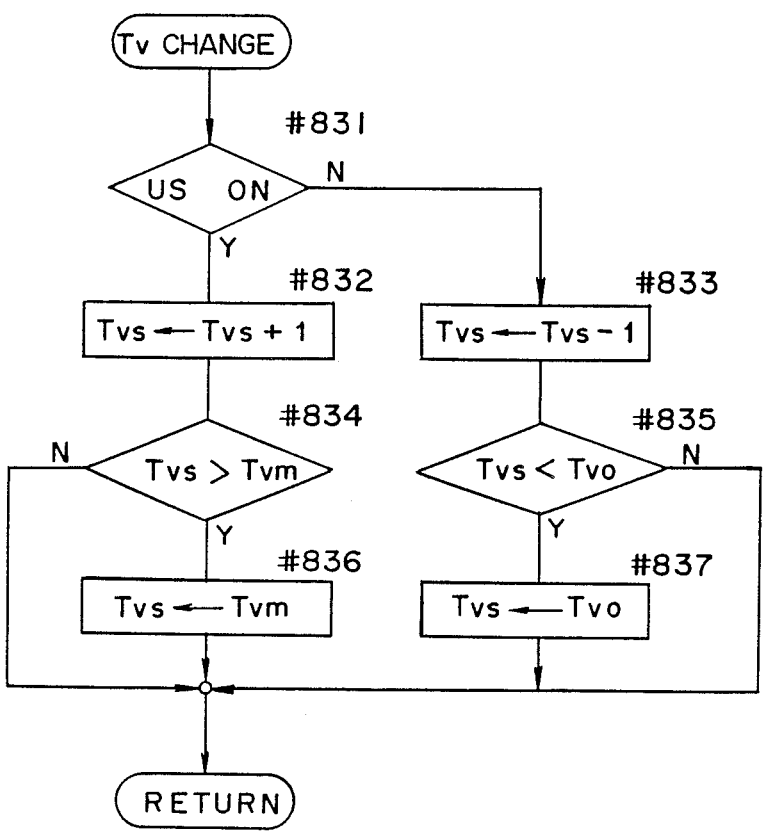

FIG. 28 is a flowchart showing the subroutine "Tv change" shown in the subroutine "data change" (FIGS. 27a and 27b). In this subroutine, the shutter speed Tvs is increased by 1 Ev when the setting switch US is ON, and the shutter speed Tvs is reduced by 1 Ev when the setting switch DS is ON.

First, it is detected whether or not the setting switch US is ON at step #831. If the "L" is inputted to the terminal P₁₀, it is decided that the switch US is ON, then the program goes to step #832. If not, it is decided that the setting switch DS is ON, then the program goes to step #833.

When the program goes to step #832 with the setting switch US being ON, the shutter speed Tvs is increased by 1 Ev. If the changed shutter speed Tvs is faster than the fastest shutter speed Tvm (for example, 1/4000 sec.) of the camera at step #834, the shutter speed Tvs is again set to the fastest shutter speed Tvm at step #836.

When the program goes to step #833 with the setting switch DS being ON, the shutter speed Tvs is reduced by 1 Ev. If the changed shutter speed Tvs is slower than the slowest shutter speed Tv0 (for example, 30 sec.) of the camera at step #385, the shutter speed Tvs is again set to the slowest shutter speed Tv0 at step #837.

When the shutter speed Tvs has been changed, the program returns to the subroutine "data change" (FIGS. 27a and 27b) to continue executing the processing.

Figure 29:
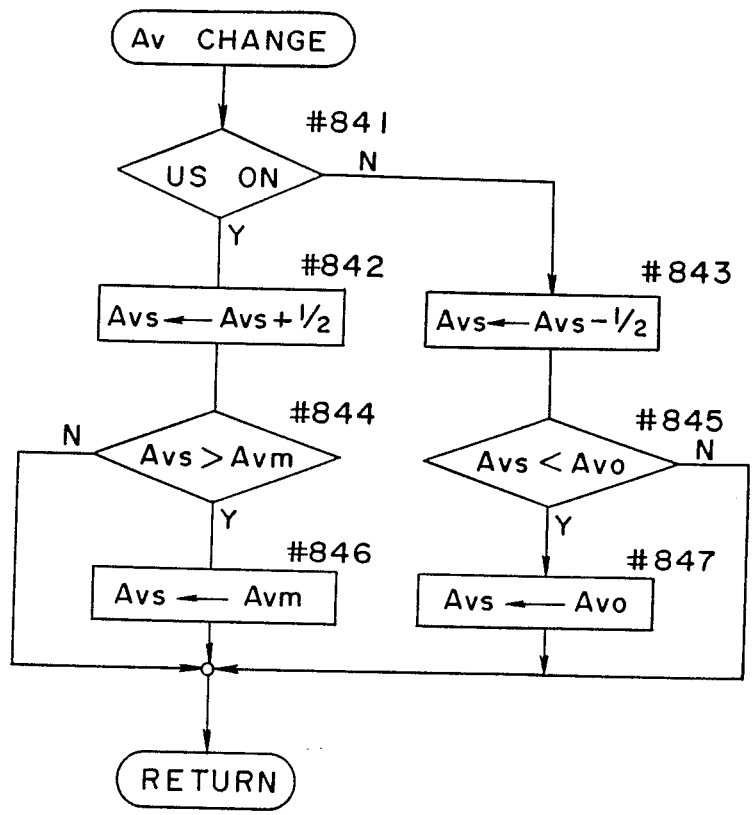

FIG. 29 is a flowchart showing the subroutine "Av change" shown in the subroutine "data change" (FIGS. 27a and 27b). In this subroutine, when the setting switch US is ON, the aperture value Avs is increased by ½Ev, and when the setting switch DS is ON, the aperture value Avs is reduced by ½Ev.

First, it is detected at step #841 whether or not the setting switch US is ON. If "L" is inputted to the terminal P₁₀, it is decided that the switch US is ON, then the program goes to step #842. If "L" is not inputted to the terminal P₁₀, it is decided that the setting switch DS is ON, then the program goes to step #843.

When the program goes to step #842 with the setting switch being ON, the aperture value Avs is increased by ½Ev. If the changed aperture value Avs is greater than the maximum aperture value Avm (inputted from the lens circuit LEC) of the photographing lens at step #844, the aperture value Avs is set to the maximum aperture value Avm at step #846.

If the program goes to step #843 with the setting switch being ON, the aperture value Avs is reduced by ½Ev. If the changed aperture value Avs is smaller than the minimum aperture value Av0 at step #845, the aperture value Avs is again set to the minimum aperture value Av0 at step #847.

When the aperture value Avs has been changed, the program returns to the subroutine "data change" to continue the processing.

(Microcomputer MCF)

FIGS. 30 through 34 are flowcharts showing the operation of the microcomputer MCF provided in the flash emitting device (FIG. 3) of the camera system of the embodiment.

(INTA)

Figure 30A:
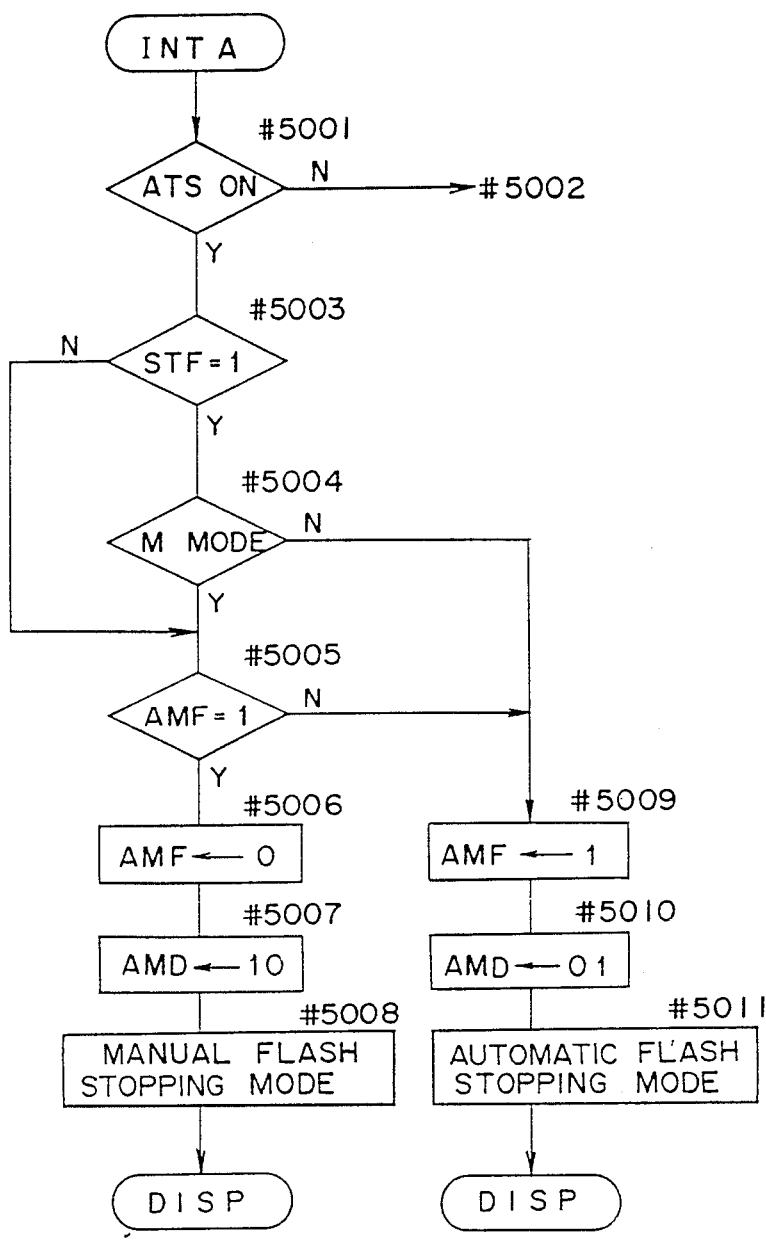
Figure 30B:
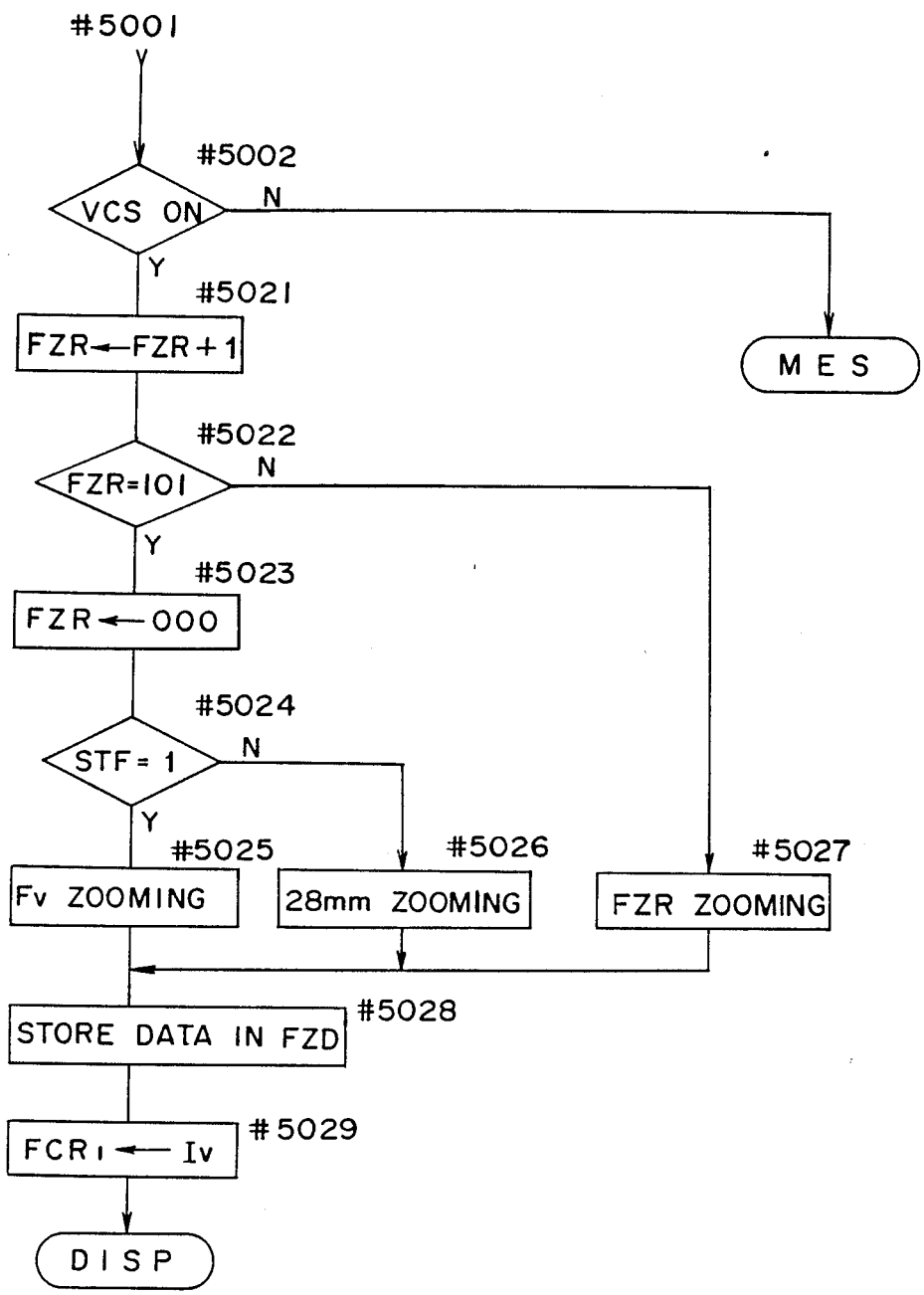

When either of the flash stopping mode change-over switch ATS, the illumination range change-over switch VCS, and the emission mode change-over switch MES is turned on, the level of the interruption terminal INTA of the microcomputer MCF falls, and in synchronization of the fall, the microcomputer MCF starts its operation in accordance with the flowchart shown in FIGS. 30a and 30b.

Figure 31:
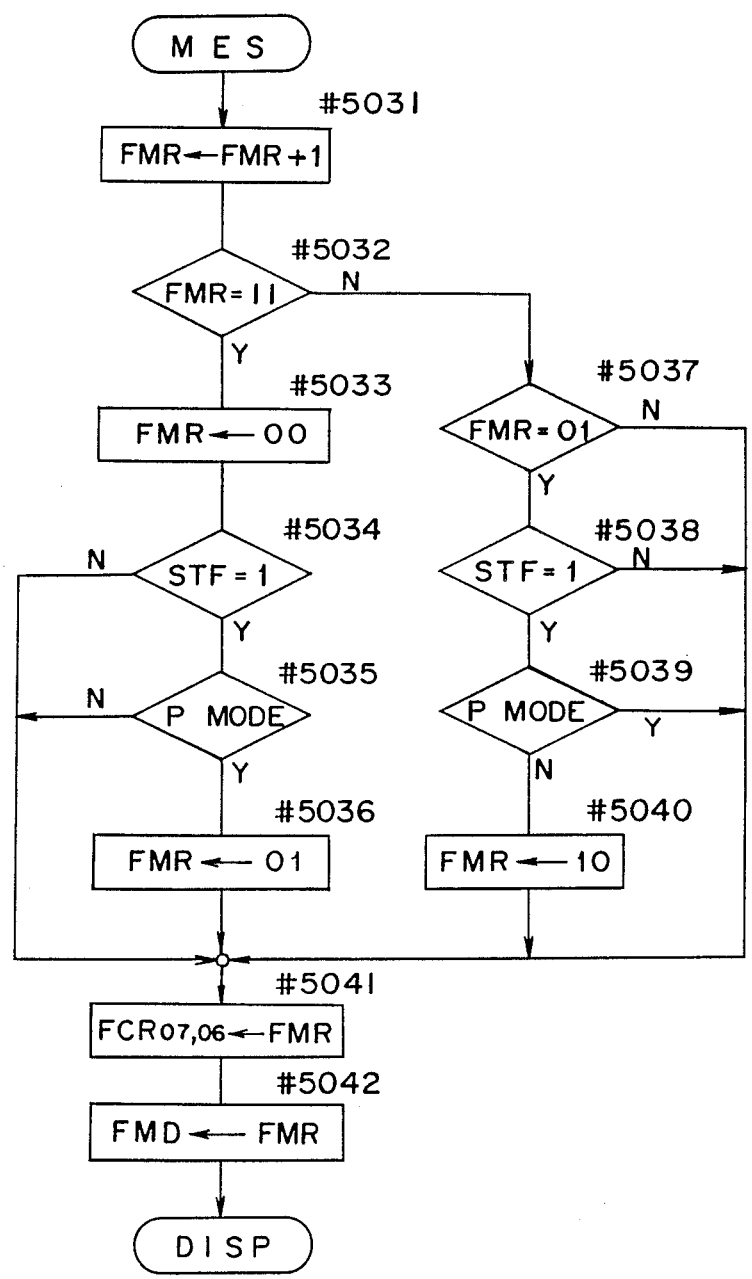

It is detected at steps #5001 and #5002 which of the switches causes the interruption INTA. That is, if the terminal $P_{20}$ is "L" at step #5001, it is decided that the interruption INTA is caused by the operation of the flash stopping mode change-over switch ATS, so that the program goes to step #5003. If the terminal $P_{20}$ is "H", the program goes to step #5002. If the terminal $P_{21}$ is "L" at step #5002, it is decided that the interruption INTA is caused by the illumination range change-over switch VCS, then the program goes to step #5021. If the terminal $P_{21}$ is "H" at step #5002, it is decided that the interruption is caused by the emission mode change-over switch MES, then the program goes to the MES routine (FIG. 31).

(Change-over of flash stopping mode)

When the interruption INTA is caused by the flash stopping mode change-over switch ATS, the state of the flag STF is checked at step #5003. If the flag STF is set at step #5003, the program goes to step #5004. If the flag STF is reset at step #5003, the program skips to step #5005. At step #5004, the exposure control mode of the camera system is detected. If the exposure control mode is (M), the program goes to step #5005, and if the exposure control mode is not (M), the program goes to step #5009. At step #5005, the flash stopping mode is detected. If the flag AMF is set, it is decided that the flash stopping mode is the automatic flash stopping mode, so that the program goes to step #5006 at which the flag AMF is reset to cancel the automatic flash stopping mode. Then, "10" is stored in the indication data AMD at step #5007 so that the display circuit FDP indicates that the automatic flash stopping mode is cancelled. Thereafter, at step #5008, "H" is outputted from the terminal $P_{34}$ so that the flash control circuit FCC ignores the flash stopping signal FSTP transferred from the camera through the terminal $J_6$. Thereafter, the program goes to DISP routine (FIG. 32) so that the microcomputer MCF controls the indicator CHD and outputs the indication data, and waits until the next interruption occurs.

If the flag AMF is reset at step #5005, it is decided that the flash stopping mode is not the automatic mode, so that the program goes to step #5009. At step #5009, the flag AMF is set so that the flash stopping mode is set to the automatic mode, then "01" is stored in the indication data AMD at step #5010 so that the display circuit FDP indicates that the mode is set to the automatic flash stopping mode. Thereafter, "L" is outputted from the terminal $P_{34}$ so that it is permitted for the flash control circuit FCC to operate in response to the flash stopping signal ESTP at step #5011, then the program goes to the DISP routine (FIGS. 32a and 32b) in which the indicator CHD is controlled and the indication data is outputted. Then, the microcomputer MCF waits until the next interruption occurs.

As described above, in the flash emitting device of the camera system of the embodiment, when the flag STF is reset, i.e., when the flash emitting device is operating independently of the camera system, the flash stopping mode can be switched regardless of the exposure control mode. On the other hand, in case that the flag STF is set, i.e., in case that the flash emitting device becomes operatively connected to the camera system, the flash stopping mode can be switched only when the exposure control mode is (M), and the flash stopping mode is forcibly switched to the automatic flash stopping mode when the exposure control mode is (P), (A), or (S) (automatic exposure mode). Therefore, a photograph is not carried out in combination of the manual flash stopping mode (flash light is fully emitted) in which the flash stopping signal FSTP is ignored and the automatic exposure control mode.

[Change-over of illumination range]

When the illumination range change-over switch VCS causes the interruption INTA, the program goes to step #5021 at which "1" is added to the illumination range register FZR. If the content of the register FZR becomes "101" at step #5022, "000" is stored in the register FZR at step #5023, that is, the illumination range is set to "automatic". If an illumination range is "automatic", the state of the flag STF is examined at step #5024.

If the flag STF is set, that is, if the flash emitting device is operating as part of the camera system, either of data of "001" (28 mm), "010" (35 mm), "011" (50 mm), and "100" (70 mm) is set in the illumination range detecting register (provided in the microcomputer MCF) according to the focal length Fv so that the field angle of the photographing lens (focal length Fv (apex value)) mounted on the camera can be covered by the flash light. Then, at step #5025, the emission panel is moved to the position corresponding to the data thus set.

If the flag STF is reset at step #5024, that is, if the flash emitting device operates independently of the camera system, the data of "001" (28 mm) is set to the illumination range detecting register. Then, at step #5026, the emission panel is moved to the position nearest the flash emitting device (the position in which the flash light can cover the field angle of the photographing lens having the focal length of 28 mm).

If the content of the register FZR is not "101" at step #5022, namely, not automatic mode, the content of the register FZR is transferred to the illumination range detecting register. Then, at step #5027, the emission panel is moved to the position in which the flash light covers the field angle of the photographing lens having the focal length shown by the value of the register FZR.

A more detailed description is made with reference to FIG. 3 with regard to the movement of the emission panel at steps #5025, #5026, and #5027. When the emission panel is moved forward from the current position, for example, when the content of the register FZR is "011" and the emission panel is moved from the position in which the flash light covers the field angle of the photographing lens having the focal length of 35 mm to the position in which the flash light covers the field angle of the photographing lens having the focal length of 50 mm and which is forward from the former position, signals are outputted from the terminals $P_{26}$ and $P_{27}$ to the motor control circuit MDR so that the motor control circuit MDR rotates the motor MOFL. As a result, the position detecting circuit ZCP outputs a signal corresponding to the position of the emission panel, and the signal is transmitted to the terminals $P_{28}$ and $P_{29}$ of the microcomputer MCF. When the position of the emission panel indicated by the signal coincides with the position indicated by the illumination range detecting register, a stop signal is transmitted from the terminals $P_{26}$ and $P_{27}$ to the motor control circuit MDR.

In response to the stop signal, the motor control circuit MDR stops the motor MOFL. When the emission panel is moved backward, the rotational direction of the motor MOFL is reversed and the operation to be performed in this case is similar to the case in which the emission panel is moved forward.

The illumination range may be changed not only by changing the position of the emission panel located on the front portion of the emission portion, but also by changing the configuration of the concave reflector or by changing the position of the Xe tube which is the emitting source. In addition, the illumination range may also be varied by altering the transmission characteristic of the emission panel disposed on the front of the emission portion by mechanically shifting it or by electro-optically changing the transmission of the emission panel by forming it with an electro-optic element.

Referring to FIGS. 30a, 30b, when the emission panel is moved at steps #5025, #5026, and #5027, data are stored in the indication data FZD at step #5028 so that the display circuit FDP makes the indication of the focal length of the photographing lens having the field angle covered by the flash light and automatic/manual.

That is, if the content of the register FZR is "000", i.e., the illumination range is automatically adjusted, "1" is stored in the most significant bit of the data FZD and any one of "001" (28 mm), "010" (35 mm), "011" (50 mm), and "100" (70 mm) is stored in the low-order three bits of the indication data FZD according to the focal length information Fv transmitted from the camera body. If the content of the register FZR is not "000", i.e., the illumination range is manually adjusted, "0" is stored in the most significant bit of the data FZD and the content of the register FZR is transferred to the low-order three bits.

Figure 32A:
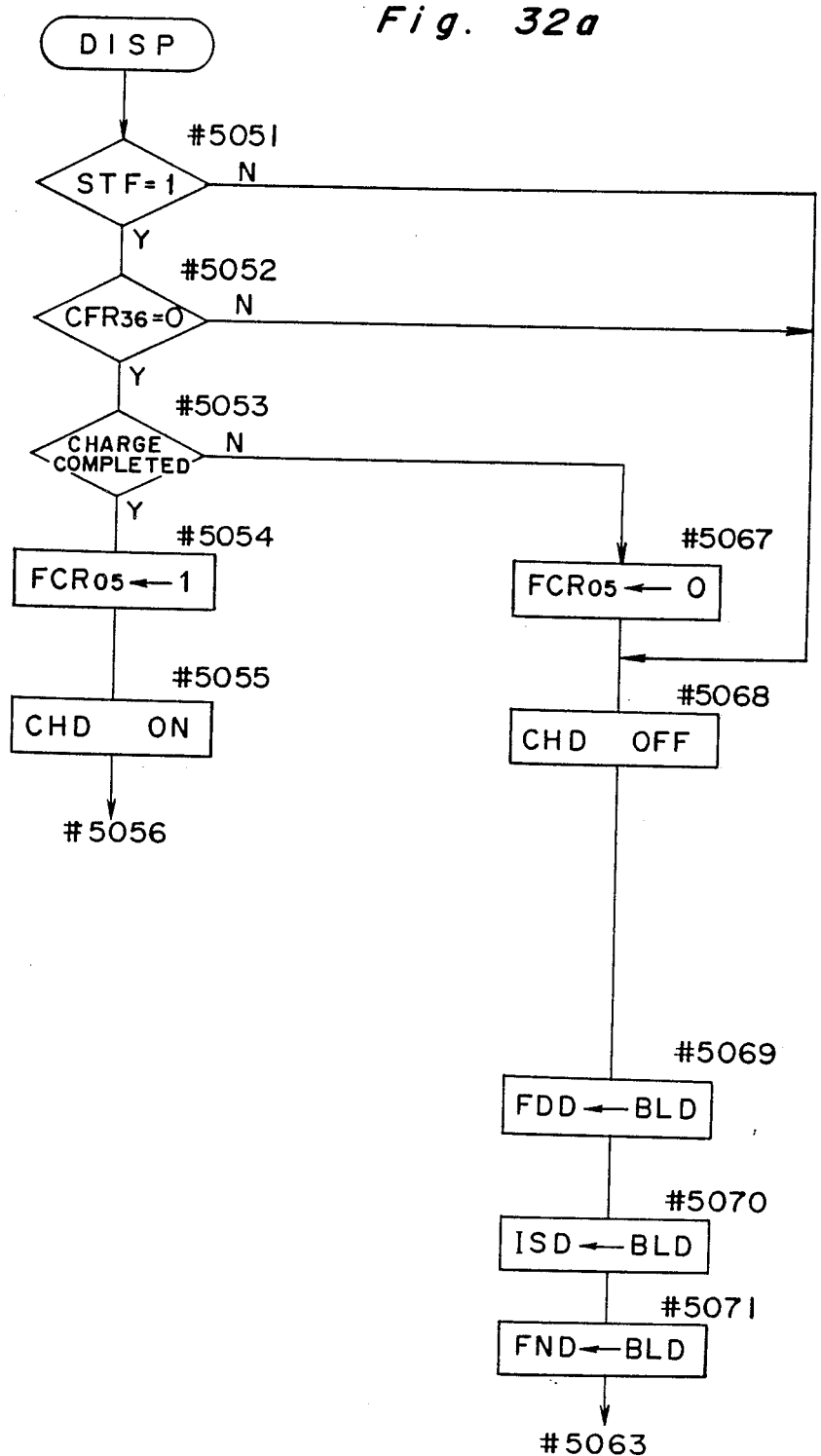
Figure 32B:
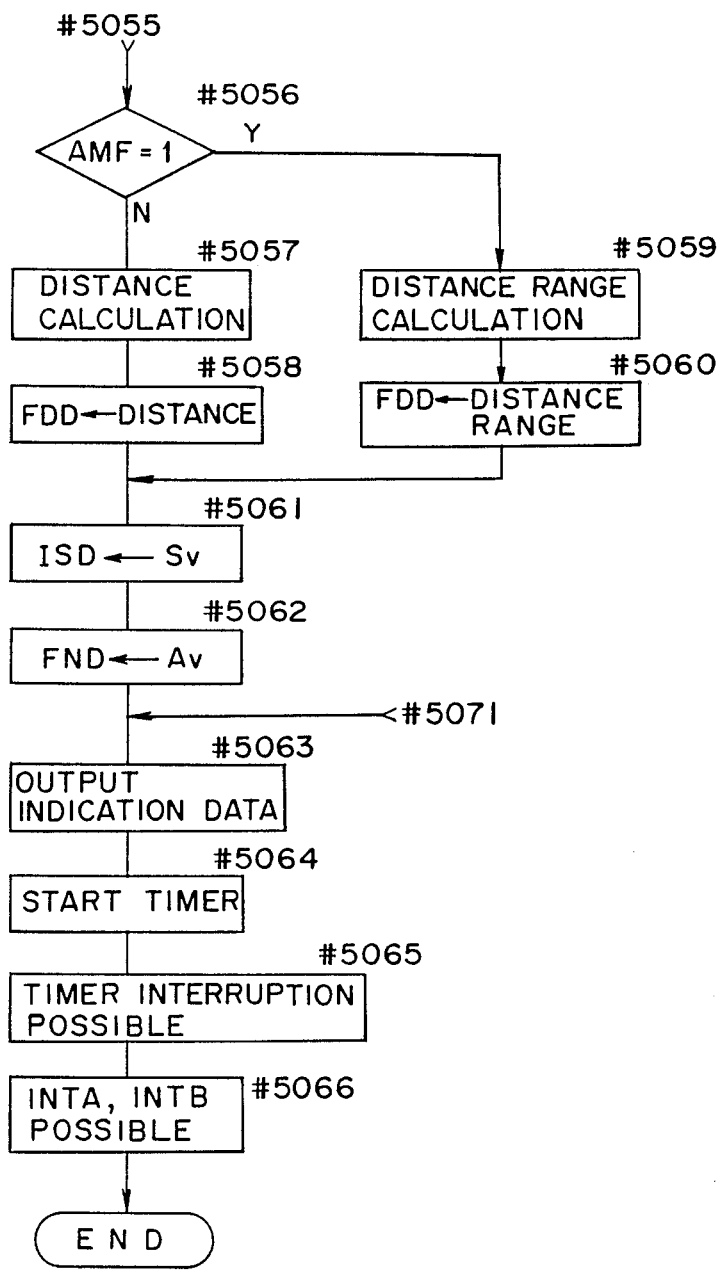

Thereafter, the maximum emission amount Iv varied according to the change of the illumination range is stored in the data $FCR_1$ at #5029, then the program goes to the DISP routine (FIGS. 32a and 32b).

(Change-over of emission mode)

FIG. 31 is a flowchart showing the MES routine. When the interruption INTA is caused by the operation of the emission mode change-over switch MES, the program goes to this routine through steps #5001 and #5002. First, "1" is added to the emission mode register FMR at step #5031. The register FMR stores data corresponding to the flash emission mode and when the content of the register FMR is "00", "01", and "10", the flash emission mode is the forced emission mode, the automatic emission mode, and the non-emission mode, respectively.

If at step #5032 the content of the register FMR becomes "11" as a result of the addition of "1" thereto at step #5031, "00" is stored in the register FMR, that is, the emission mode is switched to the forced emission mode at step #5033. Thereafter, the state of the flag STF is detected at step #5034. If the flag STF is set, that is, if the flash emitting device operates as part of the camera system, the program goes to step #5035. If the flag STF is reset, i.e., if the flash emitting device operates independently of the camera system, the program skips to step #5041. It is detected at step #5035 whether or not the exposure control mode of the camera system is (P). If the exposure control mode is (P), "01" is stored at step #5036 in the register FMR to switch the emission mode to the automatic emission mode. If the exposure control mode is not (P) at step #5035, the program skips to step #5041.

If the content of the register FMR is not "11" at step #5032, the program goes to step #5037 at which it is detected whether or not the content of the register FMR is "01", i.e., it is detected whether or not the emission mode is switched to the automatic emission mode. If the content of the register is not "01", i.e., if the content of the register FMR is "10", namely, the emission mode is switched to the non-emission mode, the program skips to step #5041.

When it is decided at step #5037 that the emission mode is switched to the automatic emission mode, the program goes to step #5038 so as to detect the state of the flag STF. If the flag STF is set at step #5038, i.e., if the flash emitting device operates as part of the camera system, the program goes to step #5039. If the flag STF is reset, i.e., if the flash emitting device operates independently of the camera system, the program skips to step #5041. It is detected at step #5039 whether or not the exposure control mode of the camera system is (P). If the exposure control mode is (P), the program skips to step #5041. If the exposure control mode is not (P), the program goes to step #5040 at which "10" is stored in the register FMR. That is, the mode is switched to the non-emission mode.

The summary of the above-described operation is as follows: When the flash emitting device is operating independently of the camera system, the emission mode is switched in the order of the forced emission mode, automatic emission, non-emission, and forced emission according to the operation of the emission mode change-over switch MES. When the flash emitting device is interlocked with the camera system, the emission mode is switched in response to the switch MES in the order of automatic emission, non-emission, and automatic emission if the exposure control mode of the camera system is (P), while if the exposure mode control mode is not (P), the emission mode is switched in response to the switch MES from forced emission, non-emission, to forced emission. That is, when the flash emitting device is operating as part of the camera system, the emission mode is switched between the automatic emission mode and the non-emission mode if the exposure control mode is (P), while when the exposure control mode is either of (A), (S), and (M), the emission mode is switched between the forced emission mode and the non-emission mode (refer to Tables. 10 and 11.)

When the emission mode is switched according to step #5031 through #5040, the content of the register FMR is transferred at step #5041 to the high-order two bits $FCR_{06}$ and $FCR_{07}$ of the data $FCR_0$ so that the emission mode is informed to the microcomputer MCB of the camera body. In addition, the content of the register FMR is transferred to the indication data FMD at step #5042 so that the display circuit FDP indicates the emission mode. Then, the program goes to the DISP routine (FIG. 32)

(DISP routine)

FIGS. 32a and 32b are flowcharts showing the DISP routine. In this routine, first, the state of the flag STF is detected at step #5051. If the flag STF is set, the program goes to step #5052. If the flag STF is reset, the program goes to step #5068. As described later, when the program goes to step #5068, the display circuit FDP clears the light amount adjustable-distance range, the film sensitivity Sv, and the control aperture value Av, and the charge completion indicated by the indicator CHD is cleared.

At step #5052, the seventh bit $CFR_{36}$ of the data $CFR_3$ is detected. As described above, when the display circuit FDP and the indicator CHD are allowed to make indications, the seventh bit $CFR_{36}$ of the data $CFR_3$ is reset, and when the display circuit FDP and the indicator CHD are prohibited to make indications, the seventh bit $CFR_{36}$ of the data $CFR_3$ is set. Accordingly, if the seventh bit $CFR_{36}$ of the data $CFR_3$ is set, the program goes to step #5068 so that the indications made by the display circuit FDP and the indicator CHD are cleared. If the seventh bit $CFR_{36}$ of the data $CFR_3$ is reset, the program goes to step #5053.

At step #5053, the state of the main capacitor MC is examined. If the main capacitor MC is charged in the predetermined value (for example, 300 V), the program goes to step #5054, and if not, the program goes to step #5067.

The method for detecting the voltage applied to the main capacitor MC is described with reference to FIG. 3.

First, "H" is outputted from the terminal $P_{31}$ so that the transistor $TR_1$ is conductive. If the charged voltage of the main capacitor MC is lower than the predetermined value, the neon tube NE is not discharged, so that electric current does not flow between the collector and the emitter of the transistor $TR_1$. Accordingly, electric current does not flow into the charge detecting terminal $P_{32}$, so that the level of the terminal $P_{32}$ is "L". Thereafter, when the charged voltage of the main capacitor MC reaches the predetermined value, the neon tube NE is discharged, so that electric current flows between the collector and the emitter of the transistor $TR_1$.

Accordingly, electric current flows into the charge detecting terminal $P_{32}$, so that the voltage level of the terminal $P_{32}$ becomes "H". When it is detected that the terminal $P_{32}$ becomes "H", it is decided that the main capacitor MC is charged in the predetermined voltage.

Returning to FIGS. 32a and 32b, when the main capacitor MC is charged in the predetermined value at step #5053 and the program goes to step #5054, the sixth bit $FCR_{05}$ of the data $FCR_0$ is set so that the microcomputer MCF informs the microcomputer MCB provided in the camera body that the main capacitor MC is charged in the predetermined value. Then, at step #5055, "H" is outputted from the terminal $P_{24}$ so as to turn on the indicator CHD so that the indicator CHD indicates that the main capacitor MC is charged in the predetermined value.

Thereafter, at step #5056, the state of the flash stopping mode is checked. If the flag AMF is reset, i.e., if the mode is not the automatic flash stopping mode, the program goes to step #5057, and the distance at which a correct exposure can be obtained is calculated, and the data of the calculated distance is stored in the indication data FDD at step #5058 so that the calculated data is indicated by the display circuit FDP. The calculation of the distance Dv at which the correct exposure is obtained is performed according to the maximum emission amount Iv, the aperture value Av transferred from the camera body, and the film sensitivity information Sv by the following equation:

$$Dv = Iv + Sv - Av.$$

If the flag AMF is set at step #5056, i.e., if the mode is the automatic flash stopping mode, the program goes to step #5059 at which the microcomputer MCB calculates a distance range in which flash light can be emitted correctly. The longest photographing distance Dv at which the flash light can be emitted correctly is calculated according to the maximum emission amount Iv, the aperture value Av transferred from the camera body, and the film sensitivity information Sv by the following equation:

$$Dv = Iv + Sv - Av.$$

Thereafter, the shortest photographing distance Dv' at which flash light can be emitted correctly is calculated according to the minimum emission amount Iv' by the following equation:

$$Dv' = Iv' + Sv - Av.$$

When the flash emitting device is mounted on the camera body, the shortest photographing distance Dv" in which no parallax is generated between the photograph field angle and the illumination range and the calculated shortest photo(>graphing distance Dv' are compared with each other so as to adopt the longer photographing distance as the shortest photograph distance. Thus, a distance range Dv' (or Dv")~Dv in which flash light can be emitted correctly is calculated. Thereafter, the data of the distance range Dv' (or Dv")~Dv is stored in the indication data FDD at step #5060.

After the data is stored in the indication data FDD, the film sensitivity information Sv is stored in the indication data ISD at step #5061 and the aperture value Av is stored in the indication data FND at step #5062 so that the display circuit FDP indicates the film sensitivity Sv and the aperture value Av. Then, the microcomputer MCF outputs at step #5063 the indication data AMD, FDD, FMD, FND, FZD, and ISD to the display circuit FDP. Thereafter, the timer counter (T) is reset, i.e., "0" is stored in the timer counter (T), and the operation of the timer provided in the microcomputer MCF is started at step #5064. Then, at steps #5065 and #5066, the microcomputer MCF is enabled for the interruption of the timer contained therein, the interruptions INT and INTB caused by the fall of the interruption terminals $\overline{INTA}$ and $\overline{INTB}$. The microcomputer MCF waits until either of the interruptions occurs.

When the program goes to step #5067 with detection that the main capacitor has not been charged in the predetermined value at step #5053, the sixth bit $FCR_{05}$ of the data $FCR_0$ is reset to inform this state of the microcomputer MCB, and then, the program goes to step #5068 so as to clear the indications made by the display circuit FDP and the indicator CHD.

At step #5068, first, "L" is outputted from the terminal $P_{24}$ and the indicator CHD is turned off. Thereafter, the blank indication data BLD are stored in the indication data FDD, ISD, and FND at steps #5069, #5070, #5071 so as to clear the indications of the flash light amount-adjustable range, the film sensitivity information Sv, and the aperture value Av. Thereafter, the program goes to steps subsequent to step #5063, and the microcomputer MCF waits until the next interruption occurs.

When the program goes to step #5068, the following indications are cleared: The indication of the charge state of the main capacitor MC made by the indicator CHD, and the indication of the flash light amount-adjustable range, the film sensitivity information, and the aperture value Av made by the display circuit FDP.

(INTB)

Figure 33A:
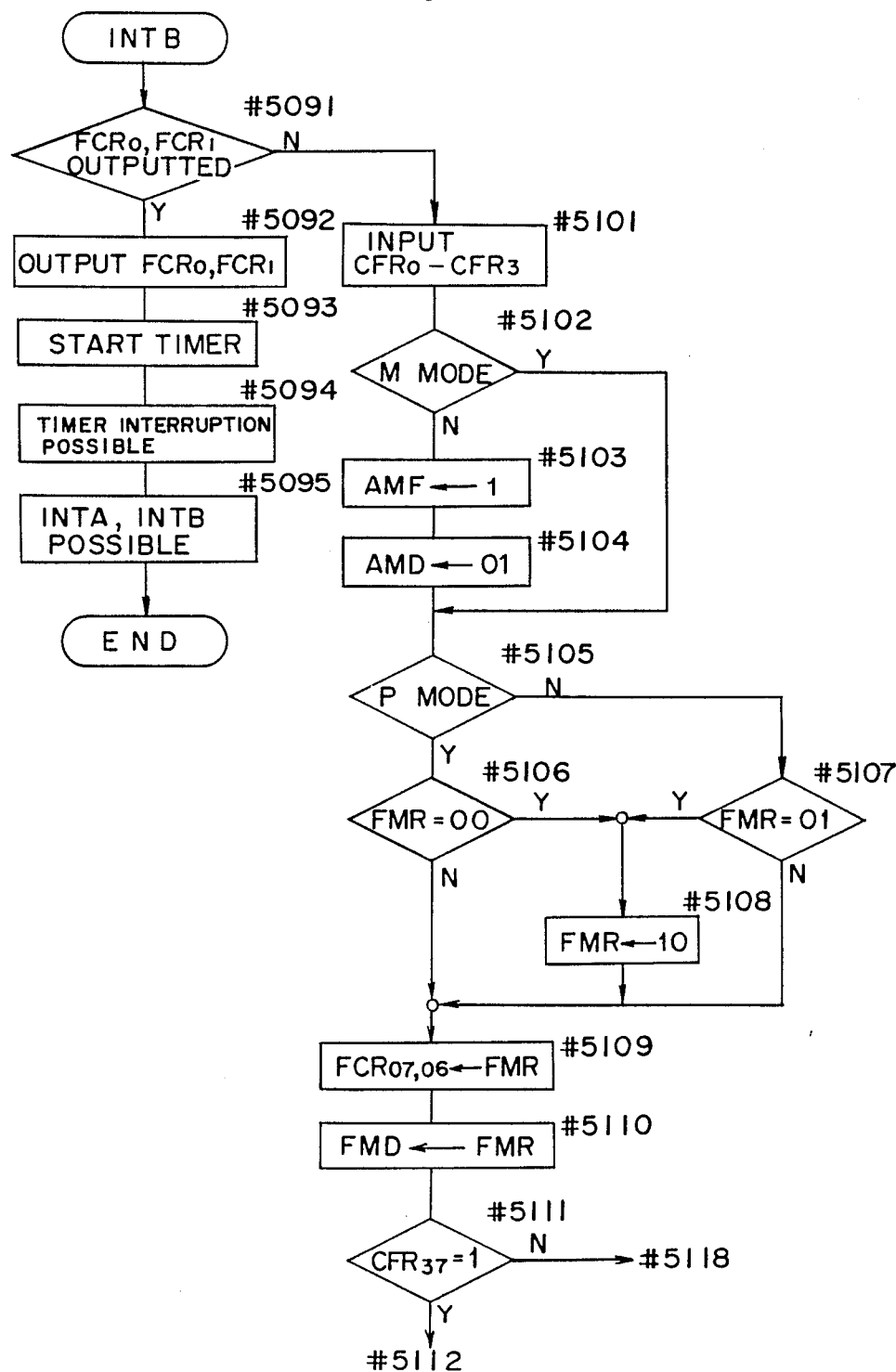
Figure 33B:
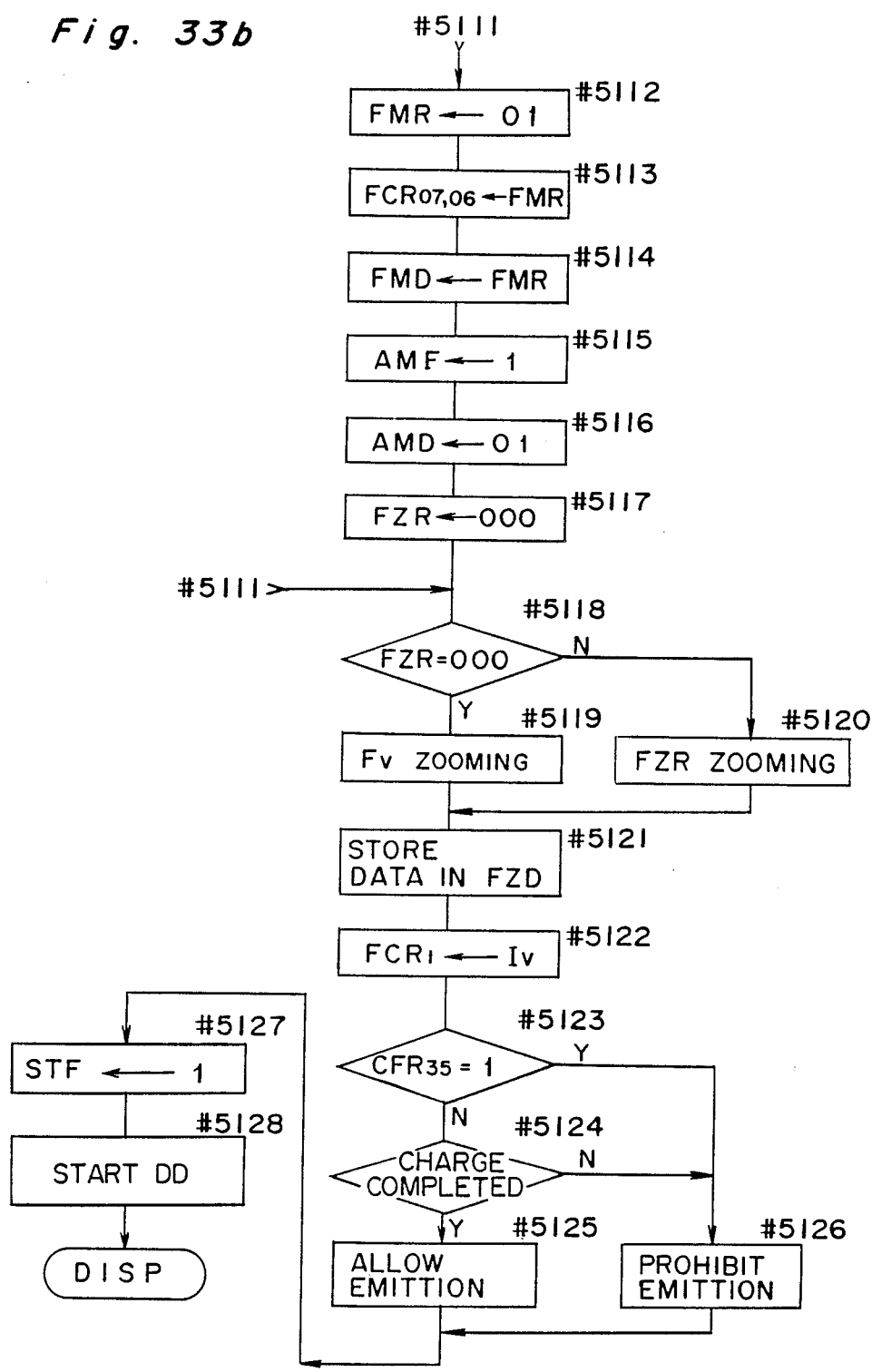

FIGS. 33a and 33b are flowcharts showing the operation to be performed by the microcomputer MCF when the interruption INTB occurs. The interruption INTB is generated by the microcomputer MCB provided in the camera body.

Referring To FIG. 1, when the flash data $CFR_0$ through $CFR_3$ and $FCR_0$, $FCR_1$ are transferred between the microcomputers MCB and MCF through the serial data bus SDB, a low level chip select signal CSFL is outputted from the terminal $P_2$. The signal CSFL is applied to the interruption terminal $\overline{INTB}$ of the microcomputer MCF through a contact $j_0$ (FIG. 3). In synchronization with the fall of the interruption terminal $\overline{INTB}$ due to the chip select signal CSFL, the microcomputer MCF starts its operation in accordance with the flowchart shown in FIGS. 33a and 33b.

First, it is detected at step #5091 whether or not the data $FCR_0$ and $FCR_1$ are transferred from the flash emitting device to the camera. When the flash data $FCR_0$ and $FCR_1$ are inputted to the microcomputer MCB, the microcomputer MCB outputs a high level read signal to the read/write determining terminal $P_{23}$ of the microcomputer MCF through a contact $J_3$. Conversely, when the microcomputer MCB outputs the flash data $CFR_0$ through $CFR_3$, the microcomputer MCB outputs a low level write signal to the terminal $P_{23}$ of the microcomputer MCF (refer to FIG. 3). Then, the microcomputer MCF checks the state of the terminal $P_{23}$. If "H" is inputted to the terminal $P_{23}$, the program goes to step #5092 at which the data $FCR_0$ and $FCR_1$ are outputted to the camera body. If "L" is inputted to the terminal $P_{23}$, the program goes to step #5101 at which the data $CFR_0$ through $CFR_3$ are inputted to the microcomputer MCF.

The input and output of data is described with reference to FIG. 3. When the data $CFR_0$ through $CFR_3$, $FCR_0$, $FCR_1$ are transferred between the flash emitting device and the camera body, as described above, the low level chip select signal is inputted from the contact $j_0$ to the terminal INTB. When the data $CFR_0$ through $CFR_3$ are transferred from the camera body to the flash emitting device, as described above, "L" is inputted from the contact $j_3$ to the terminal $P_{23}$ of the microcomputer MCF. At this time, in synchronization with a reference clock inputted from the contact $j_4$ to the reference clock input terminal SCK, the microcomputer MCF inputs the data $CFR_0$ through $CFR_3$ one bit by one bit through the serial data input terminal SIN connected to the contact $j_1$. As described above, when the data $FCR_0$ and $FCR_1$ are transferred from the flash emitting device to the camera body, "H" is inputted from the contact $j_3$ to the terminal $P_{23}$ of the microcomputer MCF. At this time, in synchronization with the reference clock inputted to the terminal SCK, the microcomputer MCF outputs the data $FCR_0$ and $FCR_1$ one bit by one bit from the serial data output terminal SOUT connected to the contact $j_2$.

Returning to FIG. 33a, after the data $FCR_0$ and $FCR_1$ are outputted, the timer counter (T) is reset to start its operation at step #5093 and the microcomputer MCF is enabled for a timer interruption by the timer and interruptions INTA and INTB which occur at the interruption terminals $\overline{INTA}$ and $\overline{INTB}$ at steps #5094 and #5095. Therefore, the microcomputer MCF waits until either of the interruptions occurs.

After, the data $CFR_0$ through $CFR_3$ are inputted to the microcomputer MCF at step #510, it is examined at step #5102 whether or not the exposure control mode is (M). If the contents of the high-order two bits $CFR_{07}$ and $CFR_{06}$ of the data $CFR_0$ are "11", it is decided that the exposure control mode is (M), so that the program skips to step #5105. If not "11", the program goes to step #5103. At step #5103, the flag AMF is set to put the mode in the automatic flash stopping mode. Then, "01" is stored in the indication data AMD at step #5104 so that the display circuit FDP makes an indication of the automatic flash stopping mode. Then, the program goes to step #5105.

As described above, according to the camera system of the embodiment, when the exposure control mode of the camera system is not (M), the flash stopping mode is forcibly set to the automatic flash stopping mode.

At step #5105, it is detected whether or not the exposure control mode of the camera system is (P). If the contents of the high order two bits $CFR_{07}$ and $CFR_{06}$ of the data $CFR_0$ are "00", it is decided that the exposure control mode is (P), then the program goes to step #5106. If not "00", the program goes to step #5107.

At steps #5106 and #5107, the emission mode is examined. It is detected at step #5106 whether or not the emission mode is the forced emission mode. If the content of the emission mode register FMR is "00", it is decided that the emission mode is the forced emission mode, so that the program goes to step #5108 at which "10" is stored in the register FMR to switch the emission mode to the non-emission mode. It is detected at step #5107 whether or not the emission mode is the automatic emission mode. If the content of the emission mode register FMR is "01", it is decided that the emission mode is the automatic emission mode. Then, the program goes to step #5108 at which "10" is stored in the register FMR to switch the emission mode to the non-emission mode.

After the emission mode is switched to the non-emission mode, at step #5109, the content of the register FMR is stored in the high order two bits $FCR_{07}$ and $FCR_{06}$ of the data $FCR_0$ so that the microcomputer MCF informs the microcomputer MCB of the state of the emission mode. Then, at step #5110, the content of the register FMR is stored in the indication data FMD so that the display circuit FDP makes an indication of the emission mode.

As described above, according to the camera system in this embodiment, when the exposure control mode is (P) and the emission mode is the forced emission mode, the forced emission mode is switched to the non-emission mode. When the exposure control mode is not (P) mode and when the emission mode is the automatic emission mode, the automatic emission mode is switched to the non-emission mode (refer to Tables. 10 and 11).

When the indication data FMD has been set at step #5110, it is detected at step #5111 whether or not the camera system is reset. If the most significant bit $CFR_{37}$ of the data $CFR_3$ is set, it is decided that the camera system is reset so that program goes to steps #5112 through #5117 so as to reset the flash emitting device. If not, the program skips to step #5118. At step #5112, "01" is stored in the emission mode register FMR to set the emission mode to the automatic emission mode. At step #5113, the content of the register FMR is stored in the high order two bits $FCR_{07}$ and $FCR_{06}$ of the data $FCR_0$ so that the microcomputer MCF informs the microcomputer MCB of the emission mode. Then, at step #5114, the content of the register FMR is stored in the indication data FMD so that the display circuit FDP makes the indication of the emission mode. Thereafter, the microcomputer MCF sets the flag AMF so as to put the flash stopping mode in the automatic flash stopping mode at step #5115. At step #5116, "01" is stored in the indication data AMD so that the display circuit FDP makes the indication of the automatic flash stopping mode. Then, at step #5117, "000" is stored in the illumination range register FZR to set to the automatic mode.

As described above, when the camera system is reset, the flash emitting device is set to the automatic emission mode and the automatic flash stopping mode, and the illumination range is set to the automatic mode.

When the program goes to step #5118 after the above-described operation is completed, the emission panel is moved forward or backward to put the illumination range in the set illumination range. First, it is detected at step #5118 whether or not the illumination range is automatic. If the content of the illumination range register FZR is "000", it is decided that the illumination range is automatic, then the program goes to step #5119. As previously described, a signal is outputted to the motor control circuit MDR so that the emission panel is moved to the position in which the flash light covers the field angle of the photographing lens which is mounted on the camera body and whose focal length is Fv.

If it is decided at step #5118 that the content of the register FZR is not "000", the program goes to step #5120 at which signals are outputted from the terminals $P_{26}$ and $P_{27}$ so that the motor control circuit MDR drives the motor MOFL, whereby the emission panel is moved. Then, the position of the emission panel is detected by the signals inputted from the position detecting circuit ZCP to the terminals $P_{26}$ and $P_{27}$, and when the emission panel is moved to the position in which the flash light covers the field angle of the photographing lens having the focal length indicated by the content of the register FZR, signals are outputted from the terminals $P_{26}$ and $P_{27}$ so that the motor control circuit MDR stops the motor MOFL.

When the positioning of the emission panel is completed, similarly to the execution at step #5028 (FIG. 30b), the indication data FZD is set at step #5121 so that the display circuit FDP provides the indications of the focal length of the photographing lens whose field angle is covered by the flash light and automatic/manual. Then, the maximum emission amount Iv of the flash emitting device is stored in the data $FCR_1$ at step #5122, then the program goes to step #5123.

At step #5123, the emission mode of the camera system is detected. If the sixth bit $CFR_{35}$ of the data $CFR_3$ is set, it is decided that the mode is the non-emission mode. Then, the program goes to step #5126, and if not set, it is decided that the mode is the emission mode, and then, the program goes to step #5124.

At step #5124, the charge state of the main capacitor MC is examined. If electric current flows through the terminal $P_{23}$ to cause the terminal $P_{23}$ "H", it is decided that the main capacitor MC is charged more than or equal to a predetermined value, so that the program goes to step #5125. If not "H", the program goes to step #5126. At step #5125, "L" is outputted from the terminal $P_{35}$ to allow the flash control circuit FCC to output the emission start signal STA. At step #5126, "H" is outputted from the terminal $P_{35}$, to prohibiting the flash control circuit FCC from outputting the emission start signal STA.

It is possible to determine whether or not the flash light is emitted only according to the state of the $CFR_{35}$ by omitting step #5124, which is described later.

Thereafter, the flag STF is set at step #5127 to indicate that the flash emitting device is operating as part of the camera system. Then, at step #5128, "H" is outputted from the terminal $P_{30}$ to actuate the DC-to-DC converter DD. Then, the program goes to DISP routine (FIGS. 32a and 32b).

Figure 34:
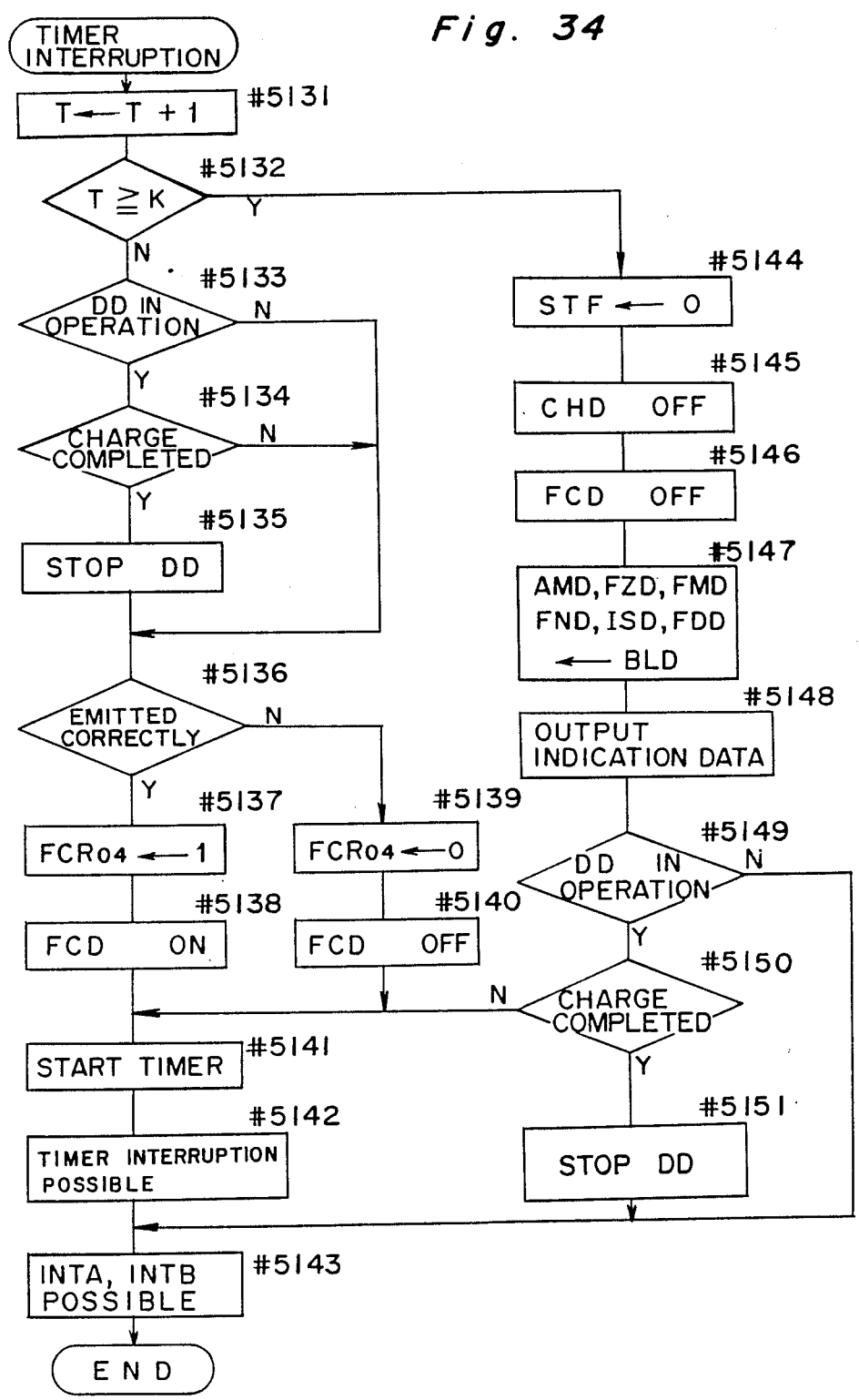

FIG. 34 is a flowchart showing a timer interruption routine.

As described above, the microcomputer MCF is continually enabled for a timer interruption every certain interval (for example, 250 msec.) by the timer provided in the microcomputer MCF during the operation of the microcomputer MCF.

First, "1" is added to the timer counter (T) at step #5131. Then, the content of the timer counter (T) and the predetermined value (K) are compared with each other at step #5132. If $T<K$, the program goes to step #5133. If $T \geq K$, the program goes to step #5144.

At step #5133, it is detected whether or not the DC-to-DC converter DD is in operation. If "H" is outputted from the terminal $P_{30}$, it is decided that the DC-to-DC converter DD is in operation, so that the program goes to step #5134. If "H" is not outputted, the program skips to step #5136.

At step #5134, the charged voltage of the main capacitor MC is examined. If electric current flows into the terminal $P_{32}$ so that the terminal $P_{32}$ is "H", it is decided that the main capacitor MC is charged more than the predetermined value, and at step #5135, "L" is outputted from the terminal $P_{30}$ to stop the operation of the DC-to-DC converter DD. At step #5134, if electric current does not flow into the terminal $P_{32}$ so that the terminal $P_{32}$ is "L", it is decided that the main capacitor is not charged in the predetermined value, then the program skips to step #5136.

At step #5136, it is detected whether or not the flash stopping signal FSTP is outputted from the camera body through the contact $j_6$. If "H" is inputted to the terminal $P_{33}$, it is decided that the flash stopping signal FSTP is outputted from the camera, so that the program goes to step #5137 at which the fifth bit $FCR_{04}$ of the data $FCR_0$ is set. At the same time, at step #5138, "H" is outputted from the terminal $P_{25}$ to turn on the indicator FCD, then the program goes to step #5141. If "L" is inputted to the terminal $P_{33}$, it is decided that the flash stopping signal FSTP is not outputted from the camera body, and the fifth bit $FCR_{04}$ of the data $FCR_0$ is reset at step #5139. At the same time, "L" is outputted from the terminal $P_{25}$ to turn off the indicator FCD at step #5140, then the program goes to step #5141.

At step #5141, the timer counter (T) is reset to start its operation. Then, the microcomputer MCF is enabled for the timer interruption at step #5142 and for the interruptions INTA and INTB in response to the fall of the interruption terminals $\overline{INTA}$ and $\overline{INTB}$ at step #5143, then waits until either of the interruptions occur.

At step #5132, if $T \geq K$, the flash emitting device terminates its operation as part of the camera system. The flag STF is reset at step #5144 to memorize this. Thereafter, "L" is outputted from the terminals $P_{24}$ and P25 to turn off the indicators CHD and FCD at steps #5145 and #5146, and at step #5147, the blank indication data BLD is stored in the indication data AMD, FZD, FMD, FND, ISD, and FDD so that the display circuit FDP clears all the indications, and then, the data is transferred to the display circuit FDP at step #5148.

Thereafter, it is detected at step #5149 whether or not the DC-to-DC converter DD is in operation. If "L" is outputted from the terminal $P_{30}$, it is decided that the DC-to-DC converter DD is not in operation, so that the program goes to step #5143. If not, the program goes to step #5150. At step #5150, the voltage of the main capacitor MC is examined. If the voltage thereof reaches the predetermined value, "L" is outputted from the terminal $P_{30}$ to stop the operation of the DC-to-DC converter DD at step #5151, then the program goes to step #5143. If the voltage of the main capacitor MC does not reach the predetermined value, the program goes to step #5141 at which the timer counter (T) is reset to start its operation and at step #5142, the microcomputer MCF allows the timer interruption. Then, at step #5143, the microcomputer MCF allows the interruptions INTA and INTB in response to the fall of the interruption terminals $\overline{INTA}$ and $\overline{INTB}$, thus waiting until either of the interruptions occurs.

As described, if the interruption INTA and INTB do not occur for a predetermined period after the interruptions INTA and INTB occur in response to the fall of the interruption terminals $\overline{INTA}$ and $\overline{INTB}$, all the indications of the flash emitting device are cleared and only the main capacitor MC is charged. When the main capacitor MC is charged to the predetermined voltage, the main capacitor MC is not charged any longer. Then, the microcomputer MCF waits until either of the interruptions INTA and INTB in response to the fall of the interruption terminals INTA and INTB occurs.

[SUMMARY]

The above is a preferred embodiment of the camera system which embodies the present invention. The relationship between the emission mode and the exposure control mode in the embodiment is summarized of follows:

Table 10 shows the relationship between the emission mode and the exposure control mode of the embodiment.

As described above, when the exposure control mode is (P), the flash emission mode can be switched only between the non-emission mode and the automatic emission mode. On the other hand, if the exposure control mode is either of the modes (S), (A), and (M), the flash emission mode can be switched only between the forced emission mode and the non-emission mode. But when the flash emitting device operates independently of the camera system, for example, when the flash emitting device is mounted on other cameras, the emission mode can be switched from the forced emission, the automatic emission, the non-emission to the forced emission.

TABLE 10

| | exposure control mode | flash emission mode |
|---|---|---|
| invention-applicable camera | P mode | automatic emission ⇔ non-emission |

TABLE 10-continued

| | exposure control mode | flash emission mode |
|---|---|---|
| | S, A, M modes | forced emission ⇔ non-emission |
| invention-inapplicable camera | | forced emission → non-emission, automatic emission |

Table 11 shows how the emission mode is switched when the exposure control mode is switched.

When the flash emitting device is mounted on the camera according to the camera system of the present invention, the flash emission mode is automatically switched over according to a selected exposure control mode.

For example, when the exposure control mode is switched from (P) mode to another mode, the emission mode is switched from automatic emission to the non-emission or from the non-emission to the non-emission. Conversely, when the exposure control mode is switched from either of the modes (S), (A), and (M) to (P), the emission mode is switched from the forced emission to the non-emission or from the non-emission to the non-emission. When the system reset is effected, the mode is always switched to the automatic emission mode irrespective of a previously selected emission mode.

TABLE 11

| exposure control mode | flash emission mode |
|---|---|
| P → S, A, M | automatic emission → non-emission |
| | non-emission → non-emission |
| S, A, M → P | forced emission → non-emission |
| | non-emission → non-emission |
| system reset | forced emission |
| | non-emission → automatic |
| | automatic emission |
| | emission |

(Modifications)

(First modification)

In this embodiment, the relationship between the exposure control mode and the emission mode is not limited to the above-described embodiment, but the embodiment can be modified as shown in Tables 12 and 13.

TABLE 12

| | exposure control mode | flash emission mode |
|---|---|---|
| invention-applicable camera | P, S, mode | automatic emission ⇔ non-emission |
| | A, M modes | forced emission ⇔ non-emission |

TABLE 12-continued

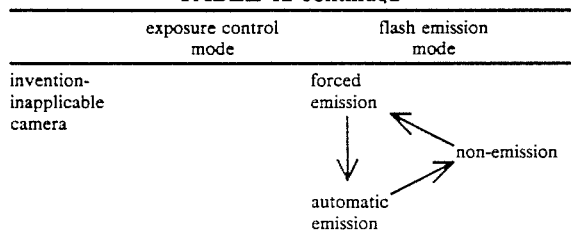

| exposure control mode | flash emission mode |
| --- | --- |
| invention-inapplicable camera | forced emission<br>automatic emission<br>non-emission |

TABLE 13

| exposure control mode | flash emission mode |
| --- | --- |
| P, S → A, M | automatic emission → forced emission<br>non-emission → non-emission |
| A, M → P, S | forced emission → automatic emission<br>non-emission → non-emission |
| system reset | forced emission<br>non-emission → automatic emission automatic emission |

In order to modify the embodiment as such, the microcomputers MCB and MCF are controlled as follows (refer to FIGS. 38b, 41, 43, and 45).

(Microcomputer MCB)

Figure 38A:
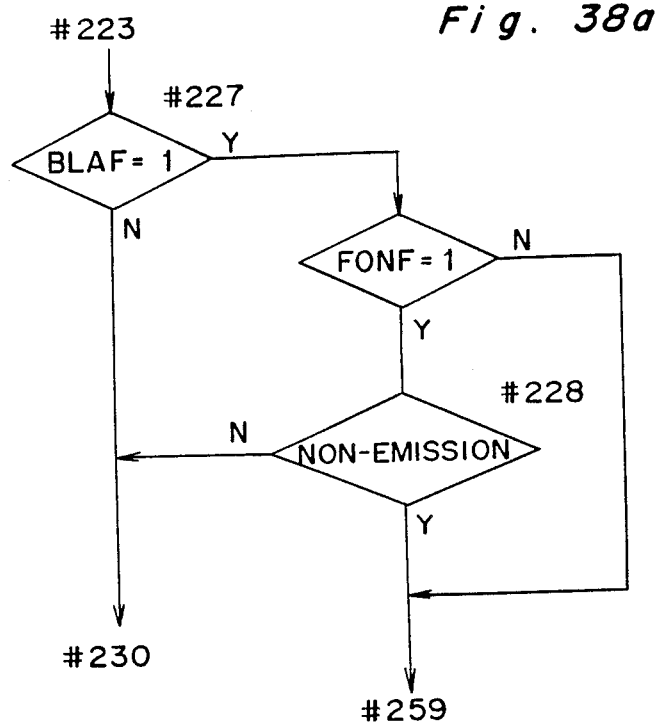
FIGS. 38a, 38b, 38c and 38d are flowcharts showing essential parts of a modification of the flowchart shown in FIGS. 13a and 13b.
Figure 38B:
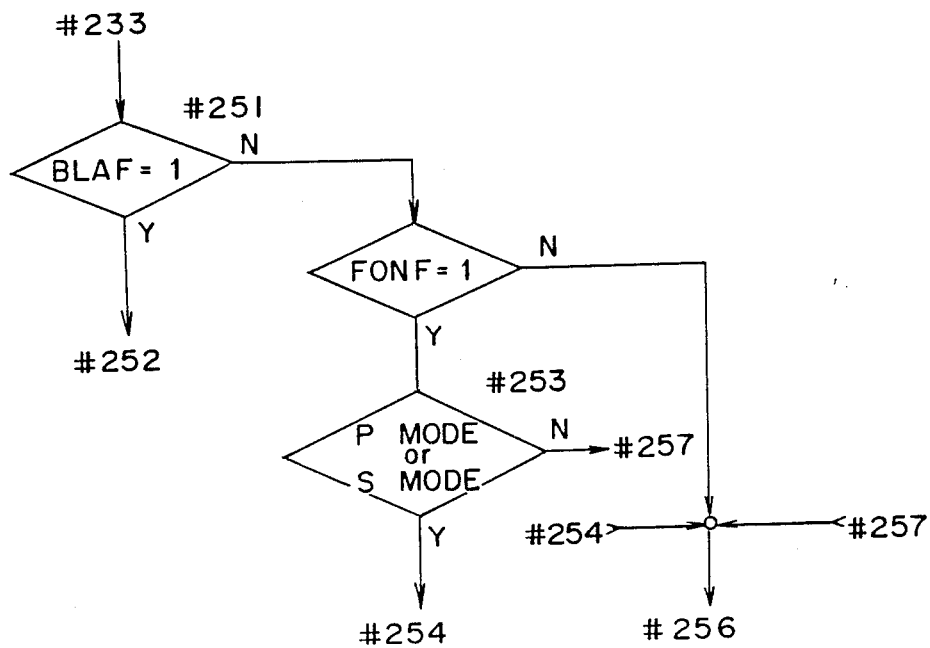
Figure 41:
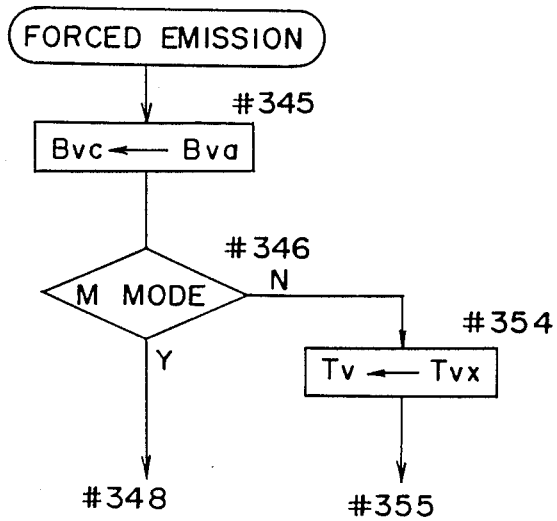
FIG. 41 is a flowchart showing an essential part of a modification of the flowchart shown in FIG. 20.
Figure 42A:
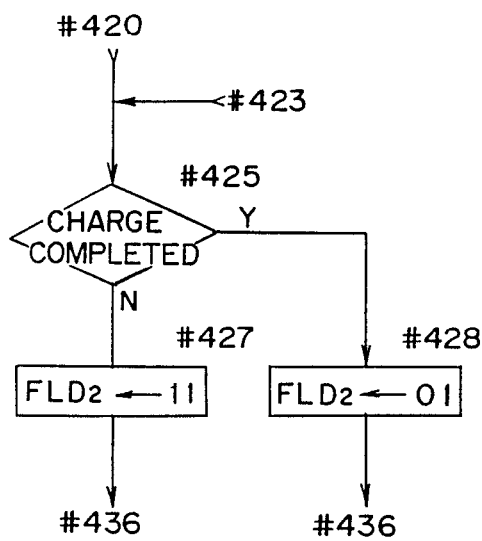
FIGS. 42a, 42b and 42c are flowcharts showing essential parts of a modification of the flowchart shown in FIGS. 23a, 23b, 23c and 23d.
Figure 42B:
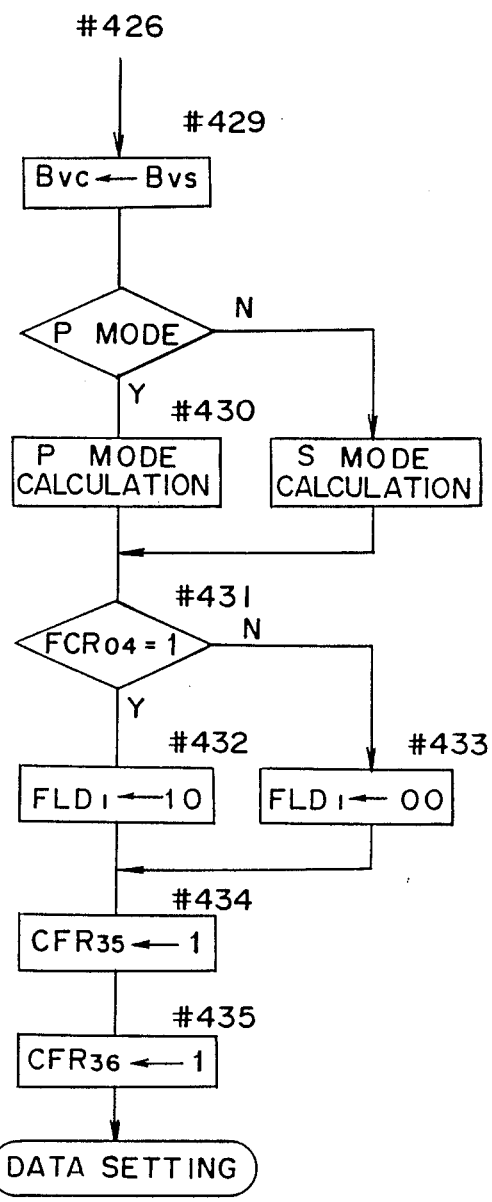

Referring to FIGS. 38a and 41, the program is so changed that it is detected at step #253 whether the exposure control mode is (P) or (S) and steps #347 and #356 are deleted from the flowchart shown in FIGS. 13b and 20. Further, referring to FIG. 42b a step for detecting whether the mode is (P) or not is provided subsequent to step #429 (FIG. 23) so that the program goes to step #430 if the mode is (P), and an (S) mode calculation ($Av=Bvc+Sv-Tv$) is performed if the mode is not (P), and then, the program goes to step #431.

(Microcomputer MCF)

Figure 43:
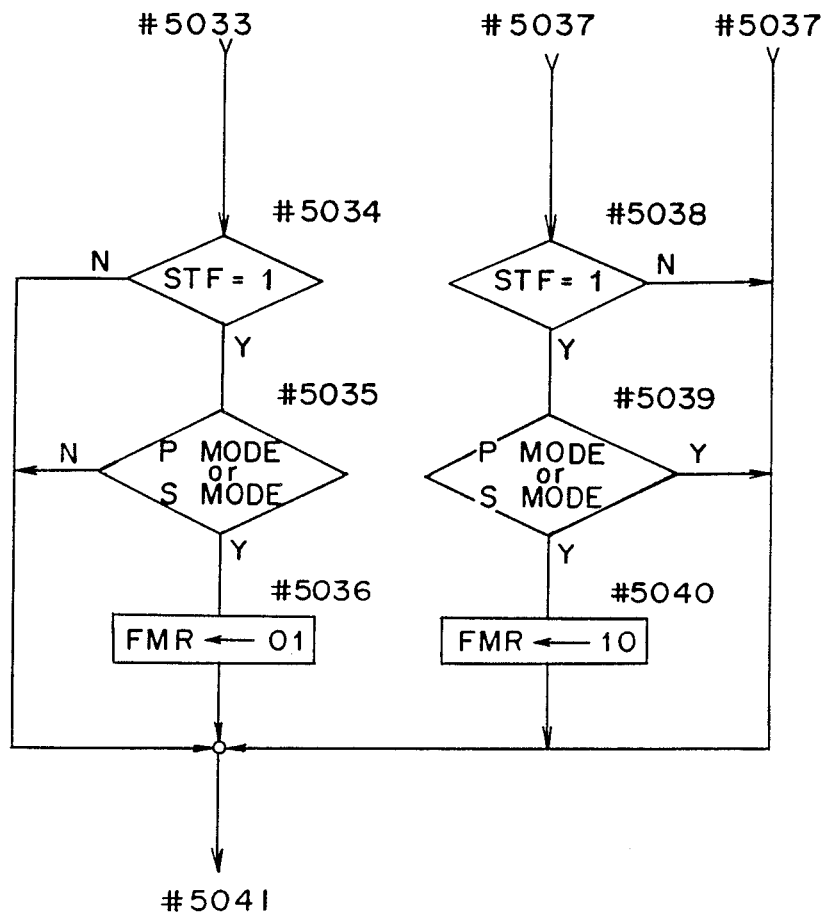
FIG. 43 is a flowchart showing an essential part of a modification of the flowchart shown in FIG. 31.
Figure 45A:
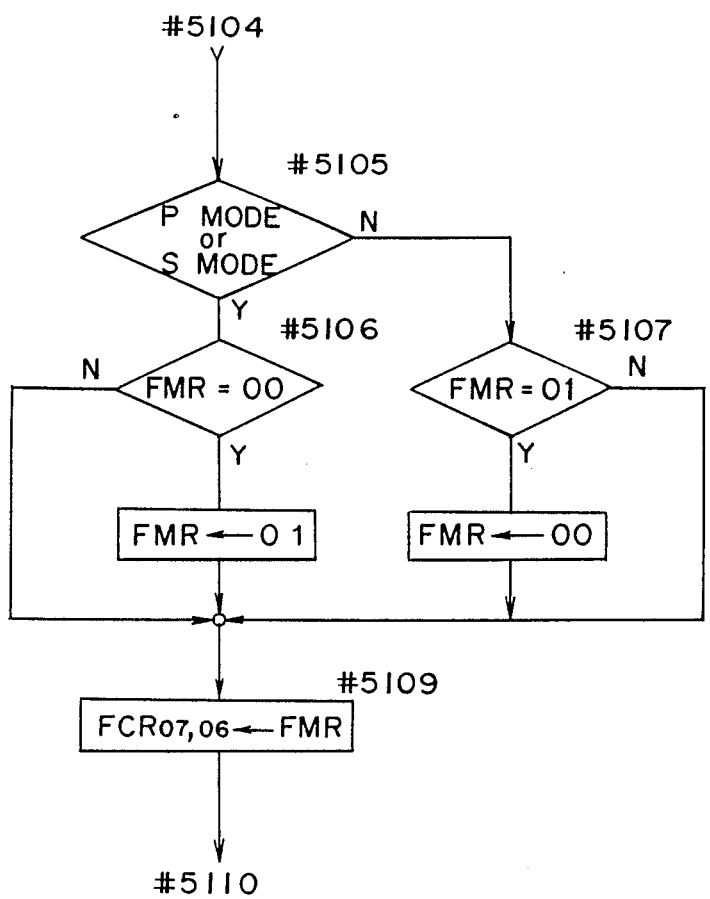
FIGS. 45a and 45b are flowcharts showing an essential part of a modification of the flowchart shown in FIGS. 33a and 33b.
Figure 45B:
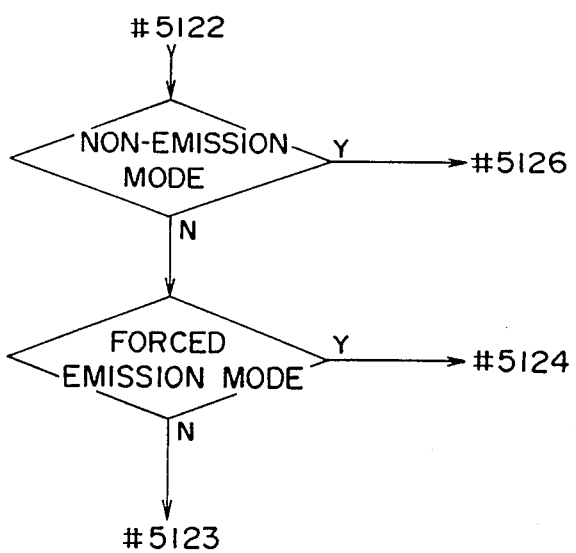

Referring to FIGS. 43 and 45 the program is so changed that it is detected at steps #5035 and #5039 (FIG. 31) whether the exposure control mode is (P) or (S) and it is detected at step #5105 (FIG. 33a) whether the mode is (P) or (S). Further, the program is so changed that step #5108 is deleted from the flowchart shown in FIG. 33a in which if FMR=00 at step #5106, "01" is stored in the register FMR and the program goes to step #5109, and if FMR=01 at step #5107, "00" is stored in the register FMR, and the program goes to step #5109.

According to this modification, when the exposure control mode is (P) or (S), the emission mode is the automatic emission mode (or the non-emission mode). When a photograph is taken using a flash light, the same operation is performed in (P) and (S) modes. When a photograph is taken under natural light without using a flash, the camera system performs an operation according to (P) mode or (S) mode. When the exposure mode is (A) or (M), the camera system performs the same operation as that performed in the embodiment as previously described.

In this modified embodiment, a slow synchronized photographing is performed by turning on the AE lock switch ALS when the exposure control mode is (A) or (M), while a spot measuring photographing is carried out by turning on the AE lock switch ALS when the exposure control mode is (P) mode or (S) mode.

(Second modification)

In the above-described embodiment, if the main capacitor MC is not charged to a predetermined voltage, available light photography is carried out. However, even if main capacitor MC is not charged to the predetermined voltage, a flash photographing may be carried out. This is because, as described above, while the camera system operates, the DC-to-DC converter DD always operates so that the main capacitor MC is being charged, i.e., in most cases, the voltage of the main capacitor MC is enough to carry out the flash photographing.

In order to carry out the above-described modification, the control procedures of the microcomputers MCB and MCF are altered (refer to FIGS. 39, 40, 41, 42a, 42b, and 44.)

(Microcomputer MCB)

Figure 39:
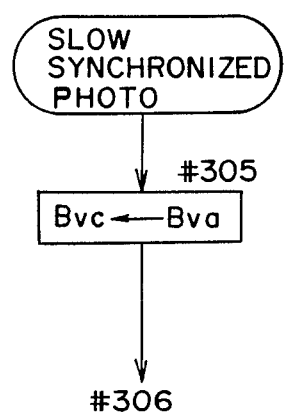
FIG. 39 is a flowchart showing an essential part of a modification of the flowchart shown in FIG. 17.
Figure 40:
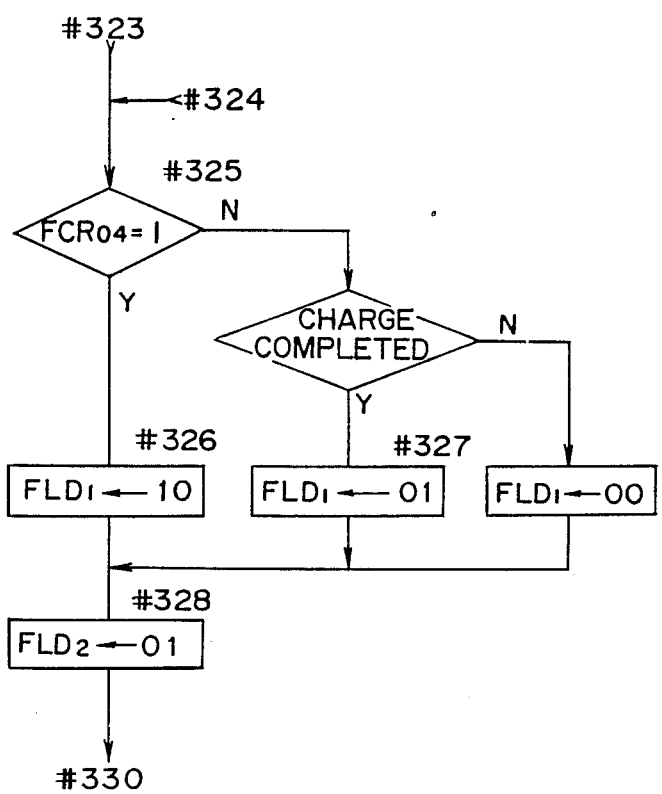
FIG. 40 is a flowchart showing an essential part of a modification of the flowchart shown in FIG. 18.
Figure 42C:
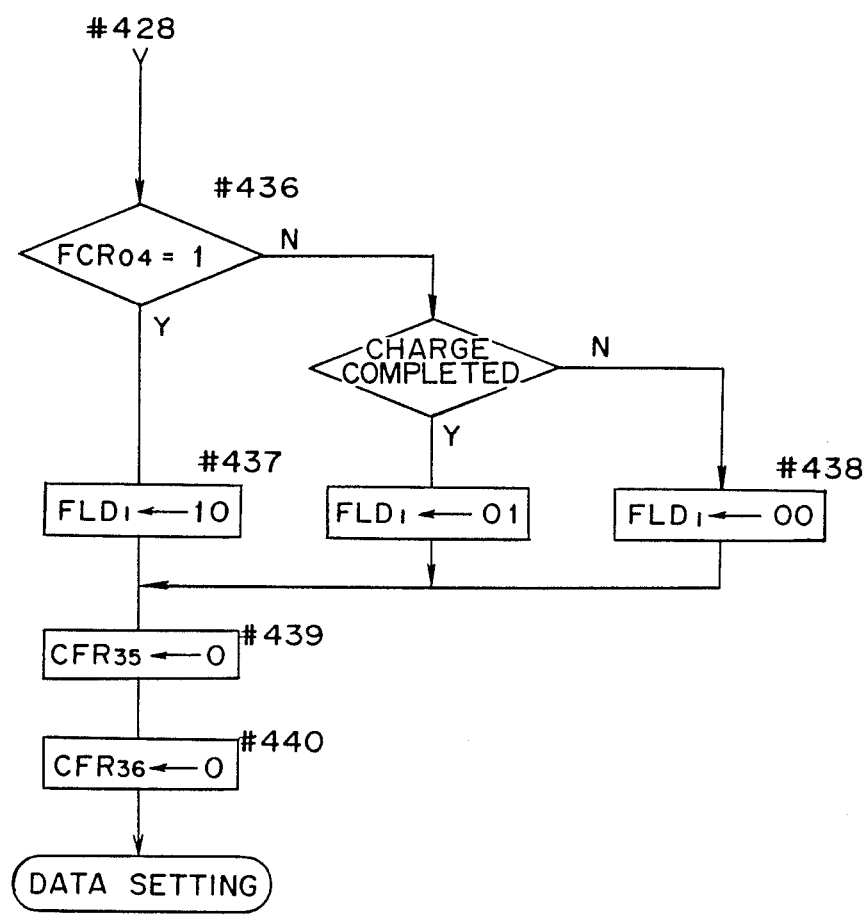

Referring FIGS. 39 and 41, steps #301 through #304 (FIG. 17) and steps #341 through #344 (FIG. 20) are deleted from the flowchart shown therein. Referring to FIG. 40 the flowchart is provided with a step, between steps #325 and #327 (FIG. 18), at which if the main capacitor MC is charged in the predetermined voltage, "01" is stored in the indication data $FLD_1$, and if not, "00" is stored in the data $FLD_1$. Further, referring to FIGS. 42a, 42b, and 42c, the flowchart shown in FIG. 23 is so altered that the program goes from step #427 to step #436. Further, the seventh bit $CFR_{36}$ (FDIS) of the data $CFR_3$ is reset when a flash photographing is performed and set when available photographing is carried out.

(Microcomputer MCF)

Figure 44:
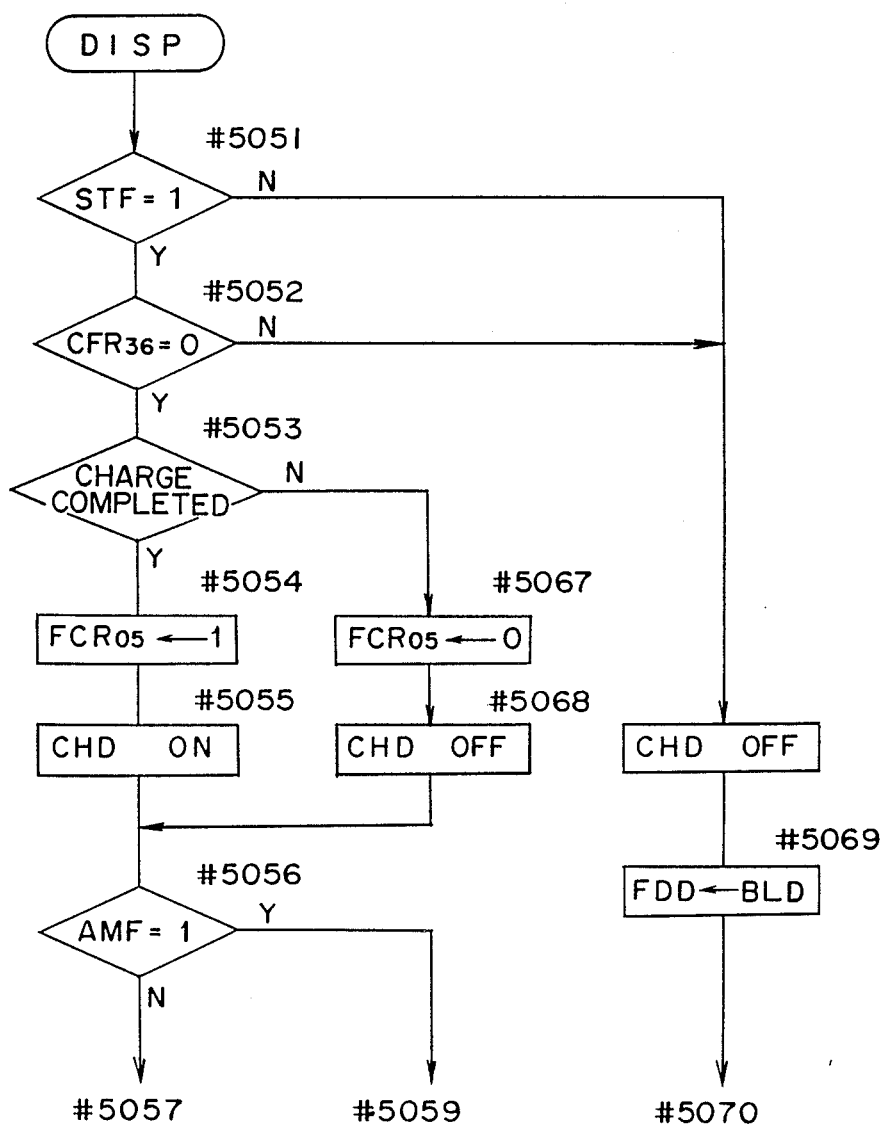
FIG. 44 is a flowchart showing an essential part of a modification of the flowchart shown in FIGS. 32a and 32b.

Referring to FIG. 44, a step is provided in FIG. 32a and 32b so that if the main capacitor MC is not charged to the predetermined voltage at step #5053, the program goes to step #5056 through steps #5067 and #5068. In the flowchart shown in 32, if $CFR_{36}=1$ at step #5052, the indication made by the indicator CHD that the main capacitor MC is charged is cleared, then the program goes to step #5069.

According to this modification, it is unnecessary to wait until the main capacitor MC is charged to the predetermined voltage. Regardless of whether or not the main capacitor MC is charged in the predetermined voltage, the light amount-adjusting distance range, the film sensitivity, and the aperture value are indicated in the flash emitting device. Further, irrespective of whether or not the main capacitor MC is charged to the predetermined voltage, the above-described indications are not made when available photography is carried out, and if the main capacitor MC is charged to the predetermined voltage, the indicator CHD does not make the indication that the main capacitor has been charged in the predetermined voltage.

(Third modification)

In the above-described embodiment or the modifications, when the exposure control mode is (P) ((P) and (S) in the second modification), the slow synchronized photographing is not carried out, but when the manual AE lock is performed by turning on the AE lock switch ALS, a slow synchronized photographing may be accomplished if the flash emitting device is in the emission mode irrespective of the exposure control modes. This modification can be effected by altering the control procedure of the microcomputer MCB as follows (refer to FIGS. 38a and 38b.)

(Microcomputer MCB)

Referring to FIG. 38a, the program is so altered that whether or not the mode is the non-emission mode is detected at step #228 (FIG. 13a). If it is detected that the mode is the non-emission mode, the program goes to step #259, and if the mode is not the non-emission mode, i.e., if the mode is the forced emission mode or the automatic emission mode, the program goes to step #230. According to this modification, referring to FIG. 38b, if it is decided at step #251 FIG. 13b that the manual AE lock is made, the program goes to step #252 at which the slow synchronized photographing is carried out.

(Fourth modification)

In the above-described embodiment, the selection of the emission mode is effected by the flash emitting device, but the flashing operation itself in accordance with an emission mode is controlled by the microcomputer MCB provided in the camera body. But it is possible that the microcomputer MCF provided in the flash emitting device detects the emission mode and controls the flashing operation in accordance with the emission mode. Specific examples of altering the control procedure of the microcomputers MCB and MCF are described hereinbelow (refer to FIGS. 40 and 45b).

(Microcomputer MCB)

Referring to FIG. 40, step #329 of the $\alpha$ operation routine (FIG. 18) is omitted.

(Microcomputer MCF)

A step at which it is detected whether or not the mode is the non-emission mode is provided prior to step #5123 in the flowchart shown in FIG. 33b in which the program goes to step #5126 if the emission mode is the non-emission mode and if the emission mode is not the non-emission mode, it is detected whether the emission mode is the forced emission mode. If it is determined that the emission mode is the forced emission mode, the program goes to step #5124. If the emission mode is neither the non-emission mode nor the forced emission mode, i.e., if the emission mode is the automatic emission mode, the program goes to step #5123.

(Fifth modification)

In the above-described embodiment, when the luminance Bvs of the main object is calculated, necessary measured data is selected from the measured data Bv0 through Bv5 according to the photographing magnification $\beta$, but measured data may be selected according to the main zone and the adjacent zone.

Figure 38C:
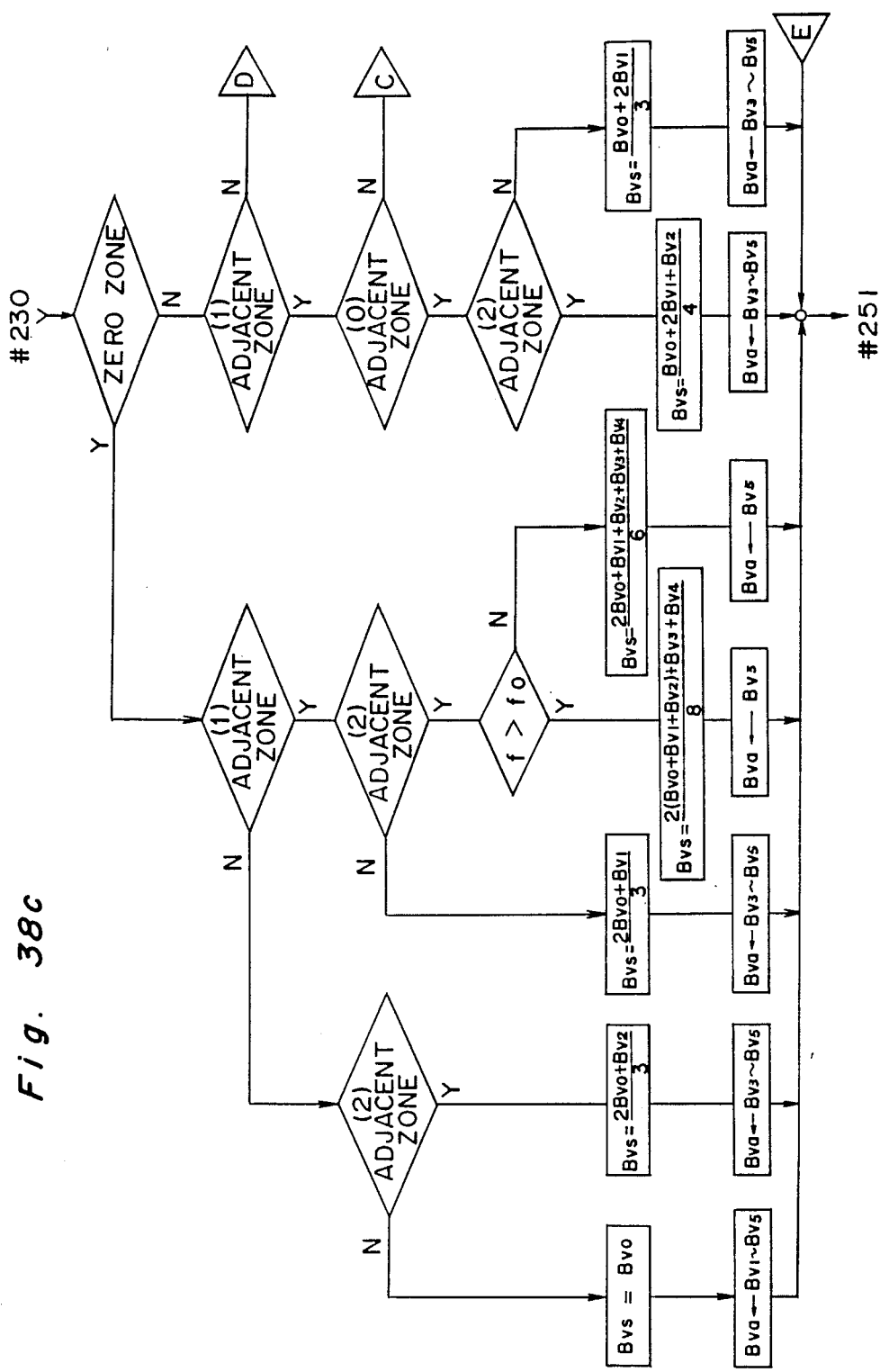
Figure 38D:
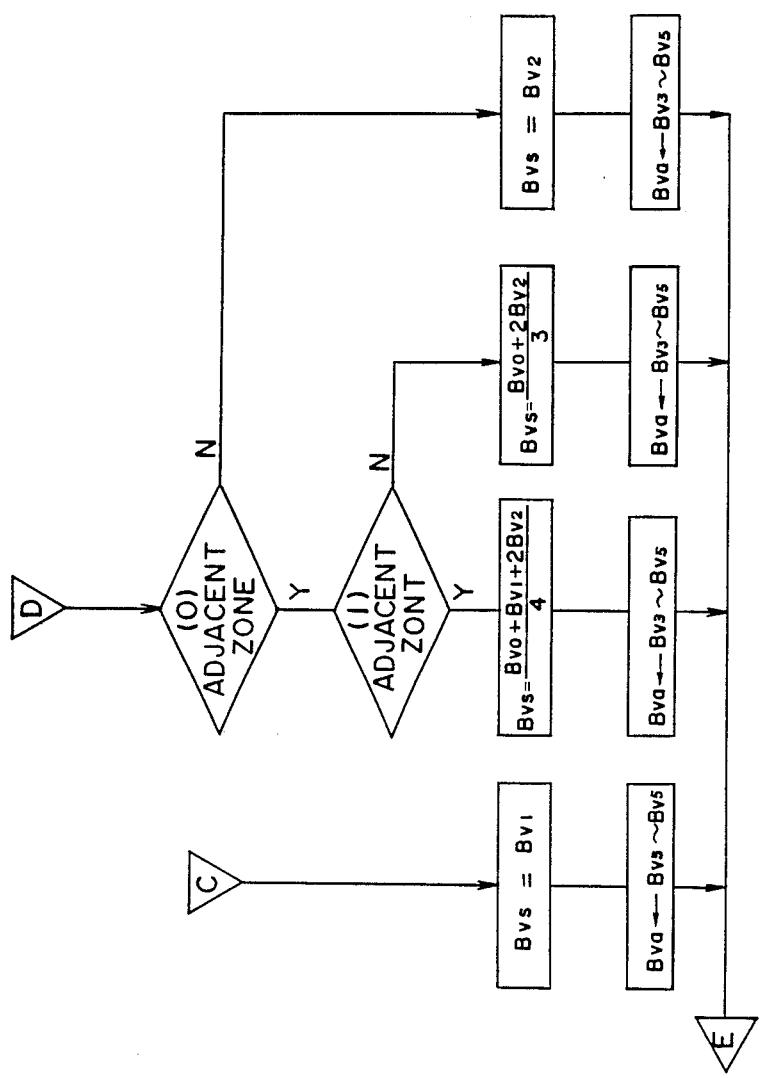

Specifically, steps #230 through #243 in FIG. 13b are altered as follows (refer to FIGS. 38c and 38d).

First, which of the zones is the main zone is detected. If the zero zone is the main zone, it is detected whether or not the first and second zones are adjacent zones. If the first (second) zone is the main zone, it is detected whether or not the zero zone is the adjacent zone. If the first (second) zone is the main zone and the zero zone is the adjacent zone, it is detected whether or not the second (first) zone is the adjacent zone.

If the zero zone is the main zone and both the first and second zones are the adjacent zones, the luminance Bvs of the main object is calculated depending on the five measured data Bv0 through Bv4. If the focal length of the photographing lens is longer than the predetermined focal length $f_0$ (for example, 50 mm), the luminance Bvs of the main object is calculated by the weighted mean by making the weights of the measured data Bv0 through Bv2 large. If the focal length of the photographing lens is shorter than the predetermined focal length $f_0$, the luminance Bvs of the main object is calculated by the weight mean in which the weight of the measured data Bv0 is large.

If the zero zone is the main zone and only the first (second) zone is the adjacent zone, the luminance Bvs of the main object is calculated depending on two measured data Bv0 and Bv1 (Bv2). At this time, the luminance Bvs of the main object is calculated by the weight mean in which the weight of the measured data Bv0 is large.

If the zero zone is the main zone and there are no adjacent zones, the measured data Bv0 is the luminance Bvs of the main object.

If the first (second) zone is the main zone and both the zero and the second (first) zones are the adjacent zones, the luminance Bvs of the main object is calculated depending on three measured data Bv0, Bv1, and Bv2. At this time, the luminance Bvs of the main object is calculated by the weighted mean in which the weight of the measured data Bv1 (Bv2) is large.

If the first (second) zone is the main zone and only the zero zone is the adjacent zone (if the second (first zone is not the adjacent zone), the luminance Bvs of the main object is calculated depending on the two measured data Bv0 and Bv1 (Bv2) by the weight mean in which the weight of the measured data Bv1 (Bv2) is large.

If the first (second) zone is the main zone and there is no adjacent zone, the measured data Bv1 Bv2 is the luminance Bvs of the main object.

This modification allows the luminance Bvs. of the main object to be calculated without finding the photographing magnification $\beta$.

(Sixth modification)

In the above-described embodiment, whether or not the flash emitting device is mounted on the camera is detected by the emission mode and so on, but as described below, a flag FONF which indicates whether or not the flash emitting device is mounted is provided so that it is detected by the flag FONF whether or not the flash emitting device is mounted (refer to FIGS. 36, 37a, 37b, 38a and 38b).

Figure 36:
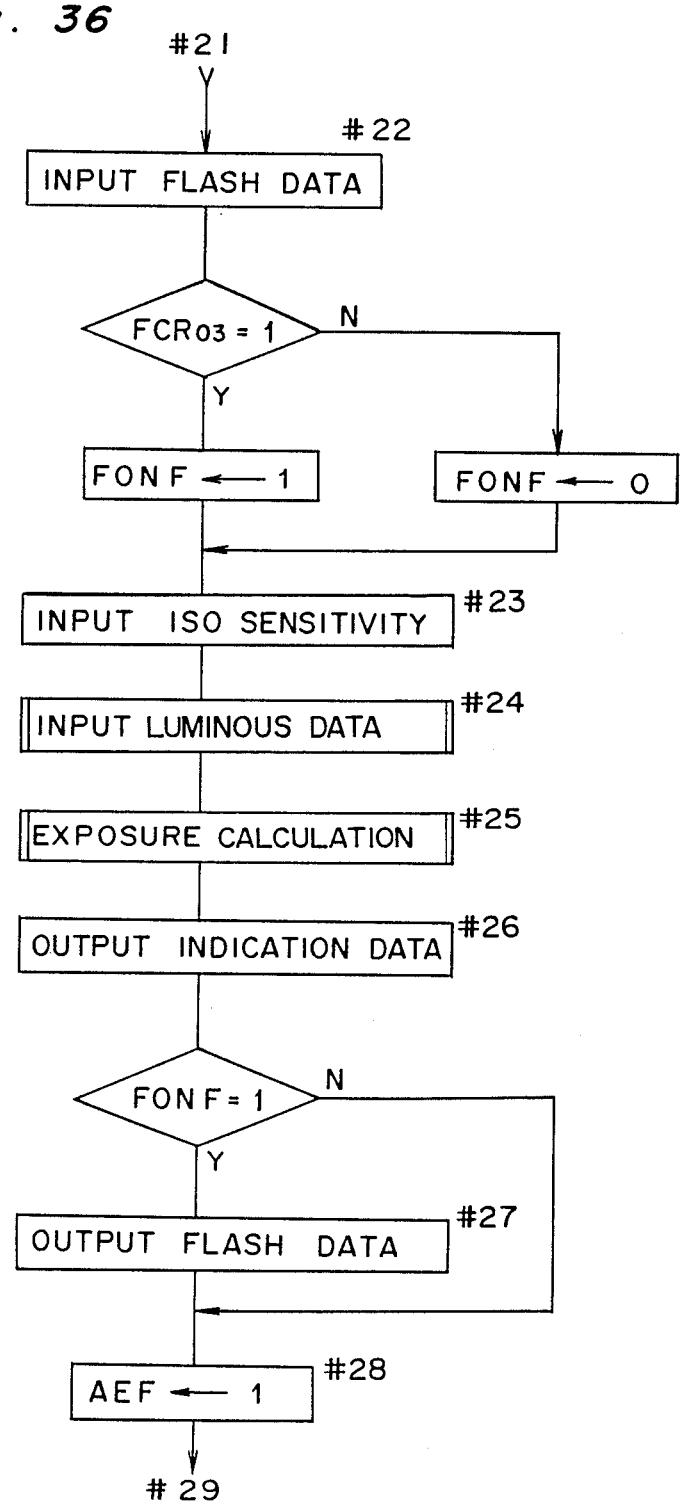
FIG. 36 is a flowchart showing an essential part of a modification of the flowchart shown in FIG. 5.

Specifically, referring to FIG. 36, in the AE routine (FIG. 5), after the flash data transferred from the flash emitting device is inputted to the microcomputer MCB at step #22, the state of the fourth bit $FCR_{03}$ of the data $FCR_0$ is detected. If the bit $FCR_{03}$ is set, the flag FONF is set, and if not, the flag FONF is reset. After the indication data is outputted at step #26, if the flag FONF is reset, the program skips to step #28, and if the flag FONF is set, the program goes to step #27 so that the flash data is outputted.

Similarly, referring to FIGS. 37a and 37b in STOP routine (FIG. 8), after the flash data is inputted at step #91, the fourth bit $FCR_{03}$ of the data $FCR_0$ is examined. If the fourth bit $FCR_{03}$ is set, the flag FONF is set. If not, the flag FONF is reset. Then, after the indication data is outputted at step #106, the state of the flag FONF is examined. If the flag FONF is reset, the program skips to step #107. If the flag FONF is set, the program goes to step #106 so as to output the flash data.

The subroutine "exposure calculation" (FIGS. 13a and 13b) is modified as follows: Referring to FIG. 38a, if the flag BLAF is set at step #227, the state of the flag FONF is examined. Referring to FIG. 38a, if the flag FONF is reset, the program goes to step #259 (subroutine "spot light measuring"). If the flag FONF is set, the program goes to step #228 so as to examine the emission mode. Similarly, referring to FIG. 38b, if the flag BLAF is reset at step #251, the state of the flag FONF is examined. If the flag FONF is reset, the program goes to step #256 (subroutine "available light"), and if the flag FONF is set, the program goes to step #253.

In the subroutine "system reset" (FIG. 25), "mode change" (FIG. 26), and "data change" (FIG. 27), the state of the flag FONF is not examined even immediately prior to the output of the flash data. This is for the reason described below. When the interruption $INT_0$ is generated by the operation either of the switches SRS, MOS, US, and DS in the condition where the camera system is not in operation, the flag FONF is reset (see STOP routine (step #108 in FIG. 8) regardless of whether or not the flash emitting device is mounted on the camera body. Accordingly, if the state of the flag FONF is detected, and the flash data is outputted, only when the flag FONF is set, the subroutine "system reset", etc., similarly to the AE routine (FIG. 5) steps #26 and #27, trouble as is described below may happen. That is to say, if the interruption $INT_0$ is generated when the camera system is not in operation so that the program goes to one of the subroutines "system reset", "mode modification", and "data alteration", the flash emitting device is not reset and the mode (e.g. flash emission mode) is not changed even if the flash emitting device is mounted on the camera body.

(Seventh modification)

Next, the modifications of the light measuring pattern are described by making reference to FIGS. 46a, 46b, 46c and 46d.

Figure 46A:
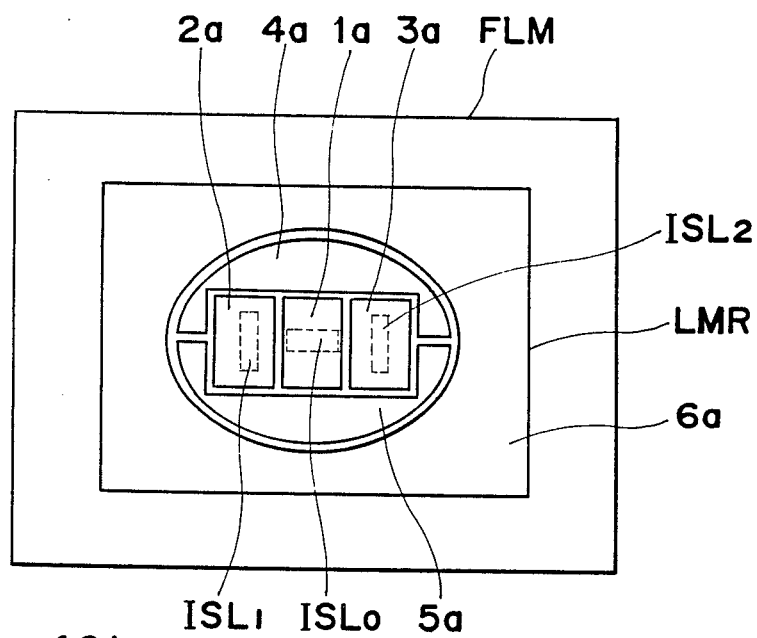
FIGS. 46a, 46b, 46c and 46d are views showing, respectively, light measuring ranges in the camera system which embodies the present invention.

FIG. 46(a) shows a first modification of the light measuring pattern. In this light measuring pattern, the light measuring regions (hereinafter referred to as region(s)) are determined in consideration of the positions of the CCD line sensors $ISL_0$ through $ISL_2$. That is, a rectangular region 1a is the region (zero zone) whose center area is used for the CCD line sensor $ISL_0$. A rectangular region 2a is the region (first zone) whose center area is used for the CCD line sensor $ISL_1$. The measured area of the region 2a is almost equal to that of the region 1a. A rectangular region 3a is the region (second zone) whose center area is used for the CCD line sensor $ISL_2$. The area of the region 3a is almost equal to that of the region 1a. Regions 4a and 5a are so located as to enclose the regions 1a, 2a, and 3a. The region 4a is disposed in the upper portions of the regions 1a, 2a, and 3a. The region 5a is disposed in the lower portions of the regions 1a, 2a, and 3a. This configuration of the light measuring pattern enables an accurate spot light measuring of the main object (namely, main object) located in the main zone.

Figure 46B:
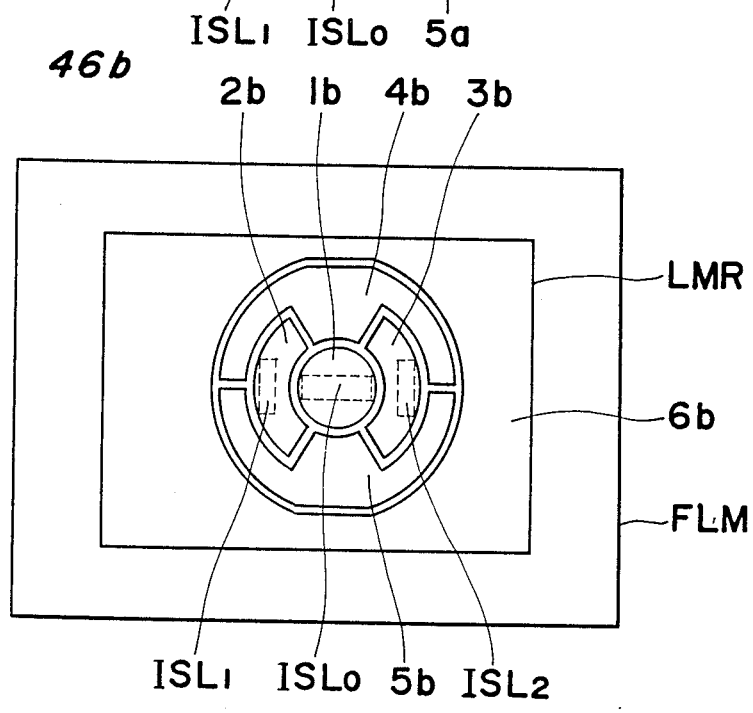

FIG. 46(b) shows the second modification of the light measuring pattern. This light measuring pattern is formed by adopting the advantage of the light measuring pattern shown in FIG. 2 and the light measuring pattern of the above-described first modification. That is, a region 1b is circular and located in the center of the region LMR to be measured. Sector regions 2b and 3b are located on the left and right sides of the region 1b, respectively. The areas of the regions 2b and 3b are almost equal to that of the region 1b. The regions 4b and 5b are so located as to enclose the regions 1b, 2b, and 3b. The region 4b is located on the upper portion of the regions 1b, 2b, and 3b. The region 5b is located on the lower portion of the regions 1b, 2b, and 3b. The configuration and area formed by the addition of the regions 1b, 2b, 3b, 4b, and 5b are the same as those of the addition of the regions 1, 2, 3, 4, and 5 of the light measuring pattern shown in FIG. 2. This configuration of the light measuring pattern reduces the influence of lights which are incident on the upper and lower portions of the first (second) zone compared with the light measuring pattern shown in FIG. 2 when the main object is located in a small extent on the left (right) relative to the center of the field angle FLM.

Figure 46C:
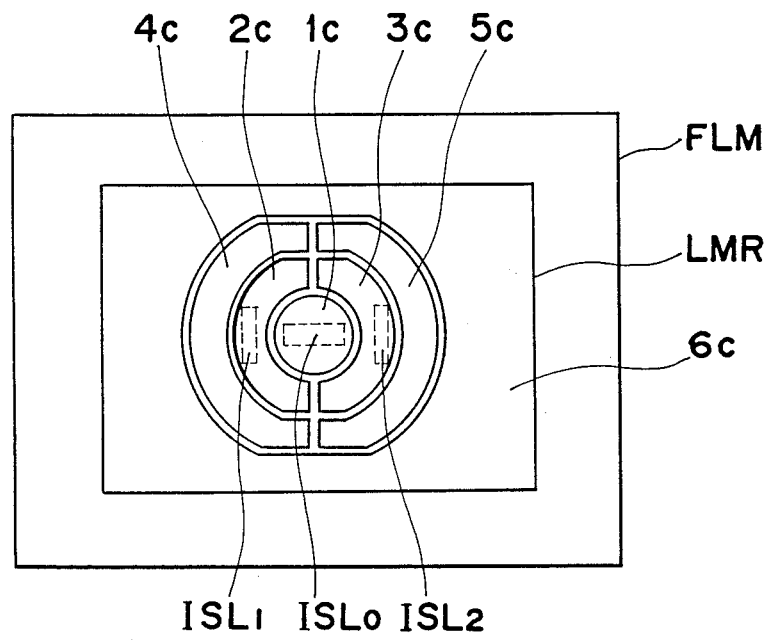

FIG. 46(c) shows the third modification of the light measuring pattern. In this modification, regions 4 and 5 shown in FIG. 2 are located on the left and right, that is, a region 4c which is C-shaped is located on the left of a region 2c, and a region 5c which is C-shaped is located on the right side of a region 3c. This configuration of the light measuring pattern enables a fine light measuring based on the dimension of the object image regardless of whether the main zone is either of the zero through the second zone.

Figure 46D:
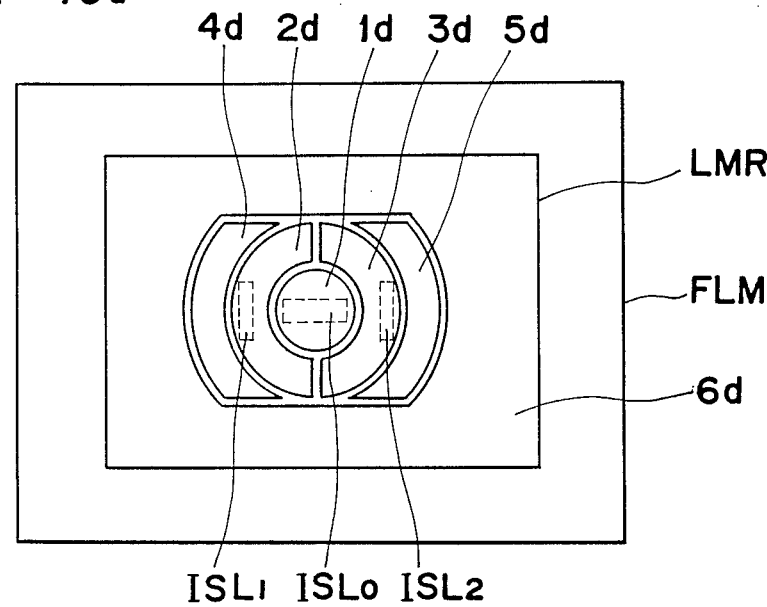

FIG. 46(d) shows the fourth modification of the light measuring pattern. In this modification, the upper and lower portions of the regions 4c and 5c of the third modification are removed. This configuration of the light measuring pattern enables a fine light measuring based on the dimension of the object image regardless of whether the main zone is either of the zero through the second zone similarly to the third modification. In addition, compared with other light measuring patterns, the light measuring area 6d surrounding regions 1d through 5d is large. Therefore, the sensitivity with respect to the background light is increased.

In the above-described embodiment and modifications, no light measuring regions are provided between the second and third regions, but another second or third light region may be provided therebetween.

A known means, for example, a mercury switch may be provided to detect whether an object is photographed with the camera widthwise or lengthwise so that the method for performing the calculations of the luminances of the main object and the background are changed according to the direction in which the main object is photographed.

For example, when the main object is photographed widthwise using the light measuring pattern shown in FIG. 2 and those shown in FIGS. 46(a) and 46(b), the luminance of the background is calculated by setting the weights of the regions 4, 4a, and 4b located on the upper portion smaller than those of the regions 5, 5a, and 5b. Owing to this arrangement, the influence of the regions located on the upper portions on which lights are incident from a bright sky. When the main object is photographed lengthwise, the luminance of the background is calculated by setting the weights of the values of the lights incident on the regions 4, 4a, and 4b equal to the weights of the values of the lights incident on the regions 5, 5a, and 5b. When the main object is photographed lengthwise, if the relationship between the photographing magnification $\beta$ and the predetermined photographing magnifications $\beta_0$ and $\beta_1$ is $\beta_0<\beta<\beta_1$, the luminance of the main object is calculated by setting the weights of the values of the lights incident on the regions 2, 2a, and 2b which are normally located on the upper portion smaller than the weights of the values of the lights incident on the regions 3, 3a, and 3b which are normally located on the lower portion.

Similarly, when the main object is photographed widthwise using the light measuring patterns shown in FIGS. 46(c) and 46(d), the luminances of the main object and the background are calculated by setting the weights of the regions 2c, 4c, 2d, and 4d located on the left side equal to the weights of the values of the lights incident on the regions 3c, 5c, 3d, and 5d located on the right side. When the main object is photographed lengthwise, if the relationship between the photographing magnification $\beta$ and the predetermined photographing magnifications $\beta_1$ and $\beta_2$ is $\beta_1<\beta<\beta_2$, the luminance of the background is calculated by setting the weights of the values of the lights incident on the regions 4c and 4d which are normally located on the upper portion smaller than the weights of the values of the lights incident on the regions 5c and 5d which are normally located on the lower portion. If the relationship between the photographing magnification $\beta$ and the predetermined photographing magnifications $\beta_1$ and $\beta_0$ is $\beta_0<\beta<\beta_1$, the luminance of the main object is calculated by setting the weights of the regions 2c and 2d to be small and the luminance of the background is calculated by reducing the weights of the regions 4c and 4d. If the relationship between the photographing magnification $\beta$ and the predetermined photographing magnification $\beta_0$ is $\beta<\beta_0$, the luminances of the main object and the background are calculated by reducing the weights of the values of the light incident on the regions and 4d or the weights of the values of the light incident on the regions 2c, 4c, 2d, and 4d.

When the main object is photographed lengthwise, a means may be provided to detect which of the left and right of the camera is upper so that the luminance of the main object is calculated by reducing the weight of the value of the light incident on the region located upwards.

Although the present invention has been fully described by way of example with reference to the accompanying drawings, it is to be noted here that various changes and modifications will become apparent to those skilled in the art. Therefore, unless such changes and modifications depart from the scope of the present invention, they should be construed as included therein.

What is claimed is:

1. An exposure calculation apparatus comprising:
   plural first means for measuring light incident on a plurality of regions of a photographing image plane and outputting data of the measured light;
   plural second means for detecting the focusing conditions of objects present in a plurality of the regions of the photographing image plane and outputting data on the focusing conditions;
   third means for detecting the position which a main object occupies in the photographing image plane depending on the data on the focusing conditions outputted from said second means;
   fourth means for making a plurality of calculations, each of which is made depending on at least one of the data of measured light outputted from said plural first means; and
   fifth means for selecting one of the plurality of calculations depending on the position detected by the third means and the data on the focusing conditions of the position.

2. An exposure calculation apparatus as claimed in claim 1, wherein said first means measure light which has transmitted through a photographing lens.

3. An exposure calculation apparatus as claimed in claim 1, wherein said second means comprise plural light receiving means for receiving light which have transmitted through a photographing lens and a focusing condition detecting means for detecting a focusing condition depending on respective outputs of the light received by said light receiving means.

4. An exposure calculation apparatus comprising:
   plural first means for measuring light incident on a plurality of regions of a photographing image plane and outputting data of the measured light;
   plural second means for detecting the focusing conditions of objects present in a plurality of the regions of the photographing image plane and outputting data on the focusing conditions;
   third means for detecting the position which a main object occupies in the photographing image plane depending on the data on the focusing conditions outputted from said second means;
   fourth means for inputting the data of the focal length of a photographing lens;
   fifth means for making a plurality of calculations, each of which is made depending on at least one of the data of measured light outputted from said plural first means; and
   sixth means for selecting one of the plurality of calculations depending on the position detected by said third means and the data of the focal length inputted by said fourth means.

5. An exposure calculation apparatus as claimed in claim 4, wherein said first means measure light which is transmitted through the photographing lens.

6. An exposure calculation apparatus as claimed in claim 4, wherein said second means comprise plural light receiving means for receiving light which is transmitted through said photographing lens and focusing condition detecting means for detecting a focusing condition depending on respective outputs of the light received by said light receiving means.

7. An exposure calculation apparatus comprising:
   plural first means for measuring light incident on a plurality of regions of a photographing image plane and outputting data of the measured light;
   plural second means for detecting the focusing conditions of objects present in a plurality of the regions of the photographing image plane and outputting data on the focusing conditions;
   third means for detecting the position which a main object occupies in the photographing image plane depending on the data on the focusing conditions outputted from said second means;
   fourth means for detecting the ratio that the image of the main object occupies in the photographing image plane;
   fifth means for making a plurality of calculations, each of which is made depending on at least one of the data of measured light outputted from said first means; and
   sixth means for selecting one of the plurality of calculations on the position detected by said third means and the ratio detected by said fourth means.

8. An exposure calculation apparatus as claimed in claim 7, wherein said fourth means include seventh means for inputting the data of the focal length of a photographing lens and eighth means for detecting the ratio that the image of the main object occupies the photographing image plane depending on the data of the focusing condition in the position, detected by said third means, in which the main object is present and the data of the focal length inputted by said seventh means.

9. An exposure calculation apparatus as claimed in claim 7, wherein said first means measure light which has transmitted through a photographing lens.

10. An exposure calculation apparatus as claimed in claim 7, wherein said second means comprise plural light receiving means for receiving lights which have transmitted through a photographing lens and focusing condition detecting means for detecting a focusing condition on respective outputs of the light received by said light receiving means.

* * * * *